(12) United States Patent
Sawai

(10) Patent No.: US 9,100,092 B2
(45) Date of Patent: Aug. 4, 2015

(54) COMMUNICATION SYSTEM, BASE STATION, RELAY NODE AND USER EQUIPMENT

(75) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 268 days.

(21) Appl. No.: 13/394,824

(22) PCT Filed: Jul. 27, 2010

(86) PCT No.: PCT/JP2010/004763
§ 371 (c)(1),
(2), (4) Date: Mar. 8, 2012

(87) PCT Pub. No.: WO2011/036837
PCT Pub. Date: Mar. 31, 2011

(65) Prior Publication Data
US 2012/0170508 A1    Jul. 5, 2012

(30) Foreign Application Priority Data

Sep. 25, 2009  (JP) ................ 2009-220485
Feb. 25, 2010  (JP) ................ 2010-040224

(51) Int. Cl.
| H04B 7/14 | (2006.01) |
| H04B 7/26 | (2006.01) |
| H04B 7/155 | (2006.01) |
| H04W 72/04 | (2009.01) |
| H04W 28/26 | (2009.01) |
| H04W 84/04 | (2009.01) |

(52) U.S. Cl.
CPC .............. *H04B 7/2606* (2013.01); *H04B 7/155* (2013.01); *H04W 72/0406* (2013.01); *H04W 28/26* (2013.01); *H04W 84/047* (2013.01)

(58) Field of Classification Search
CPC .................................................. H04W 84/047
See application file for complete search history.

(56) References Cited

U.S. PATENT DOCUMENTS

2006/0193280 A1 * 8/2006 Lee et al. ............ 370/315
2009/0016290 A1 * 1/2009 Chion et al. ........ 370/329

(Continued)

FOREIGN PATENT DOCUMENTS

| EP | 1 777 877 | 4/2007 |
| EP | 1 777 877 A2 | 4/2007 |

(Continued)

OTHER PUBLICATIONS

3GPP TSG RAN WG1 Meeting #55b R1-09xxxx. "Considerations on LTE Relay." China Potevio, CATT. pp. 1-12 (Jan. 11-16, 2009).

(Continued)

*Primary Examiner* — Kouroush Mohebbi
(74) *Attorney, Agent, or Firm* — Hazuki International, LLC

(57) ABSTRACT

A relay node in a mobile communication network for relaying communications between a base station and a mobile terminal. The relay node includes a communication interface that receives resource allocation information from the base station, the resource allocation information indicating a controllable range of communication resources available to the relay node. The relay node also includes a control unit that controls allocation of resources for communication between the relay node and the mobile station based on the received resource allocation information. The relay node then communicates with the mobile terminal based on the control performed by the control unit.

37 Claims, 37 Drawing Sheets

(56) References Cited

U.S. PATENT DOCUMENTS

| | | | |
|---|---|---|---|
| 2009/0117899 A1* | 5/2009 | Shiff | 455/436 |
| 2009/0181694 A1* | 7/2009 | Byun et al. | 455/453 |
| 2010/0118827 A1* | 5/2010 | Sundaresan et al. | 370/330 |

FOREIGN PATENT DOCUMENTS

| | | |
|---|---|---|
| JP | 2006 246002 | 9/2006 |
| JP | 2006-246002 | 9/2006 |
| JP | 1 777 877 | 4/2007 |
| JP | 2009-130790 | 6/2009 |
| JP | 2009 130790 | 6/2009 |

OTHER PUBLICATIONS

3GPP TSG-RAN WG RAN1 #55bis; Agenda Item 12.6. "Joint analog network coding a Relay." Alcatel Shanghai Bell, Alcatel-Lucent. pp. 1-7 (Jan. 12-16, 2009).

3GPP TSG RAN WGI meeting #57; Agenda Item 15.3. "Understanding on Type 1 and Type 2 Relay." Huawei. pp. 1-4 (May 3-8, 2009).

International Search Report issued Oct. 26, 2010 in PCT/JP10/004763 filed Jul. 27, 2010.

U.S. Appl. No. 13/390,726, filed Feb. 16, 2012, Sawai.

* cited by examiner

FIG. 3
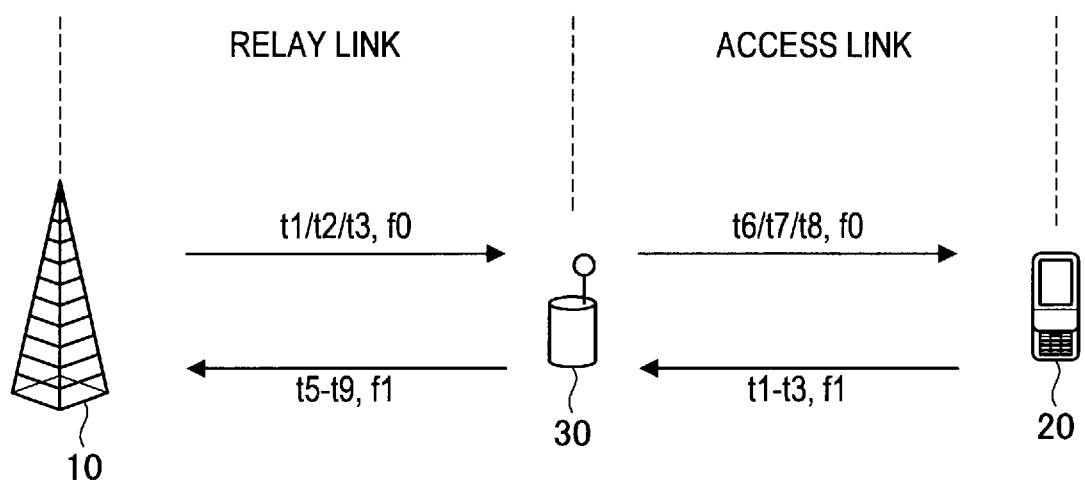
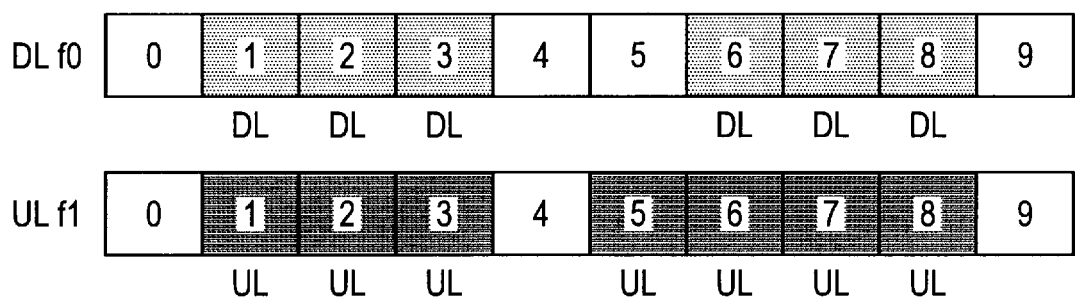

FIG. 33

| | IF BETWEEN MACRO CELL AND BASE STATION | ACCESS | ASSUMED LOCATION |
|---|---|---|---|
| RRH CELL BASE STATION | OPTICAL FIBER | OPEN TO ALL USER EQUIPMENT | OUTDOOR |
| HOTZONE BASE STATION | X2 | OPEN TO ALL USER EQUIPMENT | OUTDOOR |
| FEMTOCELL BASE STATION | X2 TUNNELING PROTOCOL ON PBN | CLOSED GROUP | INDOOR |
| RELAY NODE (RELAY BASE STATION) | RADIO (SO-CALLED RELAY LINK) | OPEN TO ALL USER EQUIPMENT | OUTDOOR |

☐ MACRO CELL BASE STATION
△ SMALL-TO-MEDIUM-SIZED BASE STATION
● USER EQUIPMENT

☐ MACRO CELL BASE STATION
△ SMALL-TO-MEDIUM-SIZED BASE STATION
● USER EQUIPMENT

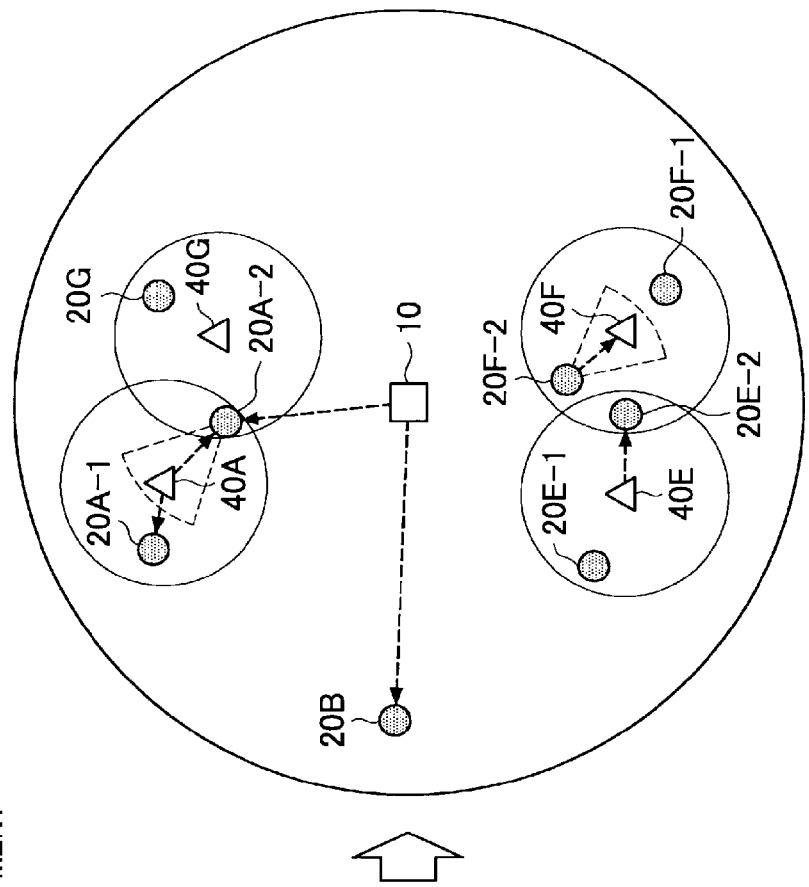
FIG. 36
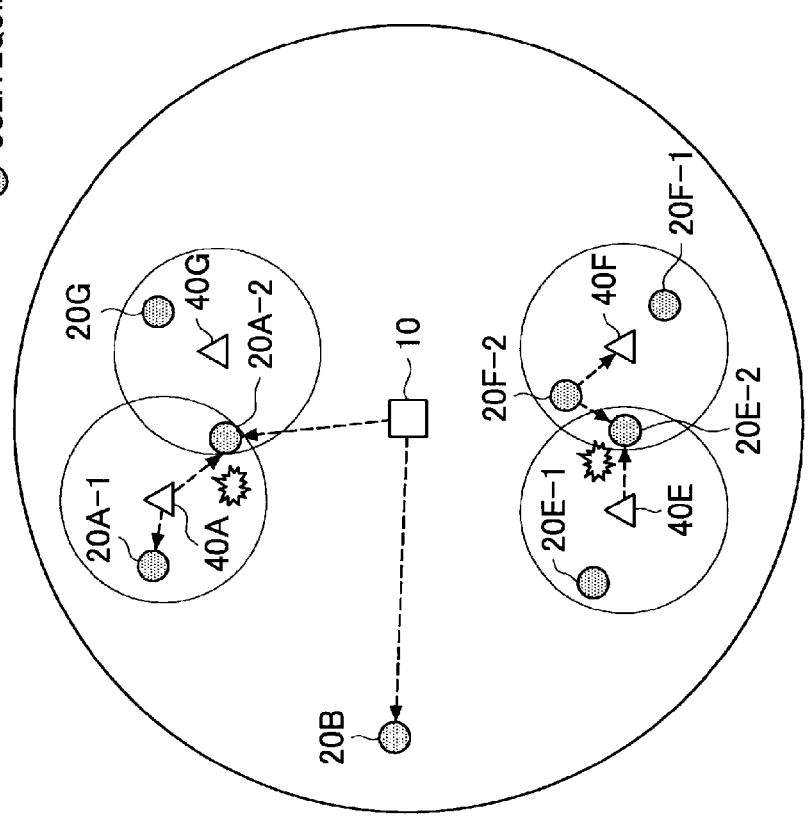

COMMUNICATION SYSTEM, BASE STATION, RELAY NODE AND USER EQUIPMENT

CROSS REFERENCES TO RELATED APPLICATIONS

This application claims the benefit of priority under 35 U.S.C. 119 from Japanese Patent Application 2009-220881, filed Sep. 25, 2009, and Japanese Patent Application 2010-040227, filed Feb. 25, 2010, the entire contents of each which are incorporated herein by reference.

TECHNICAL FIELD

The present invention relates to a communication system, a base station, a relay node and a user equipment.

BACKGROUND ART

A relay technique is standardized in IEEE (Institute of Electrical and Electronics Engineers) 802.16j. Further, in 3GPP (3rd Generation Partnership Project) LTE-A (Long Term Evolution-Advanced) also, a technique using a relay node (RN) is studied actively in order to improve the throughput of a user equipment (UE) located at the cell edge.

The relay node receives a signal transmitted from a base station, amplifies the signal and transmits the amplified signal to the user equipment in the downlink. Such a relay in the relay node ensures a higher signal-to-noise ratio compared to directly transmitting a signal from the base station to the user equipment. Likewise, the relay node relays a signal transmitted from the user equipment to the base station in the uplink, thereby maintaining a high signal-to-noise ratio. The relay node is disclosed in the following non-patent literatures 1 to 3, for example.

CITATION LIST

Non Patent Literature

[NPL 1] R1-090015, "Consideration on Relay.ppt", China Potevio, CATT, January 2009
[NPL 2] R1-090065, "Joint analog network coding and Relay", Alcatel-Lucent, January 2009
[NPL 3] R1-091803, "Understanding on Type 1 and Type 2 Relay", Huawei, May 2009

SUMMARY OF INVENTION

Technical Problem

A control range allowed to the relay node (e.g. a variation of a control method for avoiding interference which is allowed to a relay node) is fixed as a possible example. However, because the communication status of each cell is in flux, it is desired to make the control range of the relay node adaptable to the communication status.

In light of the foregoing, it is desirable to provide a communication system, a base station, a relay node and a user equipment, which are novel and improved, and which enable an adaptive selection of a control range of a small-to-medium-sized base station such as a relay node from a plurality of types of control ranges.

Solution to Problem

In one exemplary embodiment, the present specification discloses a relay node in a mobile communication network for relaying communications between a base station and a mobile terminal. The relay node includes a communication interface that receives resource allocation information from the base station, the resource allocation information indicating a controllable range of communication resources available to the relay node. The relay node also includes a control unit that controls allocation of resources for communication between the relay node and the mobile station based on the received resource allocation information. The relay node communicates with the mobile terminal based on the control performed by the control unit.

Advantageous Effects of Invention

According to the embodiments of the present invention described above, it is possible to adaptively select a control range of a small-to-medium-sized base station such as a relay node from a plurality of types of control ranges.

BRIEF DESCRIPTION OF DRAWINGS

FIG. 3 is an explanatory view showing an example of resource allocation in the case of using different frequencies in UL and DL.

FIG. 23 is an explanatory view showing an illustrative example of determination of transmission timing, insertion of a non-transmission period or the like.

FIG. 24 is an explanatory view showing an illustrative example of determination of transmission timing, insertion of a non-transmission period or the like.

FIG. 25 is an explanatory view showing an illustrative example of determination of transmission timing, insertion of a non-transmission period or the like.

FIG. 33 is an explanatory view showing an overview of a small-to-medium-sized base station.

FIG. 36 is an explanatory view showing an example of interference avoidance by beamforming.

DESCRIPTION OF EMBODIMENTS

Figure 1:
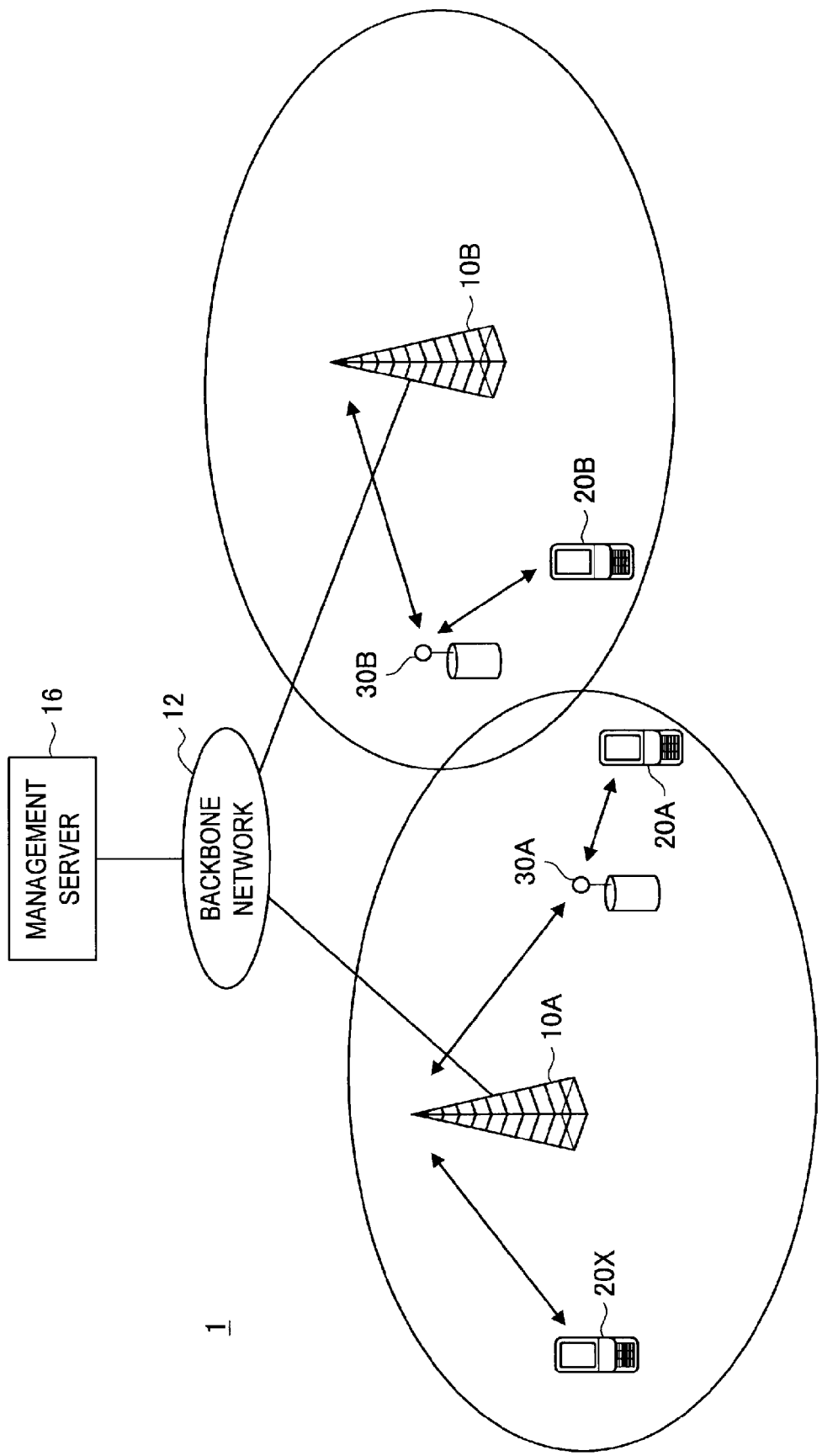
FIG. 1 is an explanatory view showing a configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, each of a plurality of structural elements having substantially the same function is distinguished by affixing a different alphabetical letter to the same reference numeral in some cases. For example, a plurality of structural elements having substantially the same function are distinguished like user equipments 20A, 20B and 20C where necessary. However, when there is no particular need to distinguish between a plurality of structural elements having the same function, they are denoted by the same reference numeral. For example, when there is no particular need to distinguish between the user equipments 20A, 20B and 20C, they are referred to simply as the user equipment 20.

Preferred embodiments of the present invention will be described hereinafter in the following order.

1. Basic Configuration of Communication System
(Example of Resource Allocation to Each Link)
(Example of Format of Radio Frame)
(Connection Processing Sequence)
(MBSFN)
(Example of Frequency Allocation to Each Cell)

2. Illustrative Configuration of Communication System
2-1. Configuration of User Equipment
2-2. Configuration of Relay Node
2-3. Configuration of Base Station
3. Control Range A: Central Control of Management Server
4. Control Ranges B and C: Autonomous Control of Relay Node
5. Other Applications of Invention
6. Summary 1. Basic Configuration of Communication System A basic configuration of a communication system 1 according to an embodiment of the present invention is described hereinafter with reference to FIGS. 1 to 8. FIG. 1 is an explanatory view showing a configuration of the communication system 1 according to an embodiment of the present invention. Referring to FIG. 1, the communication system 1 according to the embodiment of the present invention includes base stations 10A and 10B, a backbone network 12, user equipments 20A, 20B and 20X, and relay nodes 30A and 30B.

The base station 10 manages communication between the relay node 30 and the user equipment 20 located inside a cell formed by the base station 10. For example, the base station 10A manages scheduling information for communication with the user equipment 20X located inside the cell, and communicates with the user equipment 20X according to the scheduling information. Further, the base station 10A manages scheduling information for communication with the relay node 30A located inside the cell and scheduling information for communication between the relay node 30A and the user equipment 20A.

Note that management of the scheduling information may be performed in cooperation by the base station 10 and the relay node 30, may be performed in cooperation by the base station 10, the relay node 30 and the user equipment 20, or may be performed by the relay node 30.

The relay node 30 relays communication between the base station 10 and the user equipment 20 according to the scheduling information managed by the base station 10. Specifically, the relay node 30 receives a signal transmitted from the base station 10 and transmits the amplified signal to the user equipment 20 by using frequency/time according to the scheduling information in the downlink. With such a relay in the relay node 30, a signal-to-noise ratio is higher compared to directly transmitting a signal from the base station 10 to the user equipment 20 near the cell edge.

Likewise, in the uplink also, the relay node 30 relays a signal transmitted from the user equipment 20 to the base station 10 according to the scheduling information managed by the base station 10, thereby maintaining a high signal-to-noise ratio. Although the case where only the relay node 30A exists in the cell formed by the base station 10A, a plurality of relay nodes 30 may exist in the cell formed by the base station 10A.

Proposed as the types of the relay nodes 30 are Type 1 and Type 2. The relay node 30 of Type 1 has an individual cell ID and is allowed to manage its own cell. Thus, the relay node 30 of Type 1 operates in such a way that it is recognized as the base station 10 by the user equipment 20. However, the relay node 30 of Type 1 does not completely operate autonomously, and the relay node 30 performs relay communication within the range of resources allocated by the base station 10.

On the other hand, the relay node 30 of Type 2, differently from Type 1, does not have an individual cell ID and supports direct communication between the base station 10 and the user equipment 20. For example, a relay transmission technique using cooperative relay or network coding is being studied. The following table 1 shows characteristics of Type 1 and Type 2 under study.

TABLE 1

| Item | Type 1 | Type 2 |
| --- | --- | --- |
| Decision | R1-091098 | R1-091632 |
| Type of Relay | L2 and L3 Relay | L2 |
| PHY Cell ID | Own cell ID | No cell ID |
| Transparency | Non transparent Relay node to UE | Transparent Relay node to UE |
| New cell | Create new cell (another eNB) | Not create new cell |
| RF parameters | Optimized parameters | N/A |
| HO | Inter cell HO (generic HO) | HO transparently to UE |
| Control Channel Generation | Generate synch. channel, RS, H-ARQ channel and scheduling information etc. | Not generate its own channel but decodes/ forwards donor eNB's signal to UE |
| Backward compatibility | Support (appear as a Rel-8 eNB to Rel-8 UE) | Support (able to relay also to/from Rel-8 UE) |
| LTE-A (Forward compatibility) | Support (it appear differently than Rel-8 eNB to LTE-A UE) | — |
| Awareness to MS | — (>Rel-8 eNB to LTE-A UEs or Relay) | — |
| Cooperation | Inter cell cooperation | Intra cell cooperation |
| Backhaul utilization | Higher | Lower |
| Usage model | Coverage extension | Throughput enhancement and coverage extension |
| Cost | Higher | Lower |

The user equipment 20 communicates with the base station 10 directly or through the relay node 30 according to the scheduling information managed by the base station 10. Data transmitted or received by the user equipment 20 may be voice data, music data such as music, lectures or radio programs static image data such as photographs, documents, pictures or charts, or video data such as movies, television programs, video programs, game images or the like. Further, the user equipment 20 may be an information processing device having a radio communication function such as a mobile phone or a personal computer (PC).

A management server 16 is connected to each base station 10 through the backbone network 12. The management server 16 functions as a mobile management entity (MME). Further, the management server 16 may function as a serving gateway. The management server 16 receives management information indicating the status of cell formed by each base station 10 from the respective base stations 10 and controls communication in the cell formed by each base station 10 based on the management information. The function of the management server 16 may be incorporated into a plurality of physically separated structures in a distributed manner.

(Example of Resource Allocation to Each Link)

Resource allocation to each link is described hereinafter. In the following description, a communication path between the base station 10 and the relay node 30 is referred to as a relay link, a communication path between the relay node 30 and the user equipment 20 is referred to as an access link, and a direct communication path between the base station 10 and the user equipment 20 is referred to as a direct link. Further, a communication path toward the base station 10 is referred to as UL (uplink), and a communication path toward the user equipment 20 is referred to as DL (downlink). Communication in each link is based on OFDMA.

The relay node 30 separates the relay link and the access link by frequency or time in order to avoid interference between the relay link and the access link. For example, the relay node 30 may separate the relay link and the access link in the same direction by TDD (Time Division Duplexing) with use of a common frequency.

Figure 2:
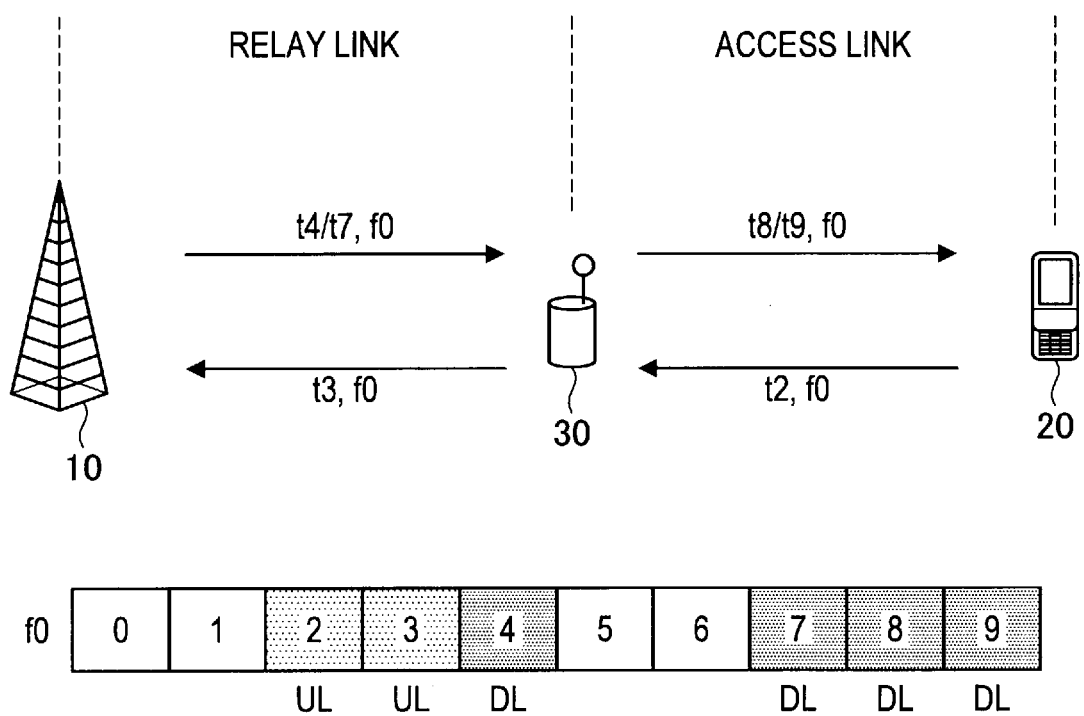
FIG. 2 is an explanatory view showing an example of resource allocation in the case of using the same frequency in UL and DL.

FIG. 2 is an explanatory view showing an example of resource allocation in the case of using the same frequency in UL and DL. Referring to FIG. 2, one radio frame is made up of subframes 0 to 9. Further, in the example shown in FIG. 2, the relay node 30 recognizes the subframes 8 and 9 as resources for DL of the access link according to a direction from the base station 10 and therefore relays a signal transmitted from the base station 10 to the user equipment 20 with use of the subframes 8 and 9.

Note that PSC (Primary Synchronization Channel) and SSC (Secondary Synchronization Channel), which are synchronous signals of the downlink, or PBCH (Physical Broadcast CHannel) is allocated to the subframes 0 and 5. Further, a paging channel is allocated to the subframes 1 and 6.

FIG. 3 is an explanatory view showing an example of resource allocation in the case of using different frequencies in UL and DL. Referring to FIG. 3, a frequency f0 is used for DL, and a frequency f1 is used for UL. Further, in the example shown in FIG. 3, the relay node 30 recognizes the subframes 6 to 8 of the frequency f0 as resources for DL of the access link according to a direction from the base station 10 and therefore relays a signal transmitted from the base station 10 to the user equipment 20 with use of the subframes 6 to 8 of the frequency f0.

Note that PSC and SSC, which are synchronous signals of the downlink, are allocated to the subframes 0 and 5 of the frequency f0 (for DL), and a paging channel is allocated to the subframes 4 and 9.

(Example of Format of Radio Frame)

Detailed examples of the frame format of DL radio frame and UL radio frame are described hereinafter with reference to FIGS. 4 and 5.

Figure 4:
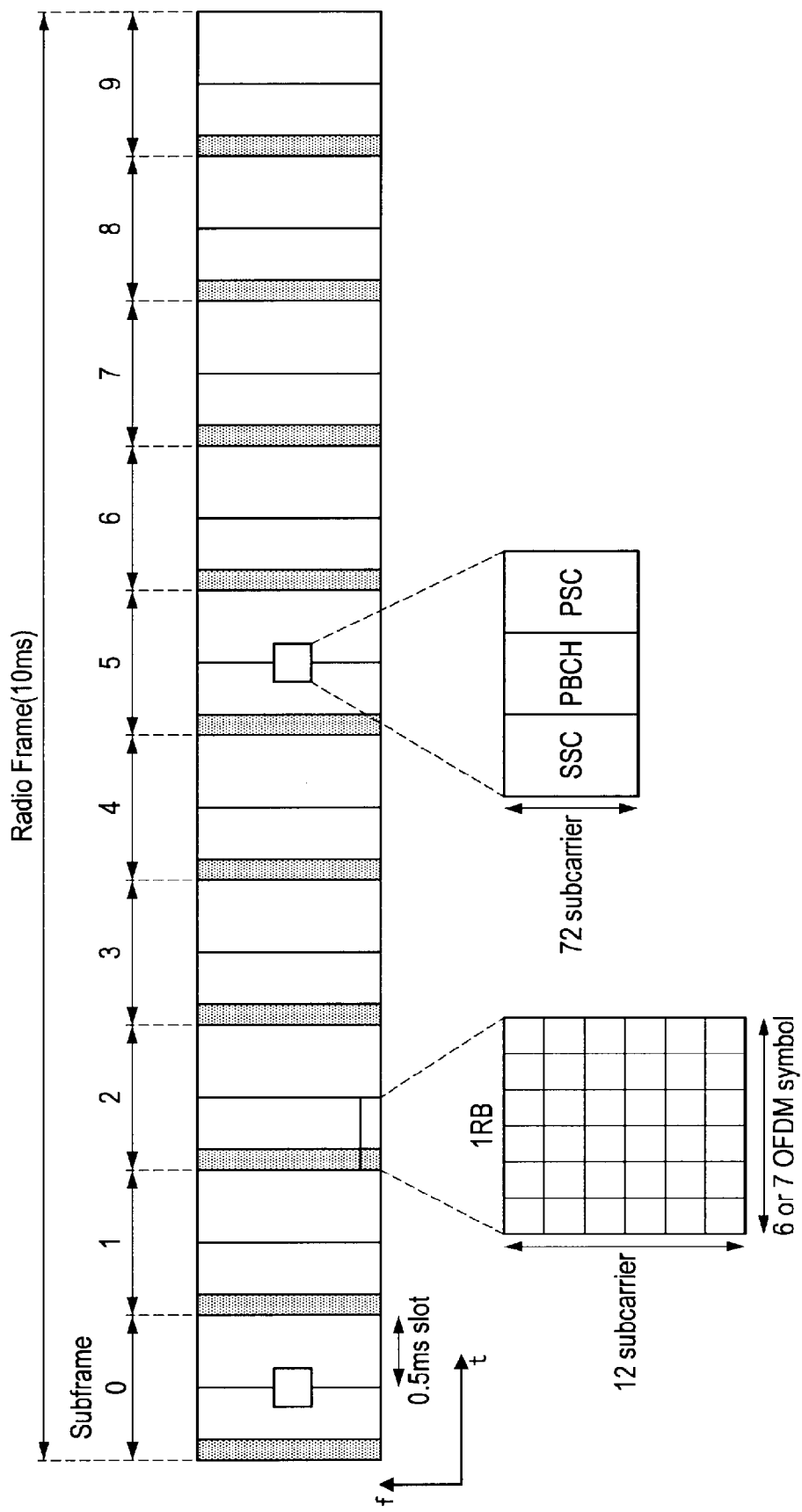
FIG. 4 is an explanatory view showing an example of a format of DL radio frame.

FIG. 4 is an explanatory view showing an example of the format of DL radio frame. The DL radio frame is made up of subframes 0 to 9, each subframe is made up of two 0.5 ms slots, and each 0.5 ms slot is made up of seven OFDM (Orthogonal Frequency Division Multiplexing) symbols.

As shown in FIG. 4, a control channel such as PCFICH (Physical Control Format Indicator CHannel), PHICH (Physical Hybrid ARQ Indicator CHannel) or PDCCH (Physical Downlink Control CHannel) is present in the first to third OFDM symbols at the head of each subframe.

Each of the above channels contains the following information as an example.

PCFICH: The number of symbols of PDCCH related to Layer 1 and Layer 2

PHICH: ACK/NACK for PUSCH

PDCCH: Downlink control information. Scheduling information (format such as modulation scheme or coding rate) of PDSCH/PUSCH Further, one resource block (1RB), which is a minimum unit of resource allocation, is made up of six or seven OFDM symbols and 12 subcarriers. A demodulation reference (reference signal) is present in a part of the resource block.

Further, SSC, PBCH and PSC are present in the subframes 0 and 5. A free space in the radio frame shown in FIG. 4 is used as PDSCH (Physical Downlink Shared CHannel).

Figure 5:
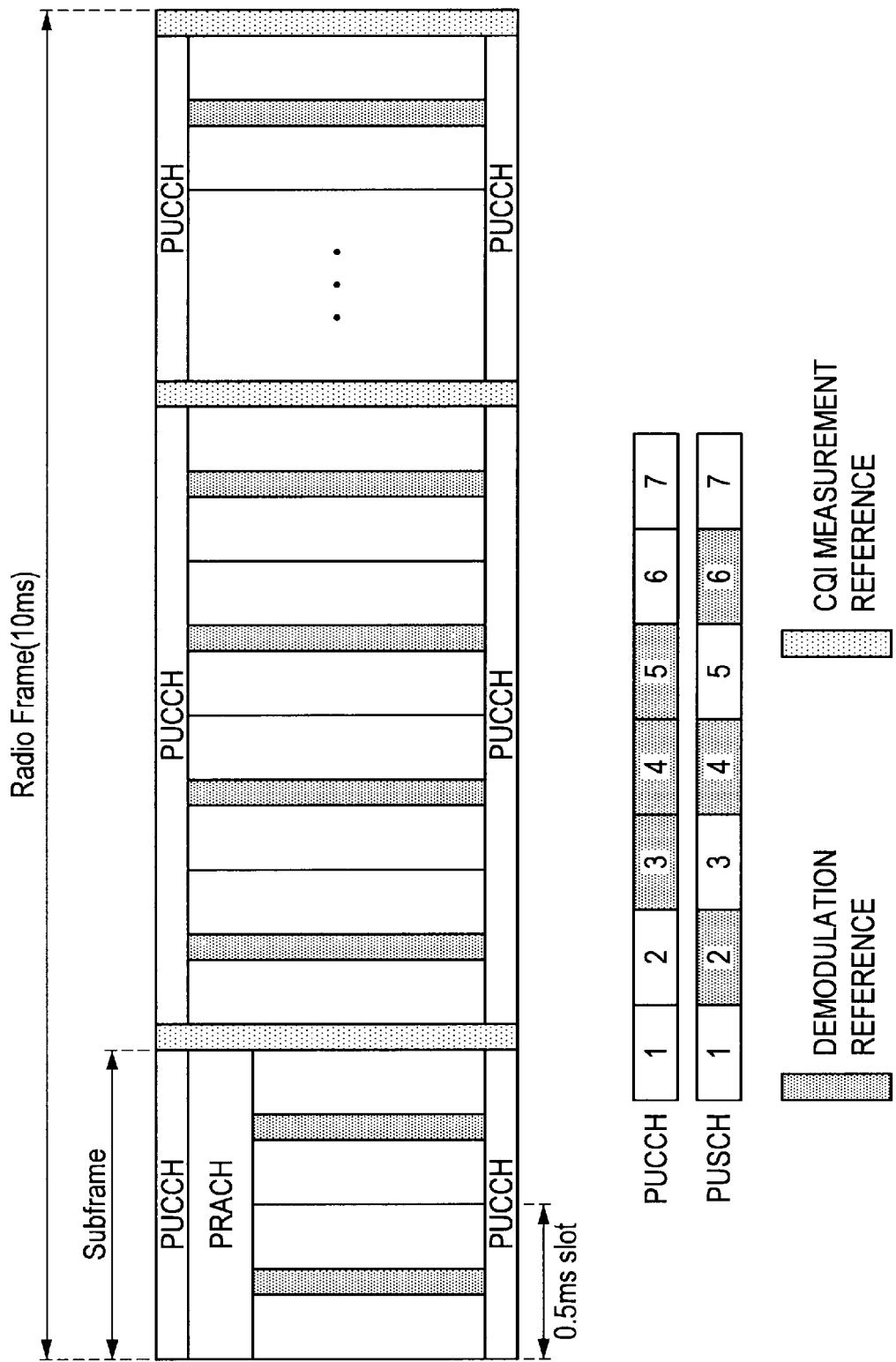
FIG. 5 is an explanatory view showing an example of a format of UL radio frame.

FIG. 5 is an explanatory view showing an example of the format of UL radio frame. Like the DL radio frame, the UL radio frame is made up of subframes 0 to 9, each subframe is made up of two 0.5 ms slots, and each 0.5 ms slot is made up of seven OFDM symbols.

As shown in FIG. 5, a demodulation reference (reference signal) is present in each of the 0.5 ms slots, and a CQI measurement reference is present in a distributed manner. The base station 10 or the relay node 30 at the receiving end performs channel estimation by using the demodulation reference and demodulates a received signal according to the channel estimation result. Further, the base station 10 or the relay node 30 at the receiving end measures the CQI measurement reference and thereby acquires CQI with the relay node 30 or the user equipment 20 at the transmitting end.

Further, a free space in the radio frame shown in FIG. 5 is used as PUSCH (Physical Uplink Shared CHannel). Note that, upon receiving a request for CQI report, the user equipment 20 or the relay node 30 transmits the CQI report by using PUSCH.

(Connection Processing Sequence)

A connection processing sequence between the relay node 30 or the user equipment 20 and the base station 10 is described hereinafter with reference to FIG. 6.

Figure 6:
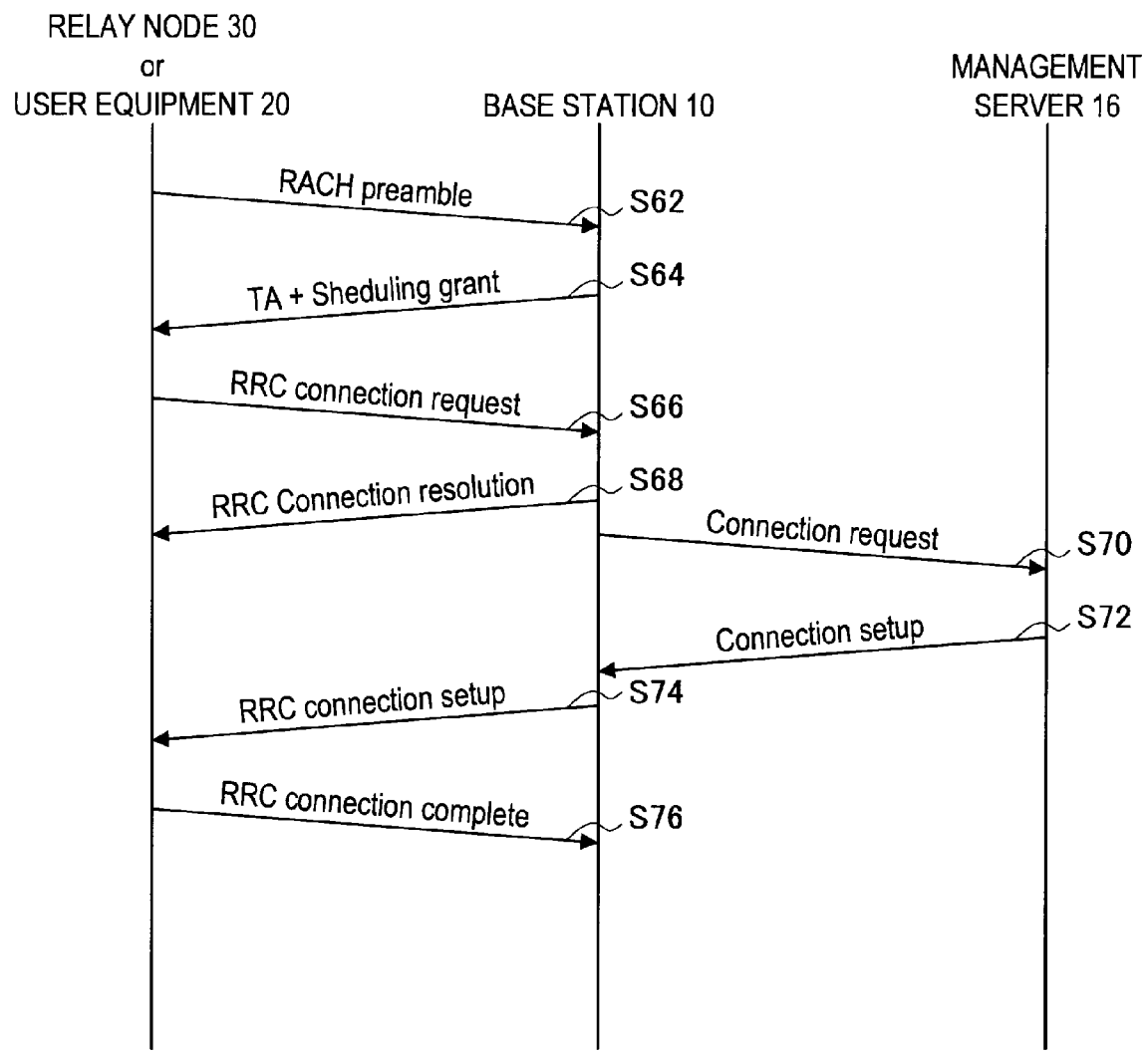
FIG. 6 is an explanatory view showing a connection processing sequence.

FIG. 6 is an explanatory view showing a connection processing sequence. Referring to FIG. 6, the relay node 30 or the user equipment 20 transmits RACH (Random Access CHannel) preamble to the base station 10 (S62). Receiving the RACH preamble, the base station 10 acquires TA (Timing Advance) information and transmits the TA information together with allocated resource information to the relay node 30 or the user equipment 20 (S64). For example, in the case where the transmission timing of the RACH preamble is known, the base station 10 may acquire a difference between the transmission timing and the reception timing of the RACH preamble as the TA information.

After that, the relay node 30 or the user equipment 20 transmits RRC connection request to the base station 10 by using resources indicated by the allocated resource information (S66). Receiving the RRC connection request, the base station 10 transmits RRC connection resolution indicating a transmission source of the RRC connection request (S68). The relay node 30 or the user equipment 20 can thereby confirm whether the base station 10 has received the RRC connection request.

Then, the base station 10 transmits connection request indicating that the relay node 30 or the user equipment 20 is making a request for service to the management server 16 that functions as MME (S70). Receiving the connection request, the management server 16 transmits information to be set to the relay node 30 or the user equipment 20 as connection setup (S72).

Then, the base station 10 transmits RRC connection setup to the relay node 30 or the user equipment 20 based on the connection setup from the management server 16 (S74), and the relay node 30 or the user equipment 20 makes connection setting. After that, the relay node 30 or the user equipment 20 transmits RRC connection complete indicating completion of connection setting to the base station 10 (S76).

Connection between the relay node 30 or the user equipment 20 and the base station 10 is thereby completed, and communication becomes available. The above-described connection processing sequence is just by way of illustration, and the relay node 30 or the user equipment 20 and the base station 10 may be connected by another sequence.

(MBSFN)

Hereinafter, MBSFN (Multimedia Broadcasting Single Frequency Network) transmission that is performed by the base station 10 and an exemplary operation of the relay node 30 in response to the MBSFN transmission are described.

MBSFN is the mode where a plurality of base stations 10 simultaneously transmits data in a broadcast manner at the same frequency. Therefore, in MBSFN, the relay node 30 of Type 1 that virtually operates as a base station transmits a control channel for DL or the like by using the same frequency as that of the base station 10. A specific flow of MBSFN transmission/reception processing is described hereinafter with reference to FIG. 7.

Figure 7:
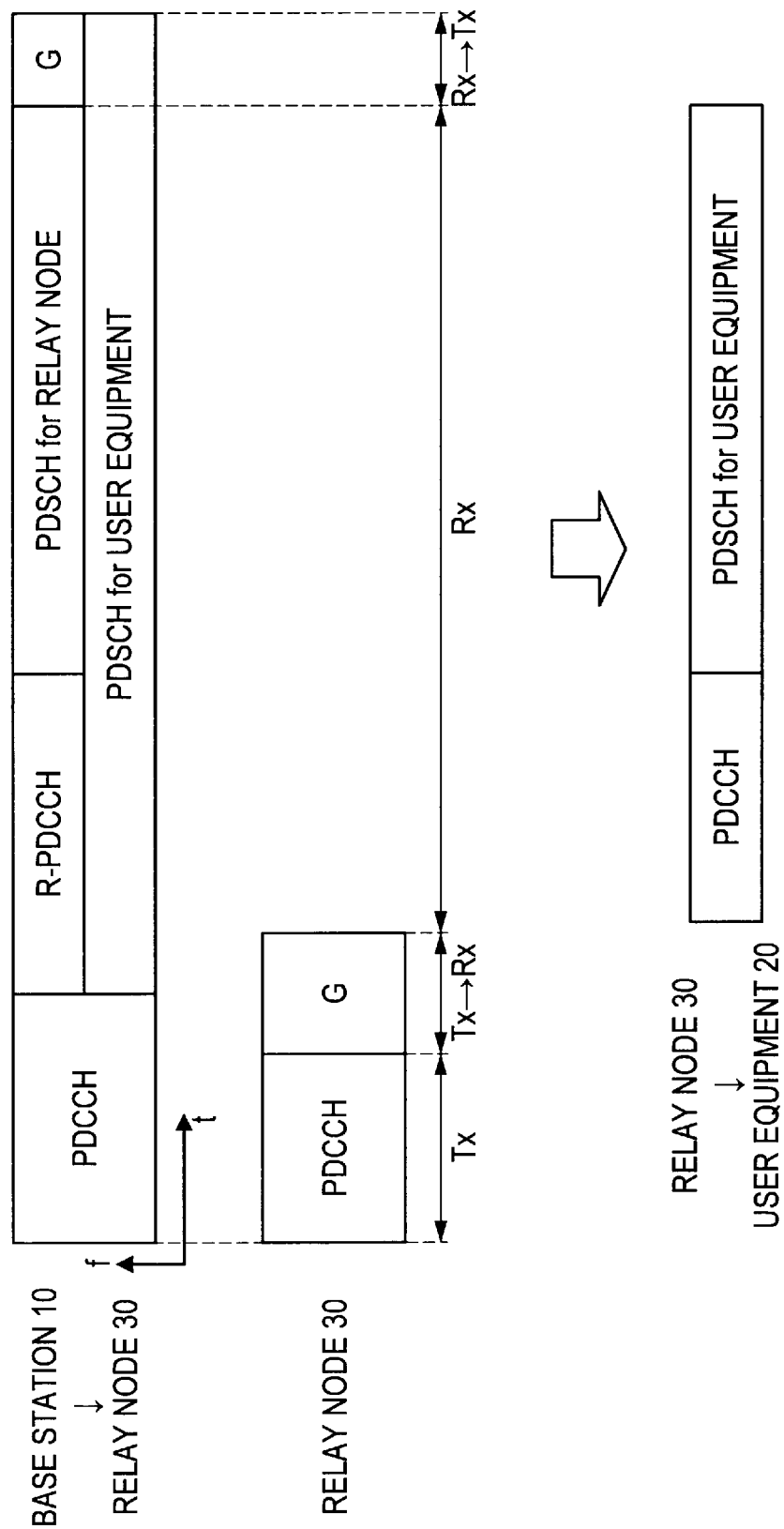
FIG. 7 is an explanatory view showing an illustrative example of MBSFN transmission/reception processing.

FIG. 7 is an explanatory view showing an illustrative example of MBSFN transmission/reception processing. First, as shown in FIG. 7, the base station 10 and the relay node 30 simultaneously transmit PDCCH. The base station 10 transmits, after PDCCH, PDSCH for the user equipment 20 and R-PDCCH for controlling a relay. After R-PDCCH, the base station 10 transmits PDSCH for the relay node 30 (relay target data). A non-transmission period comes after PDSCH for the relay node 30.

The relay node 30 receives, after transmitting PDCCH, PDSCH (relay target data) from the base station 10 subsequent to a switching period to reception processing. The relay node 30 then switches reception processing to transmission processing in the non-transmission period that comes after PDSCH (relay target data) from the base station 10. Further, in the next step, the relay node 30 adds PDCCH to decoded PDSCH (relay target data) and then transmits the data to the user equipment 20.

The existing user equipment that does not assume the existence of the relay node 30 can thereby make an advantage of the relay by the relay node 30 without confusion.

(Example of Frequency Allocation to Each Cell)

An example of frequency allocation to each cell in the case where a plurality of cells are adjacent is described hereinafter.

Figure 8:
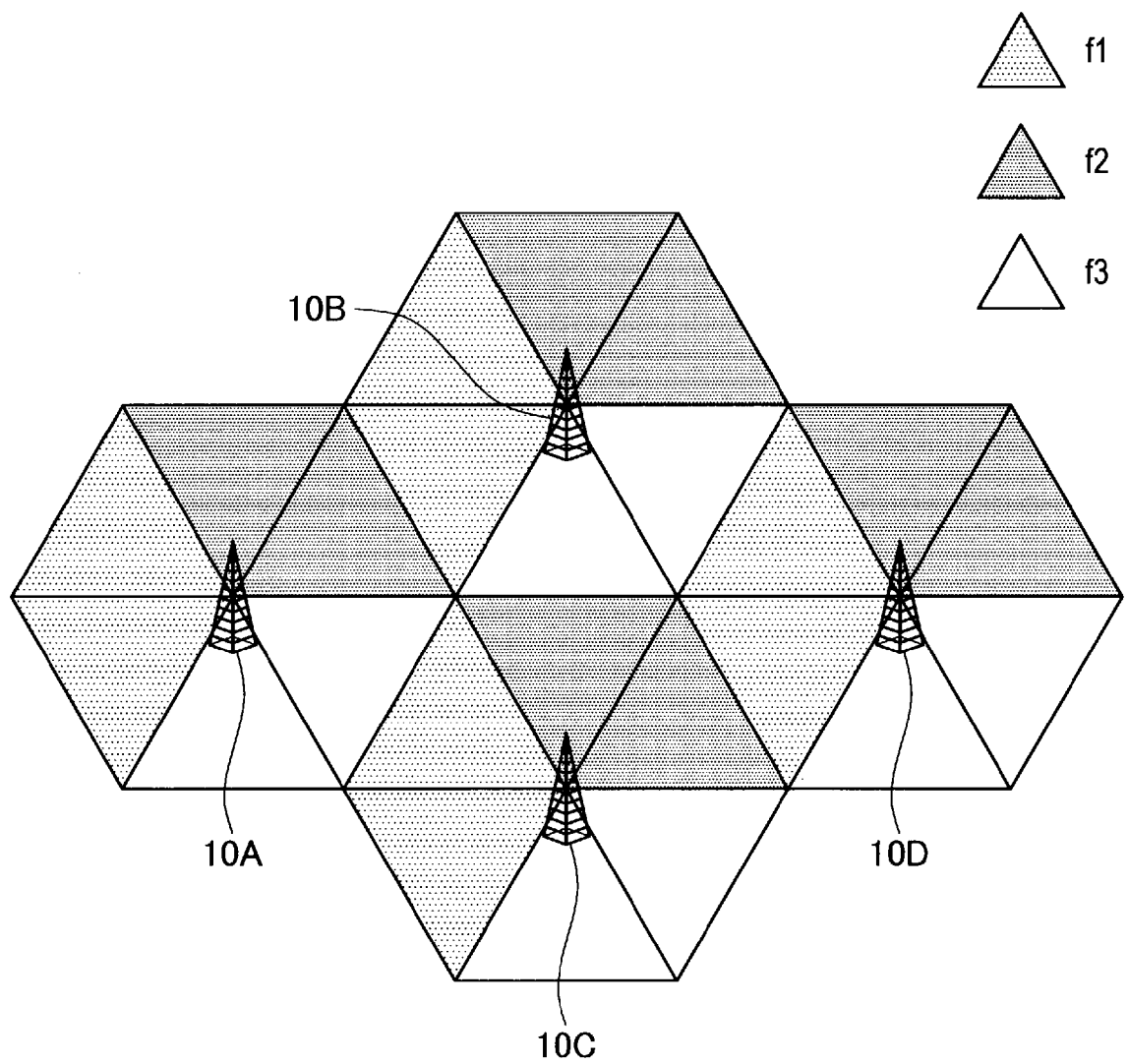
FIG. 8 is an explanatory view showing an example of frequency allocation in each cell.

FIG. 8 is an explanatory view showing an example of frequency allocation in each cell. In the case where each cell is made up of three sectors, frequencies f1 to f3 are allocated to the respective sectors as shown in FIG. 8, thereby suppressing the interference of frequencies at the cell boundary. Such allocation is particularly effective in a densely populated area with heavy traffic.

In LTE-A, in order to achieve end-to-end high-throughput, various novel techniques such as spectrum aggregation, network MIMO, uplink multi-user MIMO and relay technique are being studied. Therefore, with the advent of high-throughput novel mobile applications, there is a possibility that exhaustion of frequency resources appears as an issue in a suburban area also. Further, in the introduction of LTE-A, it is highly possible that the installation of the relay node 30 will be activated for the purpose of achieving infrastructure development at low costs.

2. Illustrative Configuration of Communication System

The basic configuration of the communication system 1 according to the embodiment is described above with reference to FIGS. 1 to 8. Hereinafter, an illustrative configuration of the communication system 1 according to the embodiment is described with reference to FIGS. 9 to 11.

(2-1. Configuration of User Equipment)

Figure 9:
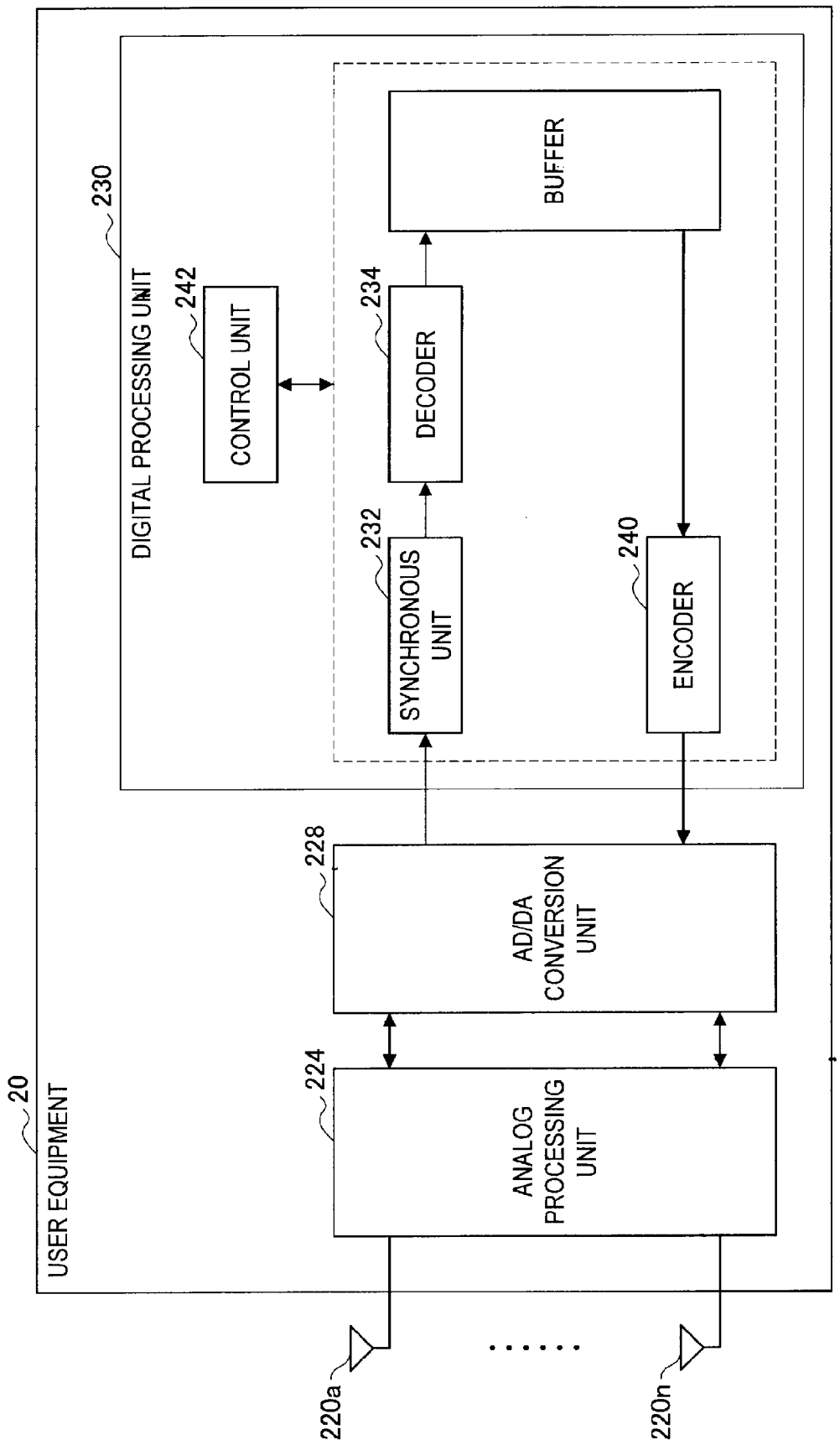
FIG. 9 is a functional block diagram showing a configuration of a user equipment.

FIG. 9 is a functional block diagram showing a configuration of the user equipment 20. Referring to FIG. 9, the user equipment 20 includes a plurality of antennas 220a to 220n, an analog processing unit 224, an AD/DA conversion unit 228, and a digital processing unit 230.

Each of the plurality of antennas 220a to 220n receives a radio signal from the base station 10 or the relay node 30, acquires an electrical high-frequency signal, and supplies the high-frequency signal to the analog processing unit 224. Further, each of the plurality of antennas 220a to 220n transmits a radio signal to the base station 10 or the relay node 30 based on a high-frequency signal supplied from the analog processing unit 224. With the plurality of antennas 220a to 220n, the user equipment 20 is capable of performing MIMO (Multiple-Input Multiple-Output) communication or diversity communication.

The analog processing unit 224 converts the high-frequency signal supplied from the plurality of antennas 220a to 220n into a baseband signal by performing analog processing such as amplification, filtering and down-conversion. Further, the analog processing unit 224 converts a baseband signal supplied from the AD/DA conversion unit 228 into a high-frequency signal.

The AD/DA conversion unit 228 converts the baseband signal supplied from the analog processing unit 224 from analog to digital and supplies the digital signal to the digital processing unit 230. Further, the AD/DA conversion unit 228 converts the baseband signal supplied from the digital processing unit 230 from digital to analog and supplies the analog signal to the analog processing unit 224.

The digital processing unit 230 includes a synchronous unit 232, a decoder 234, an encoder 240, and a control unit 242. The synchronous unit 232, the decoder 234, the encoder 240 and so on, together with the plurality of antennas 220a to 220n, the analog processing unit 224 and the AD/DA conversion unit 228, function as a communication unit for communicating with the base station 10 or the relay node 30.

A synchronous signal such as PSC or SSC transmitted from the base station 10 or the relay node 30 is supplied to the synchronous unit 232 from the AD/DA conversion unit 228, and the synchronous unit 232 performs synchronous processing of the radio frame based on the synchronous signal. Specifically, the synchronous unit 232 synchronizes the radio frame by calculating a correlation between the synchronous signal and a known sequence pattern and detecting a peak of the correlation.

The decoder 234 decodes the baseband signal supplied from the AD/DA conversion unit 228 and obtains received data. The decoding may include MIMO reception processing and OFDM demodulation processing, for example.

The encoder 240 encodes transmission data such as PUSCH and supplies the encoded data to the AD/DA conversion unit 228. The encoding may include MIMO transmission processing and OFDM modulation processing, for example.

The control unit 242 controls the overall operation in the user equipment 20, such as transmission processing, reception processing, and connection processing with the relay node 30 or the base station 10. For example, the user equipment 20 performs transmission processing and reception processing by using the resource block allocated by the base station 10 based on the control of the control unit 242. Note that the control unit 242 controls transmission processing in accordance with a transmission parameter specified by the base station 10 or the relay node 30. For example, when the base station 10 specifies a TPC (Transmit Power Control) parameter of the user equipment 20 by PDCCH, the control unit 242 controls transmission processing in accordance with the TPC parameter specified by the base station 10.

Further, when the base station 10 or the relay node 30 makes a request for CQI report to the user equipment 20 by PDCCH, the digital processing unit 230 measures channel quality (e.g. reception power) by using the demodulation reference transmitted from the base station 10 or the relay node 30. The control unit 242 generates CQI report based on the measurement result and supplies the generated CQI report to the encoder 240. Consequently, the CQI report is transmitted to the base station 10 or the relay node 30 by using PUSCH.

(2-2. Configuration of Relay Node)

A configuration of the relay node 30 is described hereinafter with reference to FIG. 10.

Figure 10:
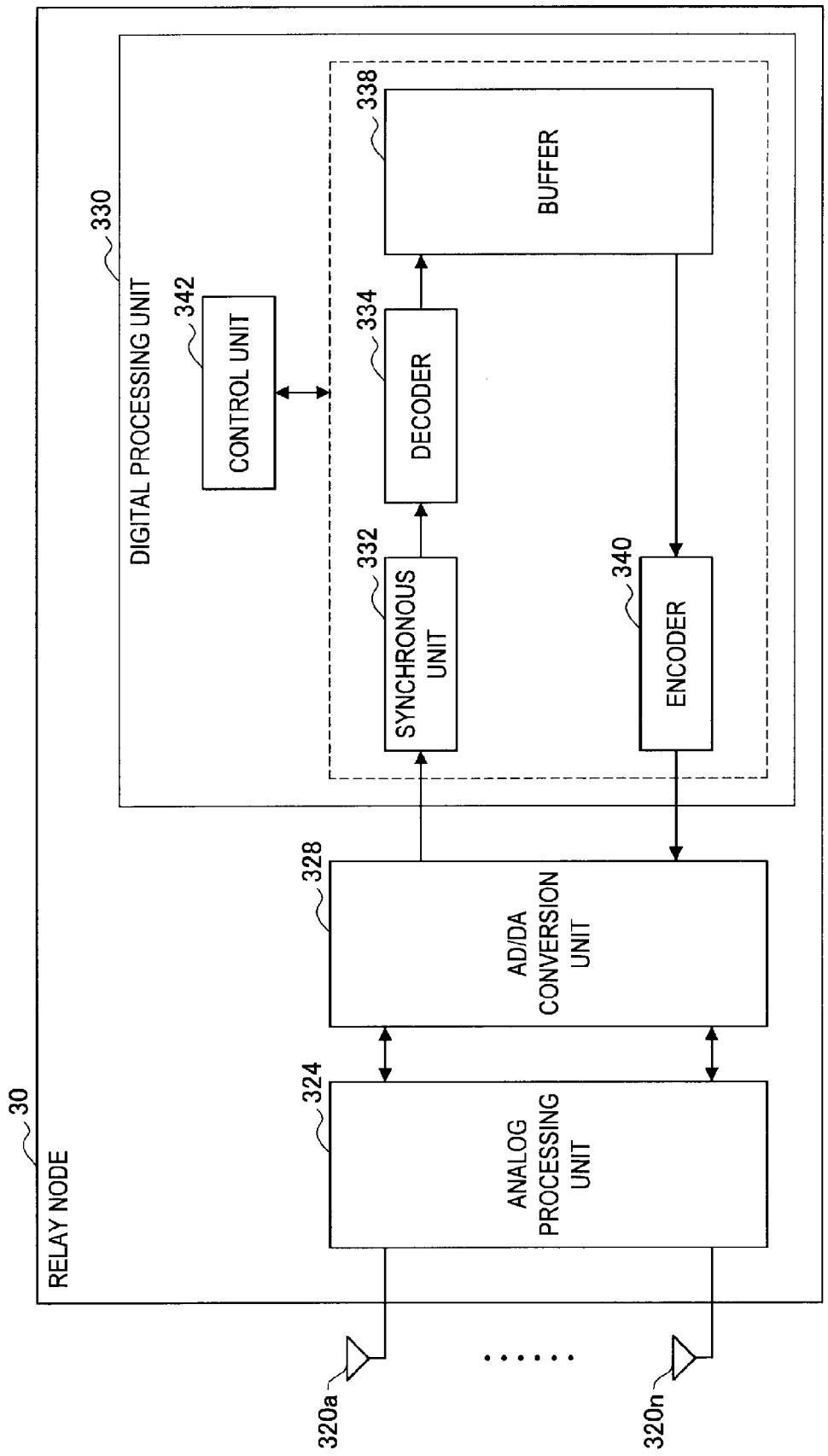
FIG. 10 is a functional block diagram showing a configuration of a relay node.

FIG. 10 is a functional block diagram showing a configuration of the relay node 30. Referring to FIG. 10, the relay node 30 includes a plurality of antennas 320a to 320n, an analog processing unit 324, an AD/DA conversion unit 328, and a digital processing unit 330.

Each of the plurality of antennas 320a to 320n receives a radio signal from the base station 10 or the user equipment 20, acquires an electrical high-frequency signal, and supplies the high-frequency signal to the analog processing unit 324. Further, each of the plurality of antennas 320a to 320n transmits a radio signal to the base station 10 or the user equipment 20 based on a high-frequency signal supplied from the analog processing unit 324. With the plurality of antennas 320a to 320n, the relay node 30 is capable of performing MIMO communication or diversity communication.

The analog processing unit 324 converts the high-frequency signal supplied from the plurality of antennas 320a to 320n into a baseband signal by performing analog processing such as amplification, filtering and down-conversion. Further, the analog processing unit 324 converts a baseband signal supplied from the AD/DA conversion unit 328 into a high-frequency signal.

The AD/DA conversion unit 328 converts the baseband signal supplied from the analog processing unit 324 from analog to digital and supplies the digital signal to the digital processing unit 330. Further, the AD/DA conversion unit 328 converts the baseband signal supplied from the digital processing unit 330 from digital to analog and supplies the analog signal to the analog processing unit 324.

The digital processing unit 330 includes a synchronous unit 332, a decoder 334, a buffer 338, an encoder 340, and a control unit 342. The synchronous unit 332, the decoder 334, the encoder 340 and so on, together with the plurality of antennas 320a to 320n, the analog processing unit 324 and the AD/DA conversion unit 328, function as a receiving unit, a transmitting unit, and a relay unit for communicating with the base station 10 or the user equipment 20.

A synchronous signal transmitted from the base station 10 is supplied to the synchronous unit 332 from the AD/DA conversion unit 328, and the synchronous unit 332 performs synchronous processing of the radio frame based on the synchronous signal. Specifically, the synchronous unit 332 synchronizes the radio frame by calculating a correlation between the synchronous signal and a known sequence pattern and detecting a peak of the correlation.

The decoder 334 decodes the baseband signal supplied from the AD/DA conversion unit 328 and obtains relay data with a destination to the base station 10 or the user equipment 20. The decoding may include MIMO reception processing, OFDM demodulation processing, error correction processing and so on, for example.

The buffer 338 temporarily stores relay data with a destination to the base station 10 or the user equipment 20 which is obtained by the decoder 334. Then, by the control of the control unit 342, the relay data with a destination to the user equipment 20 is read from the buffer 338 to the encoder 340 in the resource block for DL of the access link. Likewise, by the control of the control unit 342, the relay data with a destination to the base station 10 is read from the buffer 338 to the encoder 340 in the resource block for UL of the relay link.

The encoder 340 encodes the relay data supplied from the buffer 338 and supplies the encoded data to the AD/DA conversion unit 328. The encoding may include MIMO transmission processing and OFDM modulation processing, for example.

The control unit 342 controls the overall operation in the relay node 30, such as transmission processing, reception processing, and connection processing with the base station 10 or the user equipment 20. For example, the relay node 30 performs transmission processing and reception processing by using the resource block allocated by the base station 10 based on the control of the control unit 342.

The controllable range of the control unit 342 is selected by the base station 10. Specifically, the base station 10 selects one from control ranges A to C, and the control unit 342 controls communication in conformity with the control range selected by the base station 10. A selection criterion of the control range by the base station 10 and details of the control ranges A to C are described later. Although the case where the base station 10 selects the control range of the control unit 342 is particularly described in this specification, the selection of the control range of the control unit 342 may be performed by the management server 16.

(2-3. Configuration of Base Station)

Figure 11:
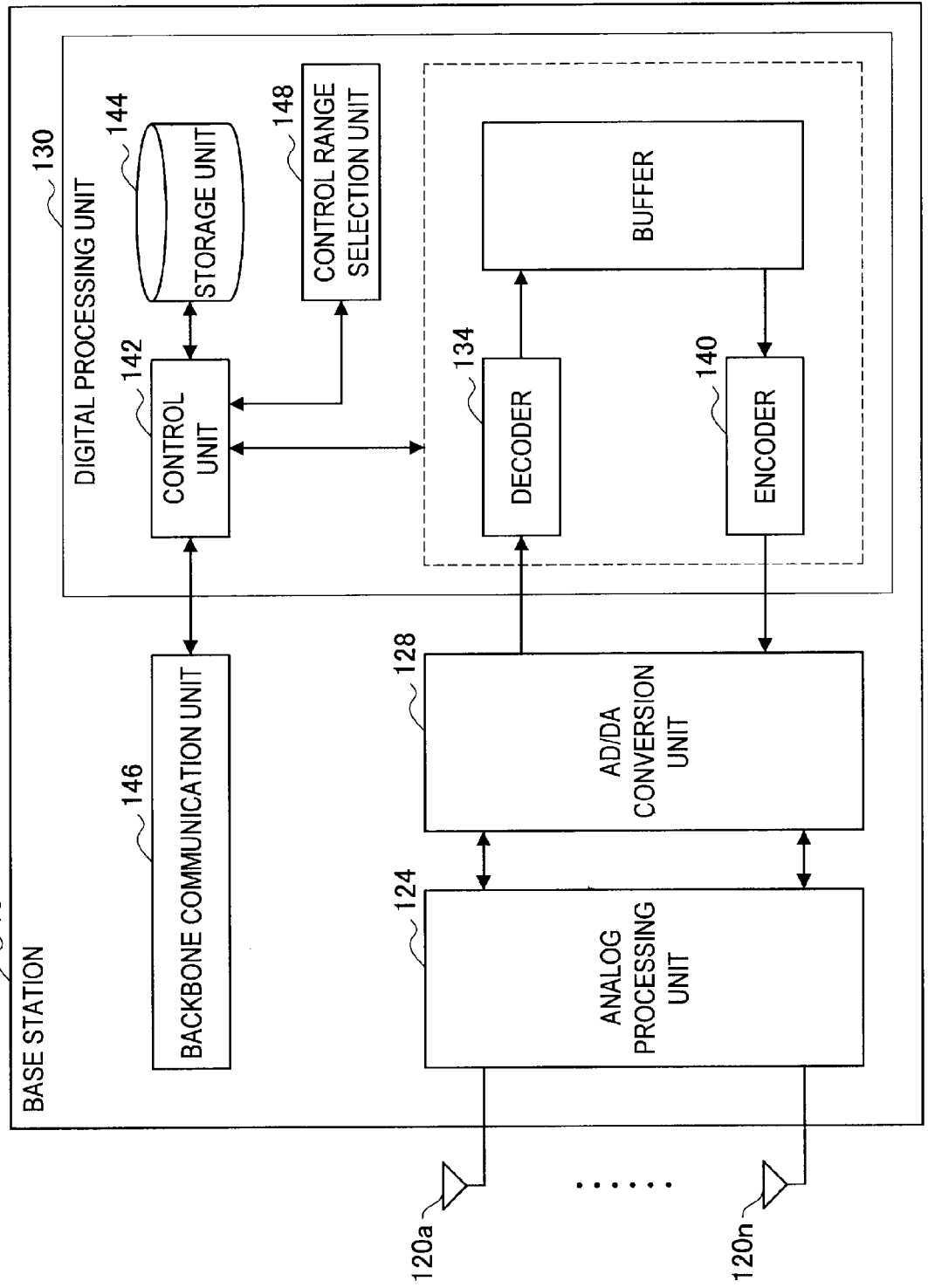
FIG. 11 is a functional block diagram showing a configuration of a base station.

FIG. 11 is a functional block diagram showing a configuration of the base station 10. Referring to FIG. 11, the base station 10 includes a plurality of antennas 120a to 120n, an analog processing unit 124, an AD/DA conversion unit 128, a digital processing unit 130, and a backbone communication unit 146.

Each of the plurality of antennas 120a to 120n receives a radio signal from the relay node 30 or the user equipment 20, acquires an electrical high-frequency signal, and supplies the high-frequency signal to the analog processing unit 124. Further, each of the plurality of antennas 120a to 120n transmits a radio signal to the relay node 30 or the user equipment 20 based on a high-frequency signal supplied from the analog processing unit 124. With the plurality of antennas 120a to 120n, the base station 10 is capable of performing MIMO communication or diversity communication.

The analog processing unit 124 converts the high-frequency signal supplied from the plurality of antennas 120a to 120n into a baseband signal by performing analog processing such as amplification, filtering and down-conversion. Further, the analog processing unit 124 converts a baseband signal supplied from the AD/DA conversion unit 128 into a high-frequency signal.

The AD/DA conversion unit 128 converts the baseband signal supplied from the analog processing unit 124 from analog to digital and supplies the digital signal to the digital processing unit 130. Further, the AD/DA conversion unit 128 converts the baseband signal supplied from the digital processing unit 130 from digital to analog and supplies the analog signal to the analog processing unit 124.

The digital processing unit 130 includes a decoder 134, an encoder 140, a control unit 142, a storage unit 144, and a control range selection unit 148. The decoder 134, the encoder 140 and so on, together with the plurality of antennas 120a to 120n, the analog processing unit 124 and the AD/DA conversion unit 128, function as a communication unit for communicating with the relay node 30 or the user equipment 20.

The decoder 134 decodes the baseband signal supplied from the AD/DA conversion unit 128 and obtains received data. The decoding may include MIMO reception processing, OFDM demodulation processing, error correction processing and so on, for example.

The encoder 140 encodes PDSCH, for example, and supplies the encoded PDSCH to the AD/DA conversion unit 128. The encoding may include MIMO transmission processing and OFDM modulation processing, for example.

The control unit 142 controls the overall communication in the cell formed by the base station 10, such as transmission processing, reception processing, connection processing with the relay node 30 or the user equipment 20, and management of scheduling information. For example, the control unit 142 makes scheduling of relay link communication between the base station 10 and the relay node 30 and access link communication between the relay node 30 and the user equipment 20.

Further, the control unit 142 stores management information indicating the status of the cell formed by the base station 10 into the storage unit 144. An example of the management information is as follows.

(1) Information related to the position of each relay node 30 and each user equipment 20 belonging to the base station 10

(2) ID, Qos class and scheduling information of each relay node 30 and each user equipment 20 belonging to the base station 10

(3) Communication quality information (e.g. CQI information, TPC information, or both) of each direct link, each relay link and each access link (4) Allowable interference level (e.g. a difference between necessary SNIR in the Qos base expected to each communication link and actually observed SINR) of each user equipment 20 belonging to the base station 10

The information related to the position of the relay node 30 may contain position information acquired by GPS, TA information indicating the distance between the base station 10 and the relay node 30, or information indicating the direction of the relay node 30. The direction of the relay node 30 can be acquired by algorithm estimating the arrival direction of a signal transmitted from the relay node 30 or performing directional reception. Likewise, the information related to the position of the user equipment 20 may contain position information acquired by GPS, TA information indicating the distance between the user equipment 20 and the relay node 30, or information indicating the direction of the user equipment 20.

The control range selection unit 148 selects a control range allowed to the relay node 30 that belongs to the base station 10 from a plurality of control ranges. For example, the plurality of control ranges include a control range A (first control range), a control range B (second control range) and a control range C (third control range). Hereinafter, the respective control ranges are briefly described, and a selection criterion of the control range is described after that.

The control range A includes control without the need for "addition" of extra resources by the relay node 30 (e.g. TPC, link adaptation in the range without the need for addition of resources), and does not include control with the need for change or setting of resources. Thus, in the case where the control range A is selected, a large part of the operation of the relay node 30 is controlled by the base station 10.

The control range B includes link adaptation in the range with the need for addition of resources, handover of the relay node 30, and handover of the user equipment 20 belonging to the relay node 30. Further, the control range C includes flexible resource scheduling to the user equipment 20 within the range of extra resources allocated by the base station 10 in addition to the control range B. The resource scheduling indicates the operation necessary for creating a link of a new connection candidate terminal. For example, in the case of the control range B, there is a case where the operation of handover request or acceptance is not sufficiently realized with the distributed amount of resources allocated to the control range B. In this case, measures such as further allocating extra resources to the handover destination or further allocating extra resources to the relay node 30 and changing the control range to the range C, for example, may be taken.

The control range selection unit 148 selects one of the above control ranges A to C in accordance with the traffic volume in the cell formed by the base station 10. For example, the control range selection unit 148 may select the control range B when the traffic volume is within a predetermined level, select the control range A when the traffic volume is higher than the predetermined level, and select the control range C when the traffic volume is lower than the predetermined level.

Specifically, the control range selection unit 148 may select the control range A when the traffic is congested and there are no available resources, select the control range B when the available resources are 30% or less, and select the control range C when the available resources are 30% or more.

Note that, when the control range A is selected, the control unit 142 allocates the minimum necessary resources to the relay node 30, and it preferentially allocates the resource of UL in order to deal with UL connection request from the user equipment 20.

Further, when the control range B is selected, the control unit 142 allocates the resources abundantly to the relay node 30. For example, if the amount of resources being used by the relay node 30 is "10", the control unit 142 may set the amount of resources allocated to the relay node 30 to "15". The relay node 30 can thereby instantaneously perform link adaptation for which new resources are necessary.

Further, when the control range C is selected, the control unit 142 allocates the extra resources to the relay node 30 according to the number of user equipments 20 belonging to the relay node 30. For example, the control unit 142 may allocate a larger number of extra resources to the relay node 30 to which a larger number of user equipments 20 belong. Specifically, when the amount of extra resources is "40", one user equipment 20 belongs to the relay node 30A, and three user equipments 20 belong to the relay node 30B, the control unit 142 may set the amount of extra resources allocated to the relay node 30A to "10" and set the amount of extra resources allocated to the relay node 30B to "30". The relay node 30 can thereby autonomously perform resource scheduling within the range of the allocated resources. In the case where access from the user equipment 20 is concentrated on a certain relay node 30, the control unit 142 may make the handover of the user equipment 20 to the base station 10 or another relay node 30 for load sharing.

Note that, although the case where the control range selection unit 148 selects the control range in accordance with the traffic volume is described above, the selection method is not limited thereto. For example, the control range selection unit 148 may select the control range dynamically based on one or a combination of various elements such as the load of the base station 10, power consumption, the number of user equipment 20, whether the relay node 30 is temporarily installed for an outdoor event, or relationship with another base station.

The backbone communication unit 146 communicates with the management server 16 through the backbone network 12. For example, the backbone communication unit 146 transmits information described in the above (1) to (4) stored in the storage unit 144 to the management server 16. At that time, regarding the above (2), the backbone communication unit 146 may further transmit reference counter information for detecting a deviation of synchronization between the base station 10 and another base station in consideration of the case where the base station 10 and another base station operate in an asynchronous manner.

As described above, the relay node 30 performs control in conformity with the control range selected by the base station 10. Therefore, the overall operation of the communication system varies with the control range of the relay node 30 selected by the base station 10. Thus, interference avoidance operation in the case where the control range A is selected and in the case where the control range B or the control range C is selected is described hereinafter in detail.

3. Control Range A

Central Control of Management Server

In the case where the base station 10 selects the control range A, substantially no autonomous operation is allowed to the relay node 30, and thus the management server 16 performs determination about the presence or absence of interference and direction of interference avoidance control. A configuration of the management server 16 is described hereinbelow. The embodiment is based on the following premises.

The relay node 30 uses the direct link and ends the step up to RRC connection complete with the base station 10 in the same procedure as the user equipment 20, and sub-cell ID, reference pattern allocation and so on are already determined.

The base station 10 and the relay node 30 belonging thereto are in synchronization.

Grouping information indicating the relay node 30 and the user equipment 20 belonging to the relay node 30 is supplied in advance from the base station 10 (the base station 10 determines the necessity of relay based on CQI report or TA information and allocates resources for relay when necessary).

Ptx_DL>>Ptx_RL and Ptx_AL (Ptx: maximum transmission power, DL: direct link (direct link between the base station 10 and the user equipment 20), AL: access link, RL: relay link)

measures against interference to the direct link, particularly the direct link of user equipment (LTE UE) that does not assume the existence of the relay node 30, are considered to be an important issue.

Figure 12:
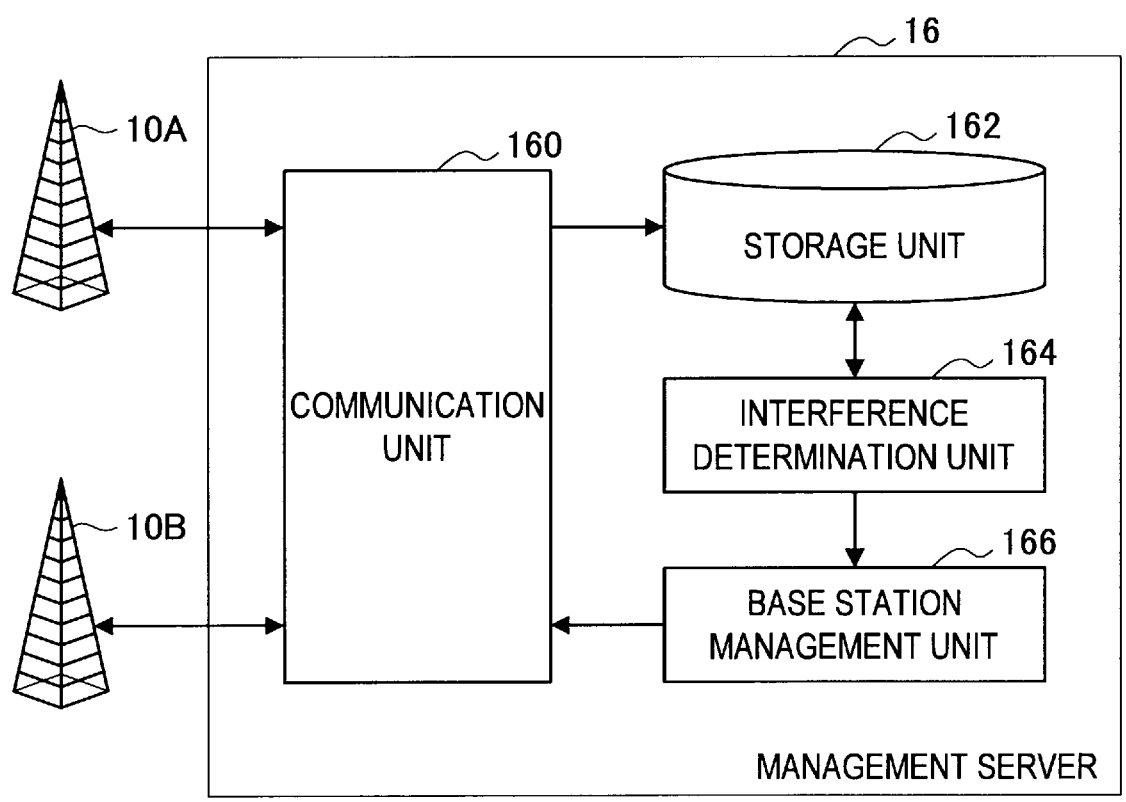
FIG. 12 is a functional block diagram showing a configuration of a management server.

FIG. 12 is a functional block diagram showing a configuration of the management server 16. Referring to FIG. 12, the management server 16 includes a communication unit 160, a storage unit 162, an interference determination unit 164, and a base station management unit 166. The function of the management server 16 may be implemented in one base station 10 for central control or may be implemented in a plurality of base stations 10 for autonomous control.

The communication unit 160 is connected to each base station 10 and has functions of a receiving unit that receives information from each base station 10 and a transmitting unit that transmits information to each base station 10. For example, the communication unit 160 receives the management information described in the above (1) to (4) from each base station 10. The management information received by the communication unit 160 is stored in the storage unit 162.

The interference determination unit 164 determines whether interference occurs in communication controlled by different base stations 10 by using a part or the whole of the management information described in the above (1) to (4). For example, the interference determination unit 164 may determine that interference occurs when the distance between the relay node 30 or the user equipment 20 belonging to a certain base station 10 and the relay node 30 or the user equipment 20 belonging to another base station 10 is equal to or shorter than a set value. Further, the interference determination unit 164 may determine that interference occurs when resources used by each of the pair whose distance is equal to or shorter than a set value overlap. Alternatively, the interference determination unit 164 may determine the presence or absence of interference based on information from the adjacent base station 10 or the adjacent relay node 30 obtained by measurement in the user equipment 20.

The base station management unit 166 allows the base station 10 which is determined by the interference determination unit 164 that no interference occurs to perform normal autonomous operation until the update of scheduling information, the update of the position of the user equipment 20 or the like or until the lapse of a predetermined report period. On the other hand, the base station management unit 166 directs the base station 10 that controls communication which is determined by the interference determination unit 164 that interference occurs to perform interference avoidance operation. Interference avoidance control is control that is likely to avoid interference or control that avoids interference under certain conditions. The interference avoidance control is described hereinbelow.

(Interference Avoidance Control)

When there is an available gap in the traffic of one base station 10 that controls communication which is determined that interference occurs, and resource scheduling of one base station 10 can be changed, the base station management unit 166 gives a direction to change the scheduling information of one base station 10 as the interference avoidance control. Specifically, the base station management unit 166 may change the resources allocated to communication determined that interference occurs to different resources in the scheduling information of one base station 10 and transmit the changed scheduling information to one base station 10. The base station management unit 166 may alternatively simply give a notification that a change has been made to the scheduling information. At this point, the base station management unit 166 changes not only the scheduling information of communication between one base station 10 and the relay node 30 but also the scheduling information of communication between the relay node 30 and the user equipment 20.

Further, the base station management unit 166 may allocate resources to the user equipment 20 by avoiding the resource block or the subcarrier with a large interference component in the user equipment 20. This is described hereinafter together with the overview of OFDMA.

In OFDMA, the adjacent base stations perform communication by using carriers of the same center frequency in a densely populated area. At this time, for communication with the user equipment located at the cell edge where the coverages of a plurality of base stations overlap, the plurality of base stations avoid interference by using sub-carriers orthogonal to each other or different time slots to thereby make effective use of the limited resources. On the other hand, in an area which is not densely populated, different orthogonal subcarriers are fixedly allocated to each base station in advance because there are often sufficient resources available.

In this manner, in the case where the adjacent base stations manage the adjacent cells by using the subcarriers orthogonal to each other, the out-of-band power overlaps the sub-carries at their edges due to a frequency deviation by various causes (e.g. the effect of Doppler frequency etc.), which causes interference. Therefore, frequency allocation or out-of-band filtering is important.

Alternatively, in the case where the adjacent base stations manage the adjacent cells by allocating time slots, it is important to adjust transmission timing in such a way that the boundaries of the time slots are orthogonal to each other (at least, so as to be within the guard interval (GI) of the head symbol) based on accurate propagation delay to the user equipment located at the cell edge.

The effect of frequency-selective fading is described hereinafter with reference to FIGS. 13 and 14.

Figure 13:
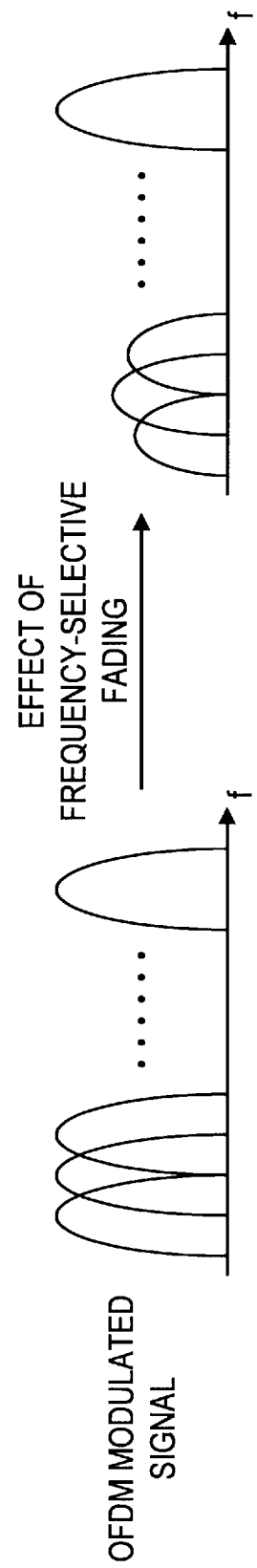
FIG. 13 is an explanatory view showing the effect of frequency-selective fading.
Figure 14:
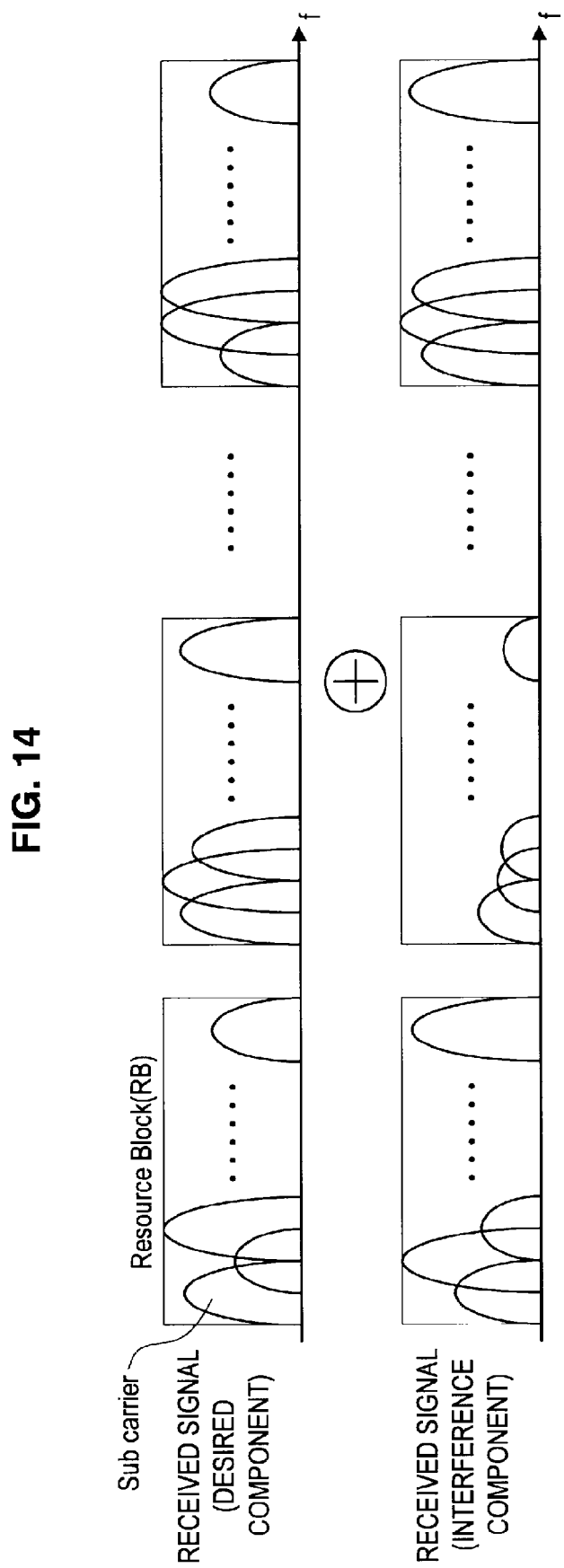
FIG. 14 is an explanatory view showing the effect of frequency-selective fading.

FIGS. 13 and 14 are explanatory views showing the effect of frequency-selective fading. As shown in FIG. 13, in an OFDM modulated signal, while the transmission power of the respective subcarries is the same at the time of transmission, the reception power of the respective subcarries is different at the time of reception due to the effect of frequency-selective fading. Further, as shown in FIG. 14, the size of the interference component differs in each resource block.

Thus, in the case where the base station management unit 166 can recognize the size of the interference component in the user equipment 20 with respect to each resource block, it is possible to avoid interference by allocating resources to the user equipment 20 by avoiding the resource block with a large interference component. Further, in the case where the base station management unit 166 can recognize the size of the interference component with respect to each subcarrier, it is possible to avoid interference by avoiding the use of the subcarrier with a large interference component in the resource block or reducing the modulation scheme.

Note that the base station management unit 166 may notify communication determined that interference occurs to one base station 10 and prompt one base station 10 to change the scheduling information, without changing the scheduling information by itself.

Further, the base station management unit 166 may direct the handover of the relay node 30 or the user equipment 20 belonging to one base station 10 that controls communication determined that interference occurs to another base station 10 or the relay node 30 belonging to another base station 10 as the interference avoidance control. Note that the base station management unit 166 may be based on the premise that there are extra resources for accepting the handover in another base station 10 or the relay node 30 belonging to another base station 10.

For example, when it is determined that interference is avoidable by making the handover of the relay node 30 belonging to one base station 10 to another base station 10, the base station management unit 166 directs one base station 10 to make the handover. At this time, the base station management unit 166 notifies ID of the handover destination base station 10, information for connection or the like to the base station 10. In response thereto, a series of operations for the handover are performed. The information for connection may be the relative distance from the handover destination base station 10, information indicating the resource block or the subcarrier with a large interference component described above or the like. Hereinafter, a normal handover procedure or the like is described, and a flow of the handover of the relay node 30 according to the embodiment is specifically described after that with reference to FIGS. 15 to 18.

Figure 15:
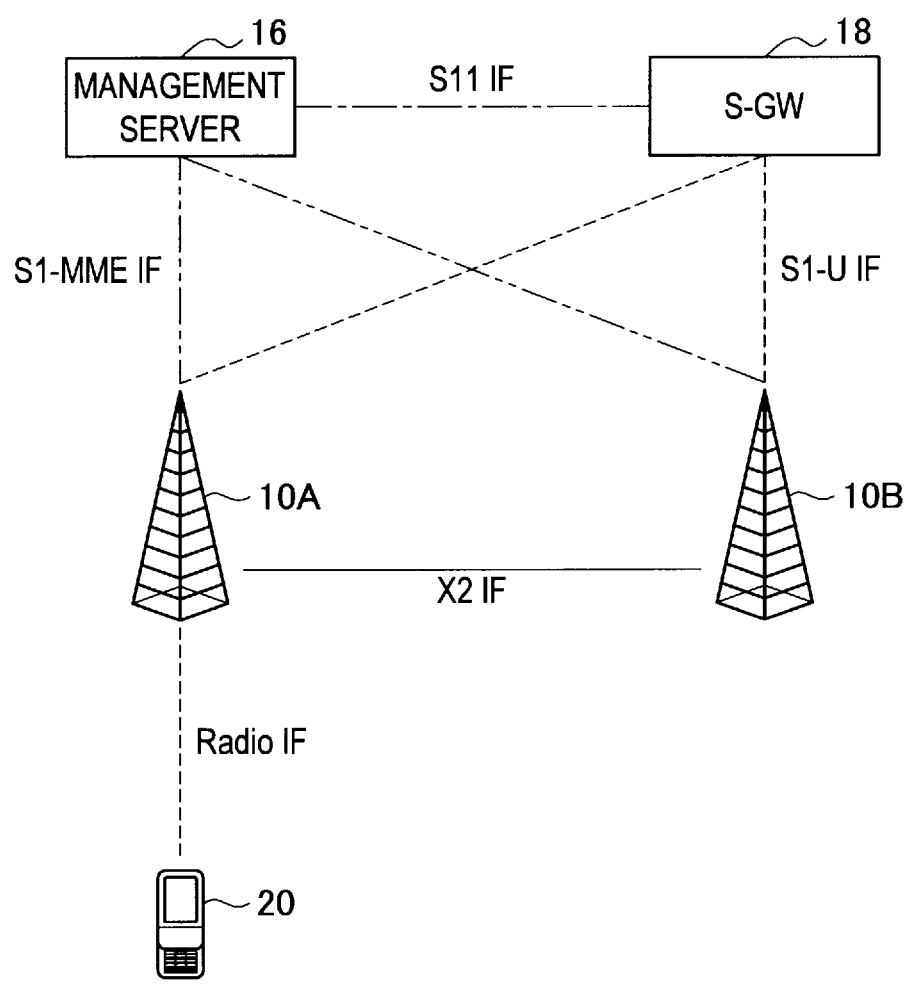
FIG. 15 is an explanatory view showing LTE network architecture.

FIG. 15 is an explanatory view showing LTE network architecture. Referring to FIG. 15, an LTE network includes a S-GW (Serving GW) 18 that manages user data in addition to the management server 16 that functions as MME and the base stations 10. Handover between the base stations in such network architecture is performed in the procedure shown in FIG. 16.

Figure 16:
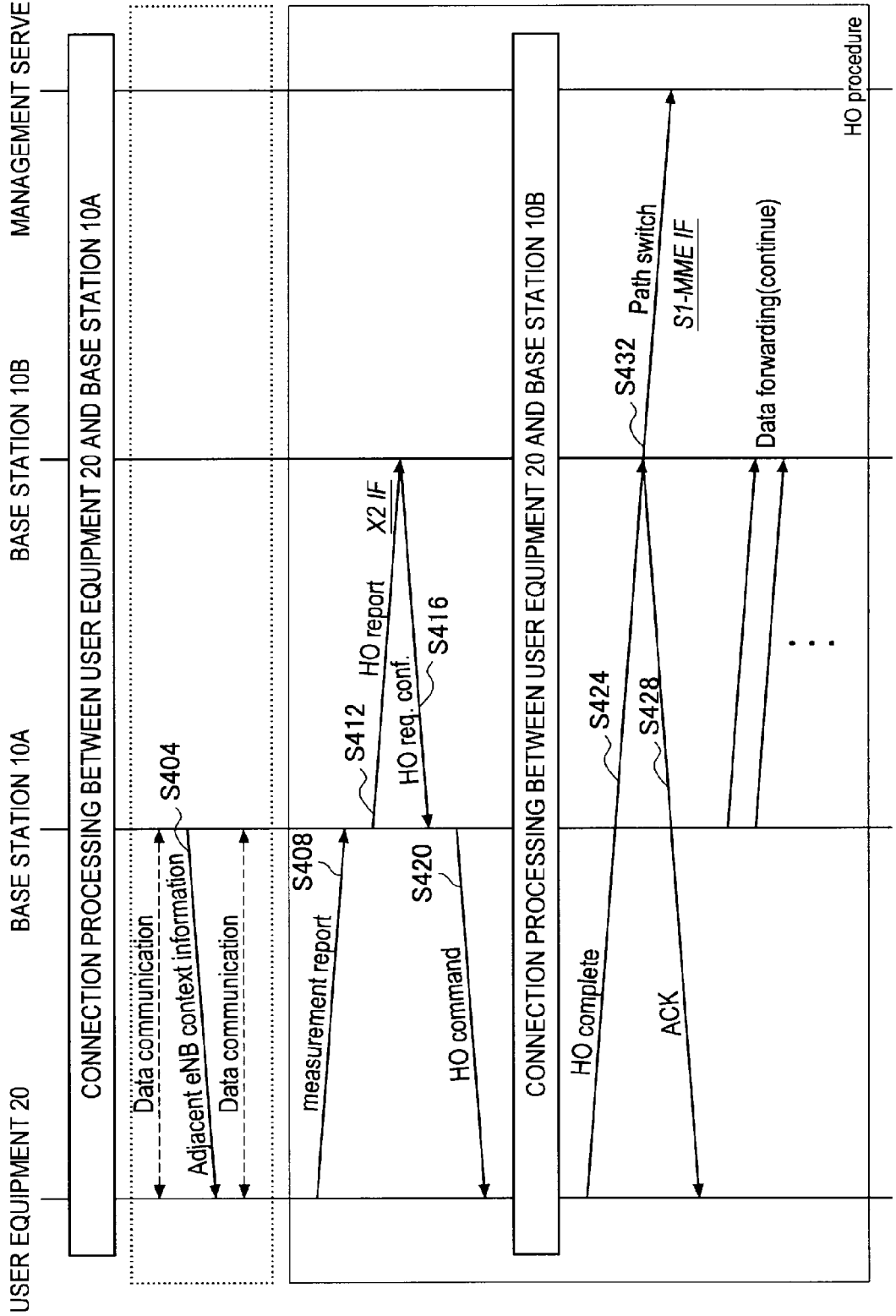
FIG. 16 is an explanatory view showing a procedure of handover between base stations.

FIG. 16 is an explanatory view showing a procedure of handover between base stations. Referring to FIG. 16, in the case where the user equipment 20 and the base station 10A are connected, the base station 10A transmits context information (Adjacent eNB context information) indicating a target to be measured such as the adjacent base station 10B to the user equipment 20 (S404). After that, the user equipment 20 measures the radio field intensity or the like of signals transmitted from the base station 10B or the like according to the context information while communicating with the base station 10A. Then, the user equipment 20 reports measurement information (measurement report) to the base station 10A at given intervals or under a given rule (S408). The steps S404 and S408 may be omitted in the case where the base station 10A makes the handover of the user equipment 20 by compulsory decision on the network side.

After that, the base station 10A requests the base station 10B to accept the handover of the user equipment 20 (S412), and if the acceptance is granted by the base station 10B (S416), the base station 10A gives a command to execute the handover to the user equipment 20 (S420). Then, the user equipment 20 performs connection processing with the base station 10B and then notifies that it is prepared for the handover to the base station 10B (S424). In response to the notification, the base station 10B sends ACK back (S428) and reports that the handover of the user equipment 20 is made to the base station 10B to the management server 16/the S-GW 18 (S432).

Although the case where the network side such as the management server 16 or the S-GW 18 makes determination about execution of handover based on the measurement information measured in the user equipment 20 (the case where the user equipment 20 cooperates) is described above, a trigger of handover is not limited thereto. For example, handover may be made based on compulsory decision on the network side such as the management server 16 or the S-GW 18. Further, the user equipment 20 may take the initiative to make handover by selecting the base station 10 according to measurement information and performing connection processing. Further, the management server 16 may be physically placed to manage a plurality of base stations 10 (eNB) such as MME or S-GW, or the management server 16 may be assumed to be included in the base station 10 and information may be exchanged logically with use of X2 IF between a plurality of base stations 10.

In LTE-A, coordinated transmission between base stations called CoMP (Coordinated Multipoint Transmission and Reception) has been studied, and each IF (S11 IF, S1-MME IF, S1-U IF) is enhanced, and it is thus likely that management is made as if one user equipment 20 belongs to a plurality of base stations 10.

Further, at present, a management method of link management such as handover in consideration of the existence of the relay node 30 is not specifically discussed. Thus, in the following description, a flow up to connection of the relay node 30 is described, and a handover procedure of the relay node 30 is described after that. It is assumed in the following description that the management server 16 has the function of the S-GW 18 also.

Figure 17:
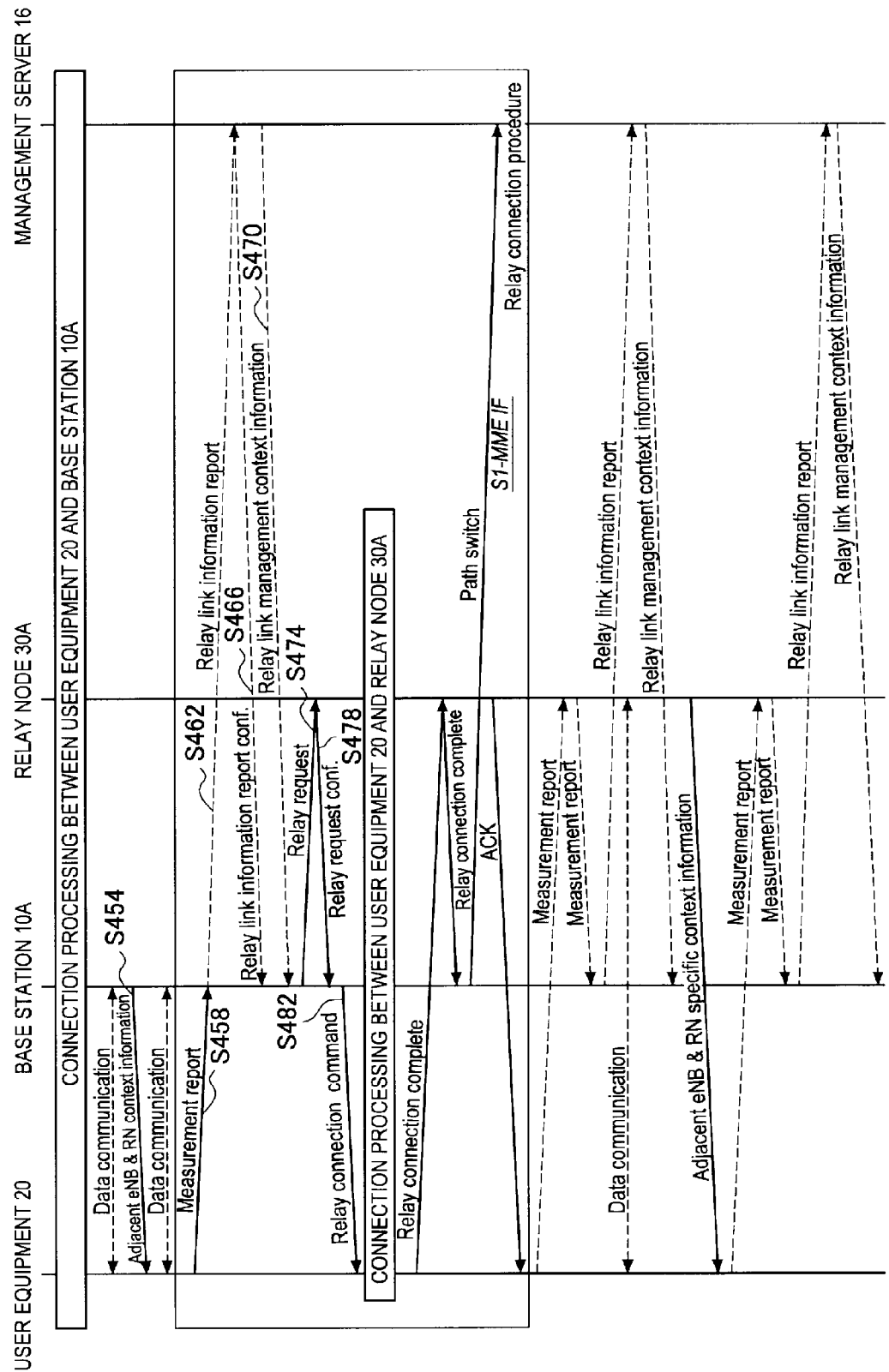
FIG. 17 is a sequence chart showing a connection procedure between a user equipment and a relay node.

FIG. 17 is a sequence chart showing a connection procedure between the user equipment 20 and the relay node 30. Referring to FIG. 17, in the case where the user equipment 20 and the base station 10A are connected, the base station 10A transmits context information (Adjacent eNB & RN context information) indicating a target to be measured such as the adjacent base station or the nearby relay node 30 to the user equipment 20 (S454). After that, the user equipment 20 measures the radio field intensity or the like of signals transmitted from the relay node 30A or the like according to the context information while communicating with the base station 10A. Then, the user equipment 20 reports measurement information to the base station 10A at given intervals or under a given rule (S458).

After that, the base station 10A reports measurement information (Relay link information report) of the nearby relay node 30 to the management server 16 (S462). Note that the base station 10A may also transmit measurement information of the adjacent base station. Then, the management server 16 transmits confirmation for the measurement information to the base station 10A (S466). Further, the management server 16 determines information for making a connection from the user equipment 20 to the relay node 30 (e.g. ID of the relay node 30 to be connected) and transmits the information to the base station 10A (S470). Then, the base station 10A makes a relay request for the target relay node 30 (the relay node 30A in the example of FIG. 17) based on the information received from the management server 16 (S474).

Then, when the relay node 30A transmits confirmation for the relay request to the base station 10A (S478), the base station 10A gives a command for connection with the relay node 30A to the user equipment 20 (S482). At this point, the base station 10A may notify ID (sub-cell ID) of the relay node 30A recommended for connection. Connection processing between the user equipment 20 and the relay node 30A is thereby performed, so that the user equipment 20 can communicate with the base station 10A through the relay node 30A. Note that, in the case of autonomous operation or distributed operation without the need for the management server 16, the steps S462, S466 and S470 may be omitted. Further, although the case where the Adjacent eNB & RN specific context information is transmitted from the relay node 30A is shown in FIG. 17, it may be transmitted directly from the base station 10A to the user equipment 20.

Figure 18:
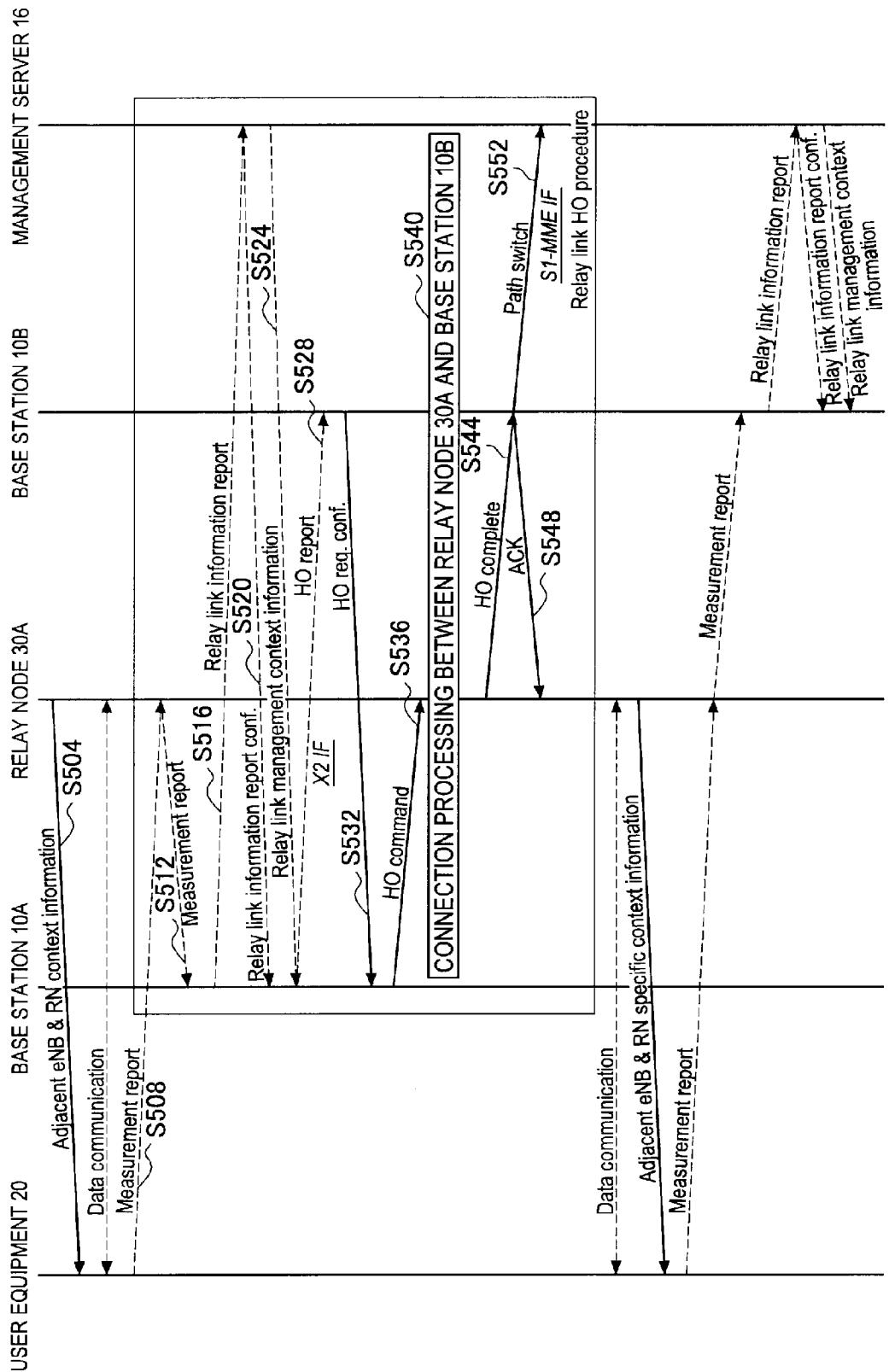
FIG. 18 is a sequence chart showing a handover procedure of a relay node.

FIG. 18 is a sequence chart showing a handover procedure of the relay node 30. In the example shown in FIG. 18, the user equipment 20 is connected to the relay node 30A that belongs to the base station 10A. In this case, the relay node 30A transmits context information (Adjacent eNB & RN context information) indicating a target to be measured such as the adjacent base station or the nearby relay node 30 to the user equipment 20 (S504). After that, the user equipment 20 measures the radio field intensity or the like of signals transmitted from the base station 10B or the like according to the context information while communicating with the relay node 30A. Then, the user equipment 20 reports measurement information to the base station 10A through the relay node 30A (S508, S512).

The measurement information may include interfered subcarrier, resource block, center frequency or bandwidth, interference node ID, link ID (ID indicating one of direct link, access link and relay link), interference level with respect to each subcarrier or resource block, or SINR level or the like.

After that, the base station 10A reports measurement information (Relay link information report) to the management server 16 (S516), and the management server 16 transmits confirmation for the measurement information to the base station 10A (S520). Then, if the management server 16 determines that communication by the relay node 30A interferes with other communication based on the reported measurement information or other various kinds of information, the management server 16 transmits link management information related to interference avoidance control to the base station 10A (S524). The information related to interference avoidance control may be ID of a relay node that performs communication interfering with the relay node 30A, use channel, maximum transmission power, position information, scheduling information or the like.

The base station 10A requests the base station 10B to accept the handover of the relay node 30A based on the link management information related to interference avoidance control which is received from the management server 16 (S528), and if the acceptance is granted by the base station 10B (S532), the base station 10A gives a command to execute the handover to the relay node 30A (S536). Then, the relay node 30A performs connection processing with the base station 10B (S540) and then notifies that it is prepared for the handover to the base station 10B (S544). In response to the notification, the base station 10B sends ACK back (S548) and reports that the handover of the relay node 30A is made to the base station 10B to the management server 16 (S552).

The relay node 30A may be in the state of multilink connection with a connection to both the base station 10A and the base station 10B. In this case, the relay node 30A may switch the relay link to the base station 10B only during relay communication of the access link of the user equipment 20. As a result, the user equipment 20 belongs to the base station 10B, and thus the base station 10B can control the interference avoidance between user equipments belonging to the base station 10B which includes the user equipment 20 in a unified manner.

Note that the relay node 30 may generate a signal to the management server 16 in compliance with S1-MMEIF or S1-UIF format and transmits the signal by radio to the base station 10. In this case, the base station 10 can make tunneling of the signal received from the relay node 30 to the management server 16. The connection between the relay node 30 and the management server 16 thereby becomes equivalent to direct connection, which makes central control by the management server 16 more efficient. Further, although the case where the Measurement report is transmitted from the user equipment 20 to the relay node 30A in S508 is shown in FIG. 18, the Measurement report may be transmitted directly from the user equipment 20 to the base station 10A. Likewise, although the case where the Measurement report transmitted from the user equipment 20 is transmitted to the base station 10B by the relay node 30A is shown in the lower part of FIG. 18, the Measurement report may be transmitted directly from the user equipment 20 to the base station 10B. Further, although the case where the Adjacent eNB & RN specific context information is transmitted from the relay node 30A is shown in FIG. 18, it may be transmitted directly from the base station 10A to the user equipment 20.

Further, as another example of handover, when the management server 16 determines that interference is avoidable by making the handover of the user equipment 20 belonging to the base station 10 to another relay node 30 belonging to the same base station 10, the base station management unit 166 directs the base station 10 to make the handover. At this time, the base station management unit 166 notifies ID of the handover destination relay node 30, information for connection or the like to the base station 10. In response thereto, a series of operations for the handover are performed. A flow of the handover of the user equipment 20 is specifically described hereinafter with reference to FIG. 19.

Figure 19:
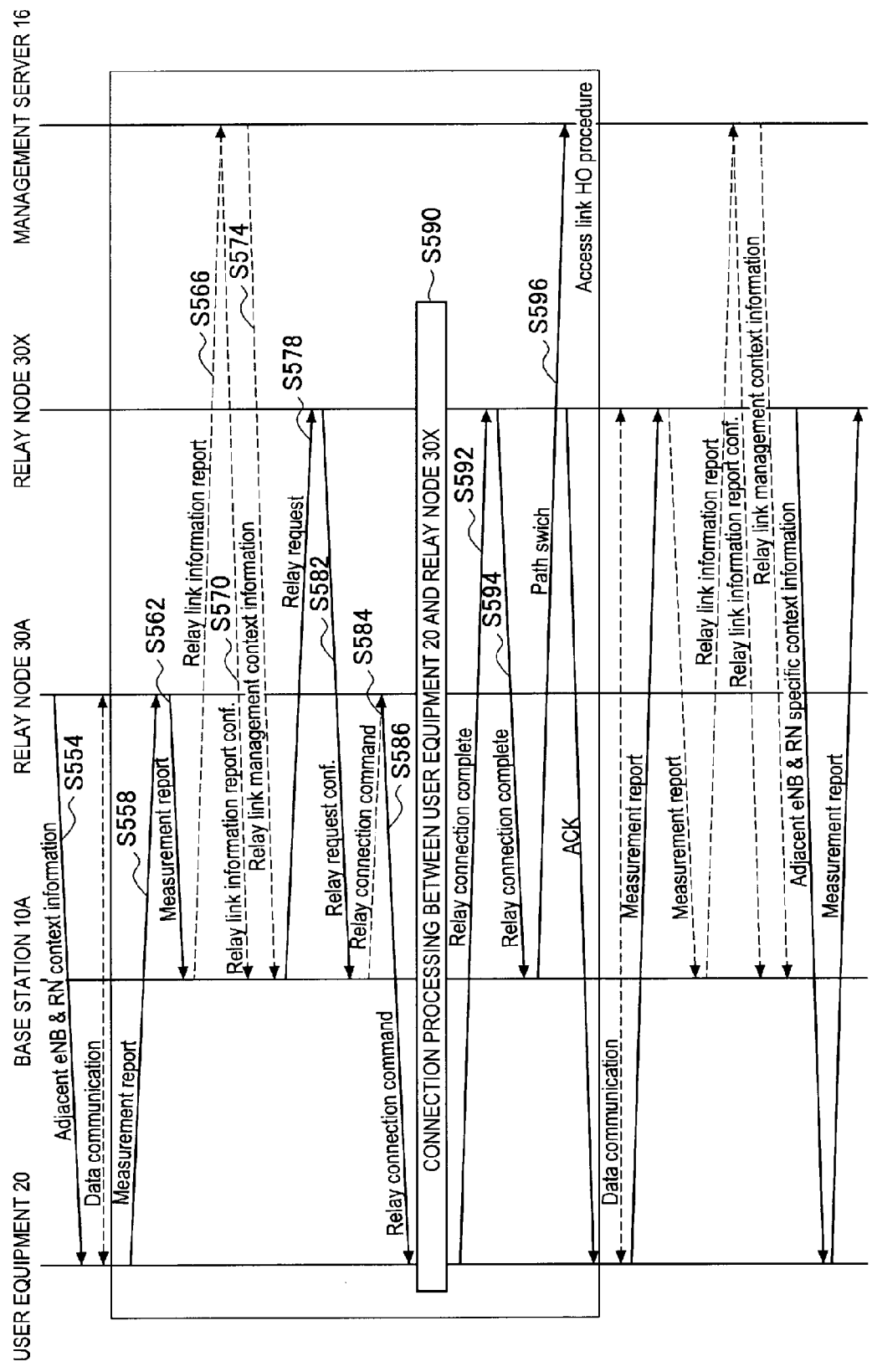
FIG. 19 is a sequence chart showing a handover procedure of a user equipment.

FIG. 19 is a sequence chart showing a handover procedure of the user equipment 20. In the example shown in FIG. 19, the relay nodes 30A and 30X belong to the base station 10A, and the user equipment 20 is connected to the relay node 30A.

The processing in the steps S554 to S570 in FIG. 19 is substantially the same as the processing in the steps S504 to S520 in FIG. 18, and detailed explanation thereof is thus omitted.

If the management server 16 determines that interference of communication by the user equipment 20 can be solved by making the handover of the user equipment 20 to the relay node 30X based on the measurement information received from the base station 10A in S566 or other various kinds of information, the management server 16 gives a command to execute the handover of the user equipment 20 to the relay node 30X by link management information (S574).

The base station 10A requests the relay node 30x to accept the handover of the user equipment 20 based on the link management information received from the management server 16 (S578), and if the acceptance is granted by the relay node 30X(S582), the base station 10A gives a command to execute the handover to the user equipment 20 through the relay node 30A (S584, S586). Then, the user equipment 20 performs connection processing with the relay node 30X (S590) and then notifies that it is prepared for the handover to the base station 10A through the relay node 30X(S592, S594). Then, the base station 10A reports that the handover of the user equipment 20 is made to the relay node 30x to the management server 16 (S596). Note that, although the case where the Adjacent eNB & RN specific context information is transmitted from the relay node 30A is shown in FIG. 19, it may be transmitted directly from the base station 10A to the user equipment 20. Further, although the case where the Measurement report is transmitted from the user equipment 20 to the relay node 30A in S558 is shown in FIG. 19, the Measurement report may be transmitted directly from the user equipment 20 to the base station 10A. Furthermore, the steps S566, S570 and S574 may be omitted. Further, the Relay connection command in S586 may be transmitted directly from the base station 10A to the user equipment 20. Furthermore, although the case where the Measurement report transmitted from the user equipment 20 is relayed to the base station 10A by the relay node 30X is shown in FIG. 19, the Measurement report may be transmitted directly from the user equipment 20 to the base station 10A. Further, the Adjacent eNB & RN specific context information may be transmitted not from the relay node 30X but from the base station 10A.

Further, as another example of handover, when it is determined that interference is avoidable by making the handover of the user equipment 20 belonging to one base station 10 to the relay node 30 belonging to another base station 10, the base station management unit 166 directs one base station 10 to make the handover. At this time, the base station management unit 166 notifies ID of the handover destination relay node 30, information for connection or the like to the base station 10. In response thereto, a series of operations for the handover are performed. A flow of the handover of the user equipment 20 is specifically described hereinafter with reference to FIG. 20.

Figure 20:
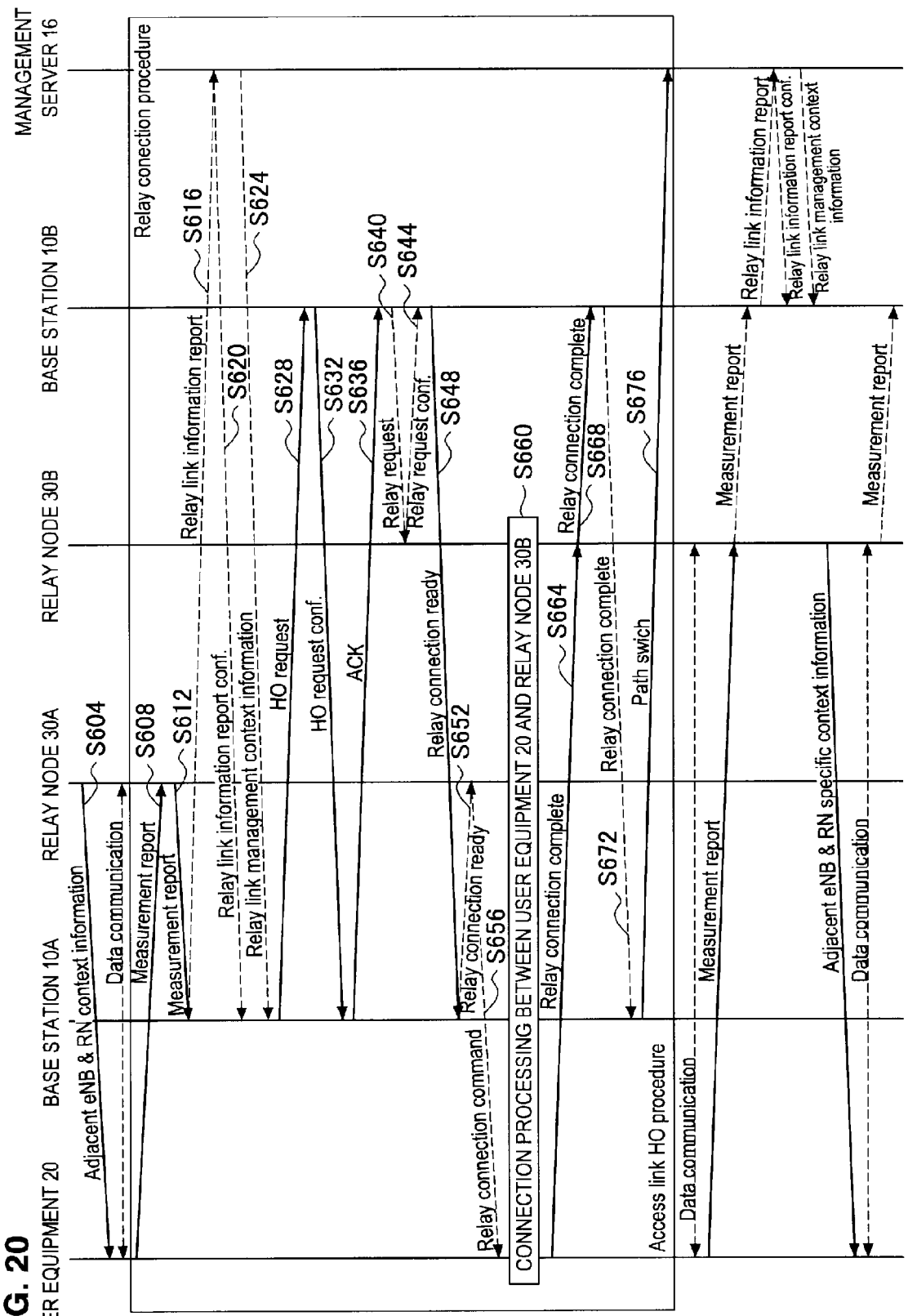
FIG. 20 is a sequence chart showing a handover procedure of a user equipment.

FIG. 20 is a sequence chart showing a handover procedure of the user equipment 20. In the example shown in FIG. 20, the relay node 30A belongs to the base station 10A, the relay node 30B belongs to the base station 10B, and the user equipment 20 is connected to the relay node 30A. The processing in the steps S604 to S620 in FIG. 20 is substantially the same as the processing in the steps S504 to S520 in FIG. 18, and detailed explanation thereof is thus omitted.

If the management server 16 determines that communication by the user equipment 20 interferes with communication by the relay node 30B based on the measurement information received from the base station 10A in S616 or other various kinds of information, the management server 16 gives a command to execute the handover of the user equipment 20 to the relay node 30B by link management information (S624).

The base station 10A requests the base station 10B to accept the handover of the user equipment 20 to the relay node 30B based on the link management information received from the management server 16 (S628), and if the acceptance is granted by the base station 10B (S632), the base station 10A sends ACK back (S636).

After that, the base station 10B makes inquiries about whether the handover is acceptable to the relay node 30B (S640). If the relay node 30B can accept the handover (S644), the base station 10B notifies that the relay node 30B can accept the handover to the relay node 30A through the base station 10A (S648, S652). Thus, the notification is not transmitted when the traffic of the relay node 30B is congested or when there are no extra resources.

Then, when the relay node 30A gives a command for connection with the relay node 30B to the user equipment 20 (S656), the user equipment 20 performs connection processing with the relay node 30B (S660) and then notifies that it is prepared for the handover to the relay node 30B (S664). Then, the relay node 30B transmits the notification to the base station 10B (S668), and the base station 10B transmits it to the base station 10A (S672). The base station 10A then reports that the handover of the user equipment 20 is made to the relay node 30B to the management server 16 (S676). Note that, although the case where the Adjacent eNB & RN specific context information is transmitted from the relay node 30A is shown in FIG. 20, it may be transmitted directly from the base station 10A to the user equipment 20. Further, although the case where the Measurement report is transmitted from the user equipment 20 to the relay node 30A in S608 is shown in FIG. 20, the Measurement report may be transmitted directly from the user equipment 20 to the base station 10A. Furthermore, the Relay connection command in S652 may be transmitted directly from the base station 10A to the user equipment 20.

On the other hand, when the traffic of one base station 10 that controls communication which is determined that interference occurs is too congested to change the scheduling information, the base station management unit 166 may direct one base station 10 to inhibit the use of the relay node 30 that causes the interference as the interference avoidance control. For example, when the resources allocated to the relay nodes 30 belonging to the different adjacent base station 10 overlap or when the user equipment 20 belonging to the different adjacent base stations 10 exist between the base stations 10, the use of the relay node 30 is inhibited.

Alternatively, when it is determined that interference is avoidable by adjusting a control parameter based on information related to the position received from each base station 10 or scheduling information, the base station management unit 166 may determine a control parameter of communication controlled by one base station 10 and give a direction to use the determined control parameter as the interference avoidance control. The control parameter may be a parameter related to transmission power, beamforming, transmission timing, change in guard interval, insertion of a non-transmission period or the like. Given the direction for the control parameter from the management server 16, the base station 10 notifies the control parameter to the relay node 30. Then, the relay node 30 performs communication of the relay link and the access link according to the control parameter determined by the management server 16. An illustrative example of determination of the control parameter is described hereinafter with reference to the drawings.

Figure 21:
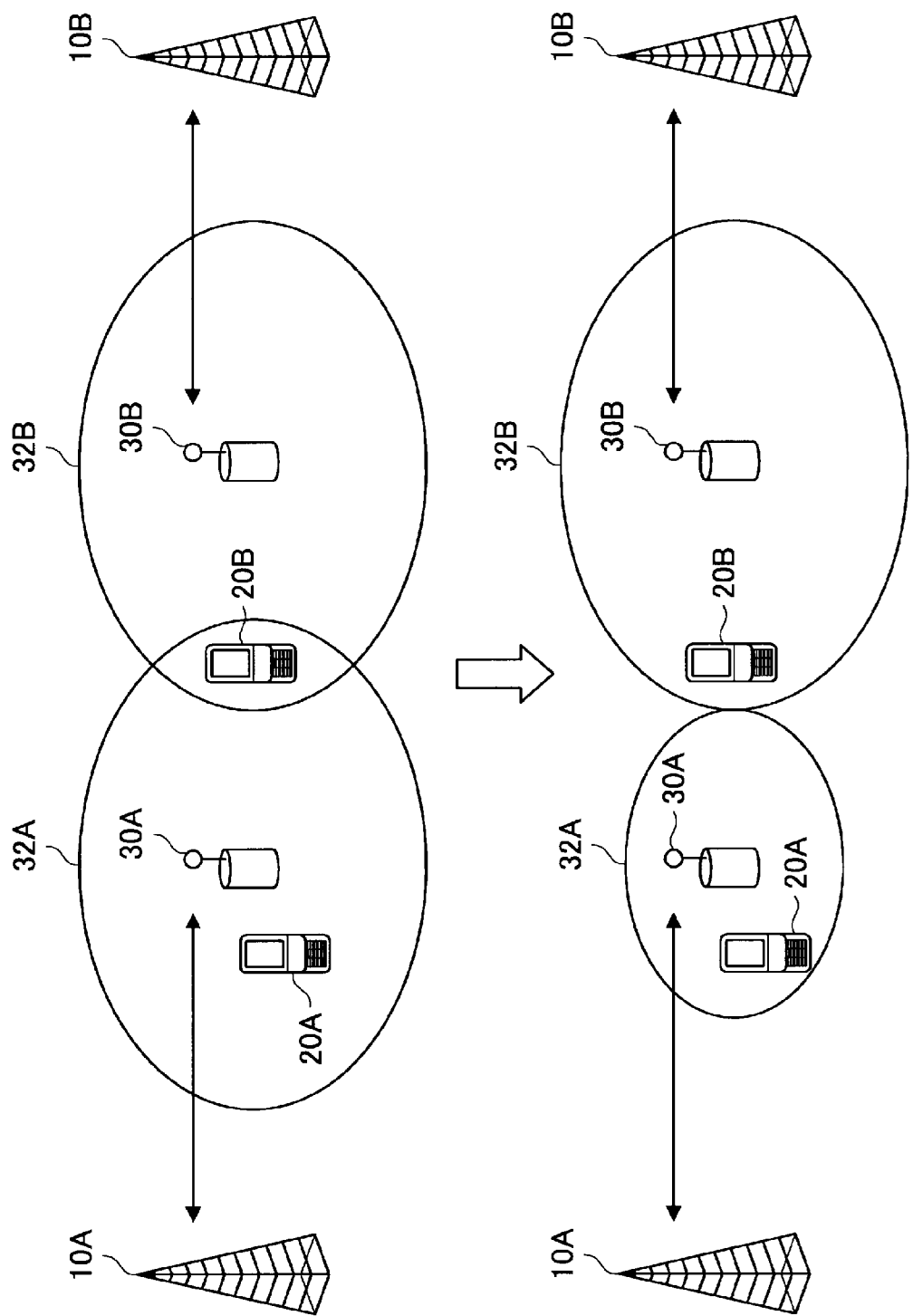
FIG. 21 is an explanatory view showing an illustrative example of determination of transmission power.

FIG. 21 is an explanatory view showing an illustrative example of determination of transmission power. In the example shown in the upper part of FIG. 21, the relay node 30A belongs to the base station 10A, the user equipment 20A belongs to the relay node 30A, the relay node 30B belongs to the base station 10B, and the user equipment 20B belongs to the relay node 30B. Further, the user equipment 20B is included not only in a radio range 32B of the relay node 30B but also in a radio range 32A of the relay node 30A. Therefore, the interference determination unit 164 of the management server 16 determines that a signal transmitted from the relay node 30A to the user equipment 20A and a signal transmitted from the relay node 30B to the user equipment 20B interfere with each other in the user equipment 20B.

In this case, the base station management unit 166 determines the transmission power of the signal from the relay node 30A to the user equipment 20A as transmission power capable of avoiding interference. Specifically, as shown in the lower part of FIG. 21, the base station management unit 166 reduces the transmission power so that the user equipment 20B becomes excluded from the radio range 32A of the signal transmitted from the relay node 30A to the user equipment 20A. It is thereby possible to avoid the interference caused by the relay node 30A.

Figure 22:
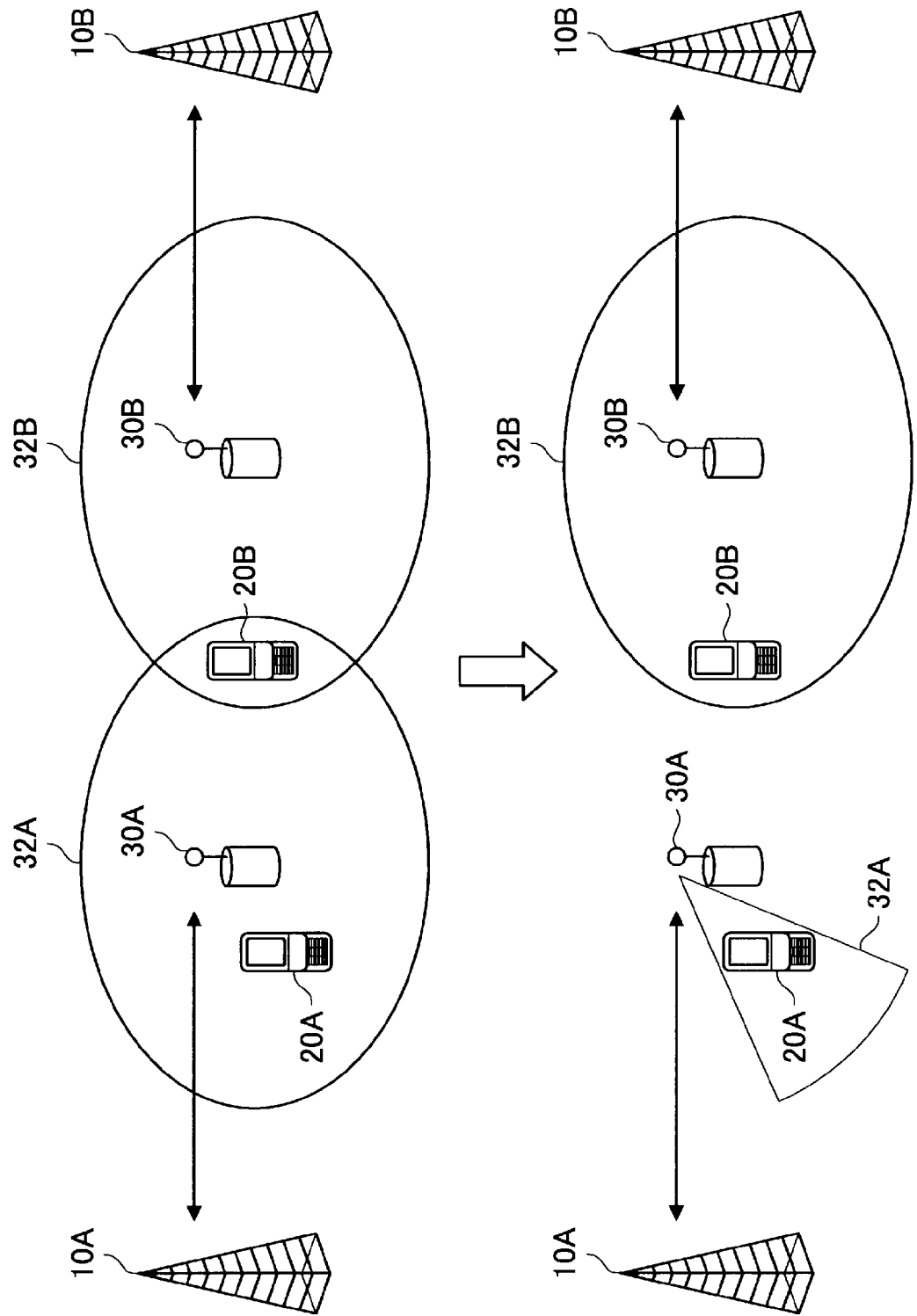
FIG. 22 is an explanatory view showing an illustrative example of determination of beamforming.

FIG. 22 is an explanatory view showing an illustrative example of determination of beamforming. In the example shown in the upper part of FIG. 22, the relay node 30A belongs to the base station 10A, the user equipment 20A belongs to the relay node 30A, the relay node 30B belongs to the base station 10B, and the user equipment 20B belongs to the relay node 30B. Further, the user equipment 20B is included not only in the radio range 32B of the relay node 30B but also in the radio range 32A of the relay node 30A. Therefore, the interference determination unit 164 of the management server 16 determines that a signal transmitted from the relay node 30A to the user equipment 20A and a signal transmitted from the relay node 30B to the user equipment 20B interfere with each other in the user equipment 20B.

In this case, the base station management unit 166 determines to perform beamforming in order to prevent the signal transmitted from the relay node 30A to the user equipment 20A from causing interference. Specifically, as shown in the lower part of FIG. 22, the base station management unit 166 makes beamforming so that the user equipment 20B becomes excluded from the radio range 32A of the signal transmitted from the relay node 30A to the user equipment 20A. In this manner, it is possible to avoid the interference caused by the relay node 30A by way of beamforming also.

Figure 23:
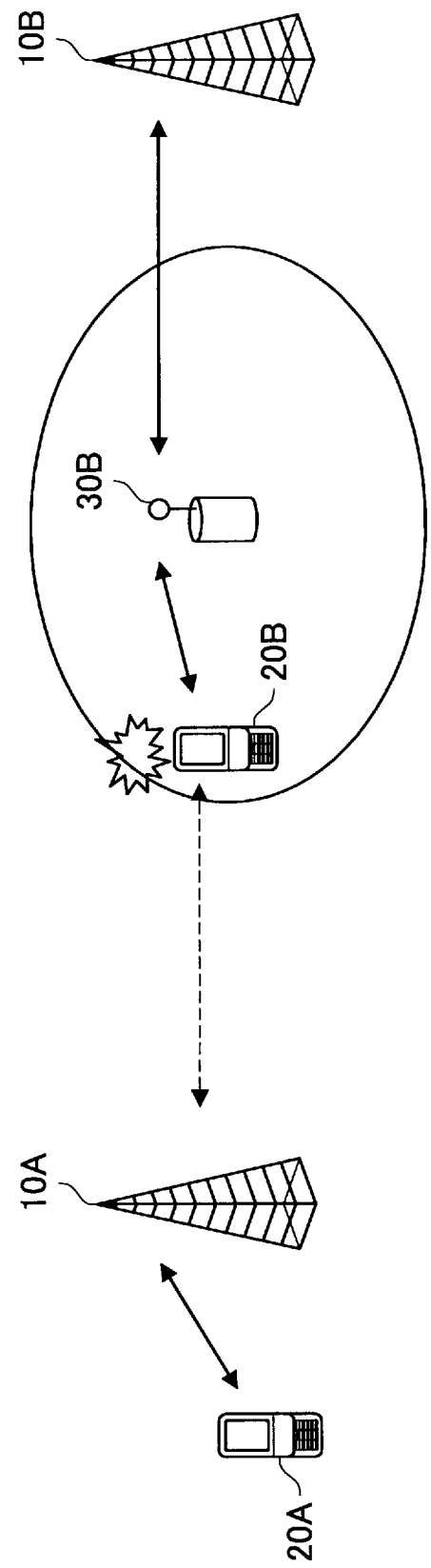
Figure 24:
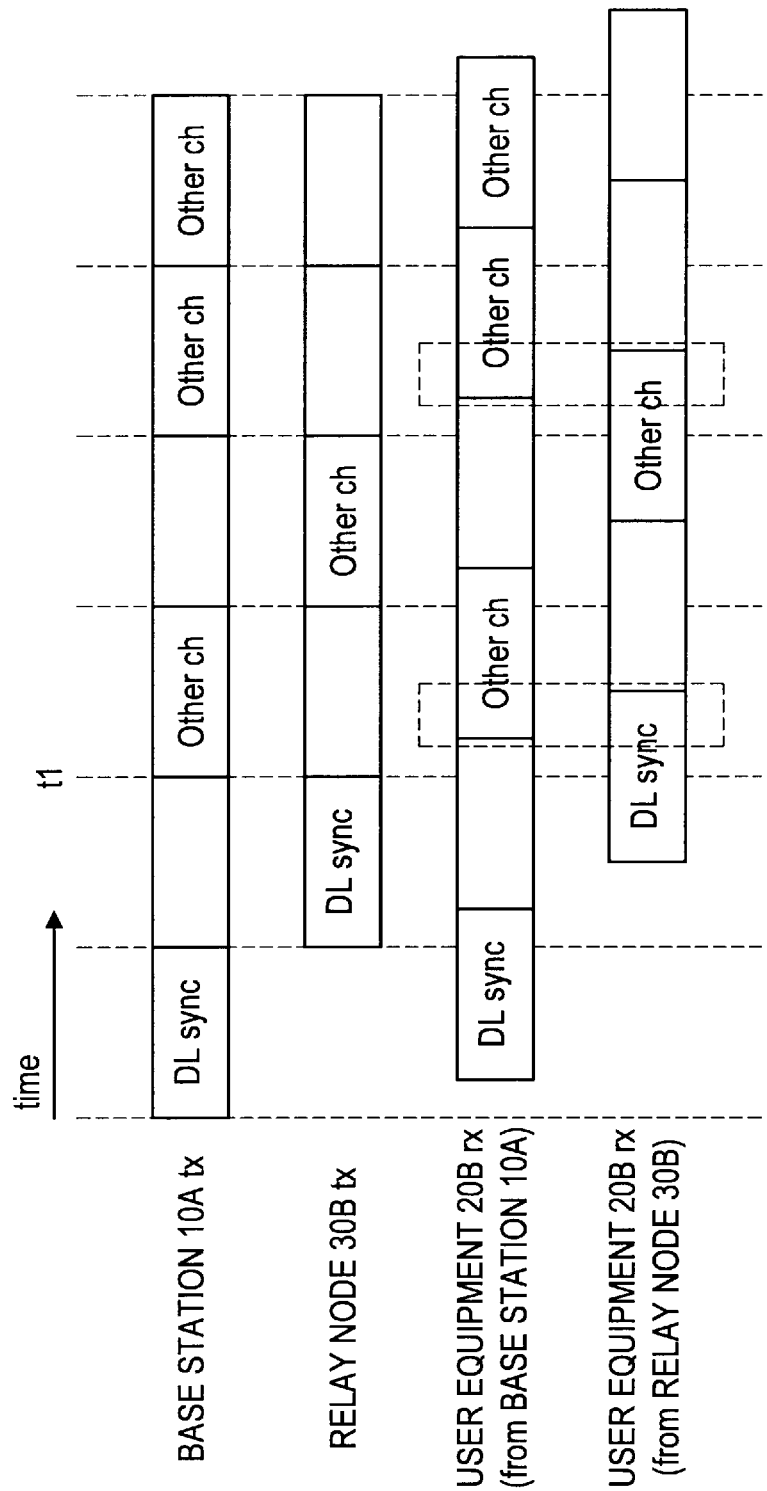
Figure 25:
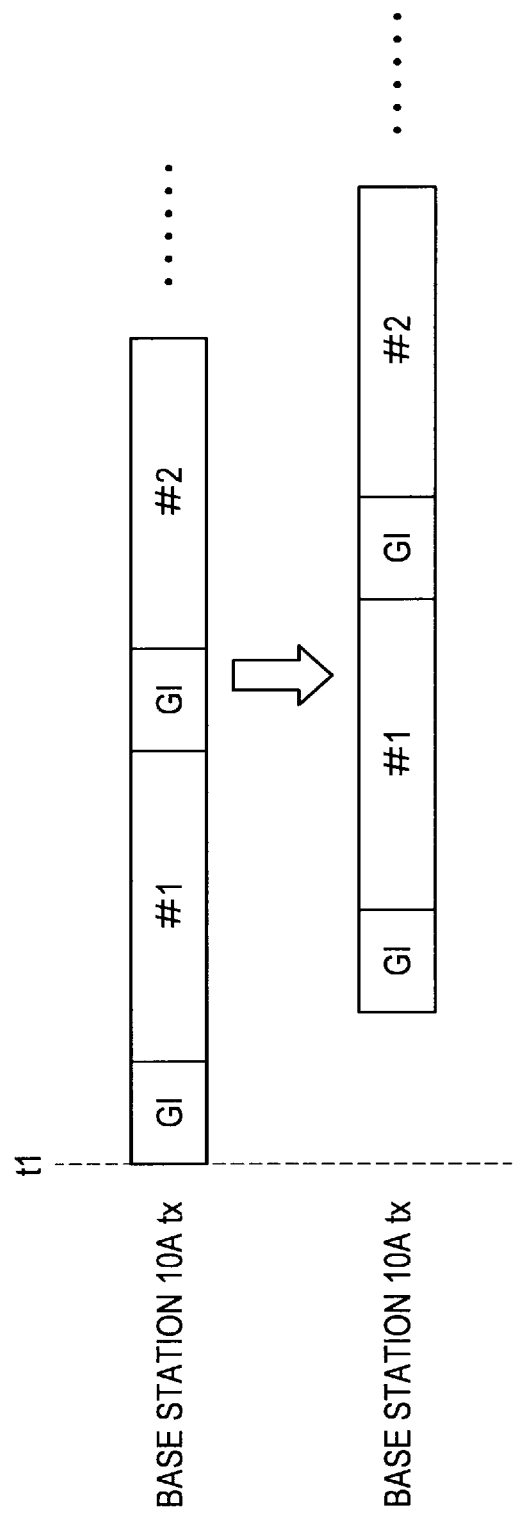

FIGS. 23 to 25 are explanatory views showing illustrative examples of determination of transmission timing, insertion of a non-transmission period or the like. In the example shown in FIG. 23, the user equipment 20B is included in the radio range of the base station 10A and the relay node 30B. Even when the base station 10A and the relay node 30B transmit signals in temporally orthogonal slots, the time of receipt in the user equipment 20B coincides with each other in some cases as shown in FIG. 24. Specifically, FIG. 24 shows the case where the first half of the signal transmitted from the base station 10A and the latter half of the signal transmitted from the relay node 30B interfere with each other.

In this case, as shown in FIG. 25, the base station management unit 166 may delay the transmission timing of the signal from the base station 10A. Alternatively, the base station management unit 166 may set several OFDM symbols at the head of the signal transmitted from the base station 10A as the non-transmission period or lengthen the GI. The base station management unit 166 may alternatively advance the transmission timing of the relay node 30B. In this manner, it is feasible in some cases to avoid interference by adjusting the transmission timing or inserting the non-transmission period.

As described above, the base station management unit 166 can direct execution of various ways of interference avoidance control. Further, each base station 10 reports the process of execution of interference avoidance control or the communication quality information after execution to the management server 16, and the base station management unit 166 adjusts the control parameter as appropriate based on the reported communication quality information. Note that, when a request for the communication quality information is made from the management server 16, each base station 10 may report the communication quality information to the management server 16 as soon as it is ready.

For example, the base station management unit 166 may give a direction to increase the transmission power by using TPC of the corresponding link when the number of occurrences of HARQ (Hybrid Automatic Repeat reQuest) reported from the base station 10 is a specified number or greater or when a packet loss is a predetermined level or higher.

Further, in the layout shown in FIG. 21, if the signal from the relay node 30B to the base station 10B interferes with the signal from the user equipment 20A to the relay node 30A, the base station management unit 166 may give a direction to decrease the rate of the signal from the user equipment 20A to the relay node 30A or change the HARQ. Note that the HARQ scheme may be chase combining, incremental redundancy or the like.

4. Control Ranges B and C

Autonomous Control of Relay Node

In the case where the base station 10 selects the control range B or C, autonomous operation is allowed to the relay node 30, and thus the relay node 30 autonomously determines interference avoidance control and executes the interference avoidance control. The autonomous operation by the relay node 30 is described hereinbelow.

(Information Supplied from Management Server 16)

The management server 16 supplies the following information to the relay node 30 determined to cause interference by the interference determination unit 164 through the base station 10.

Information related to positions of the relay node 30 belonging to the nearby base station 10 that controls communication interfering with the relay node 30 and user equipment. It includes both cases where communication of the relay node 30 gives interference and where it receives interference.

ID, Qos information, and scheduling information of the relay node 30 belonging to the nearby base station 10 that controls communication interfering with the relay node 30 and user equipment. It includes reference counter information for detecting a deviation of synchronization when the relay node 30 and the nearby base station 10 are asynchronous.

The management server 16 may select part of the information related to position or the scheduling information described above and supplies the selected part. Further, the management server 16 may notify recommended interference avoidance control (control parameter etc.) to the relay node 30.

The relay node 30 determines and executes interference avoidance control based on the above information supplied from the management server 16. Handover and link adaptation are examples of the interference avoidance control. The interference avoidance control is described in detail hereinbelow.

(Interference Avoidance Control: Handover)

Figure 26:
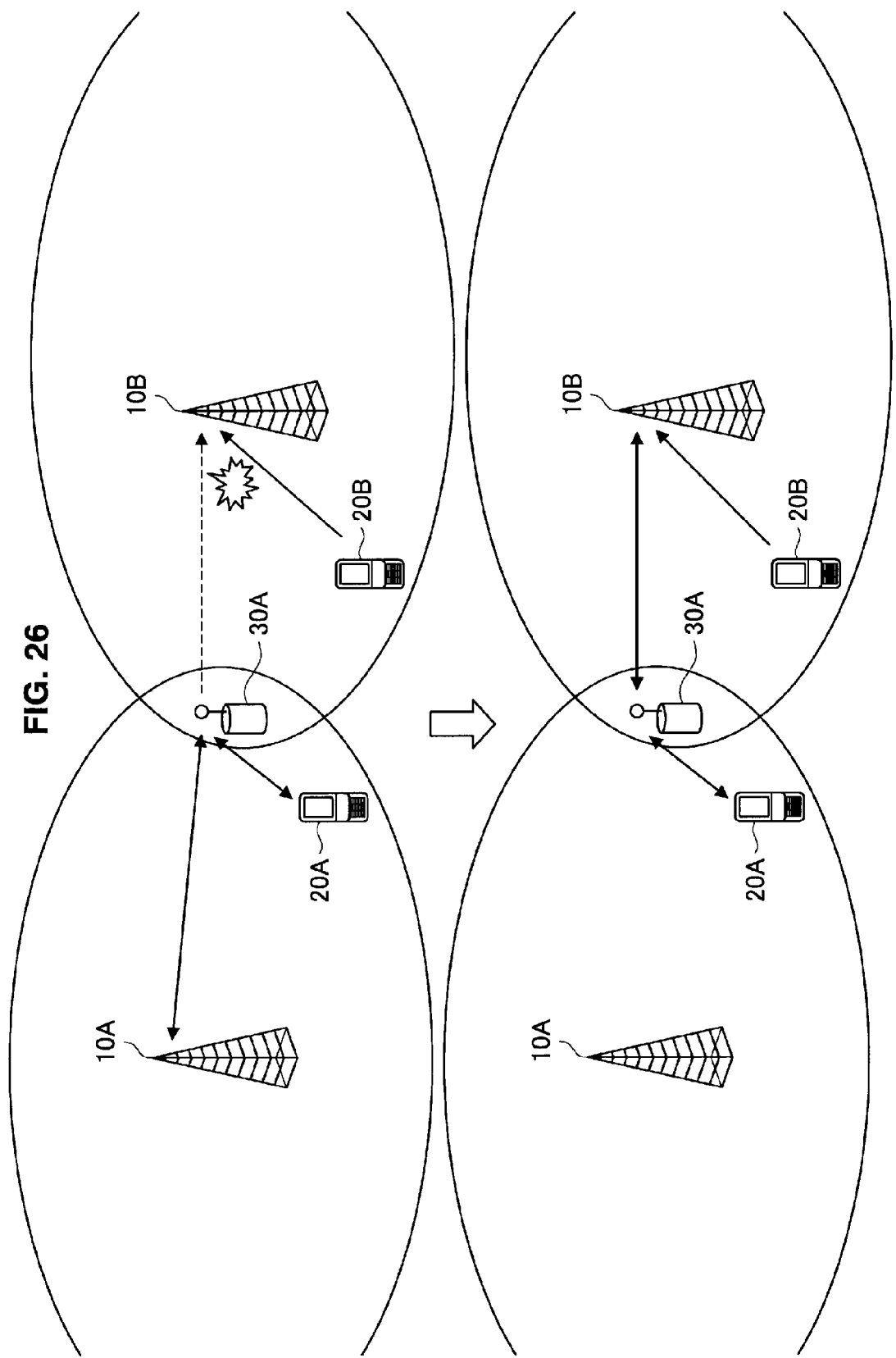
FIG. 26 is an explanatory view showing an illustrative example of handover of a relay node.

FIG. 26 is an explanatory view showing an illustrative example of handover of the relay node 30. In the example shown in the upper part of FIG. 26, the relay node 30A belongs to the base station 10A, the user equipment 20A belongs to the relay node 30A, and the user equipment 20B belongs to the base station 10B. Note that the relay node 30A may recognize the cell configuration shown in the upper part of FIG. 26 based on the information related to position which is supplied from the management server 16.

In the example shown in the upper part of FIG. 26, if the relay node 30A transmits a signal to the base station 10A and by the relay link UL and, simultaneously, the user equipment 20B transmits a signal to the base station 10B by the direct link UL, the both signals can interfere with each other at the base station 10B. In light of this, the control unit 342 of the relay node 30A refers to the scheduling information of the base station 10B which is supplied from the management server 16, and if there are extra resources for accepting handover in the base station 10B, it may execute the handover of the relay node 30A to the base station 10B.

Consequently, as shown in the lower part of FIG. 26, the relay node 30A is connected to the base station 10B and belongs to the base station 10B. If the relay node 30A belongs to the base station 10B, the base station 10B performs scheduling in such a way that the user equipment 20B and the relay node 30A do not interfere with each other, and it is thus possible to avoid the interference of a signal transmitted from the relay node 30A and a signal transmitted from the user equipment 20B.

Note that the relay node 30A may execute handover based on the measurement information reported from the user equipment 20A. Hereinafter, an alternative example of a connection procedure between the user equipment 20A and the relay node 30A is described, and a handover procedure is described after that.

Figure 27:
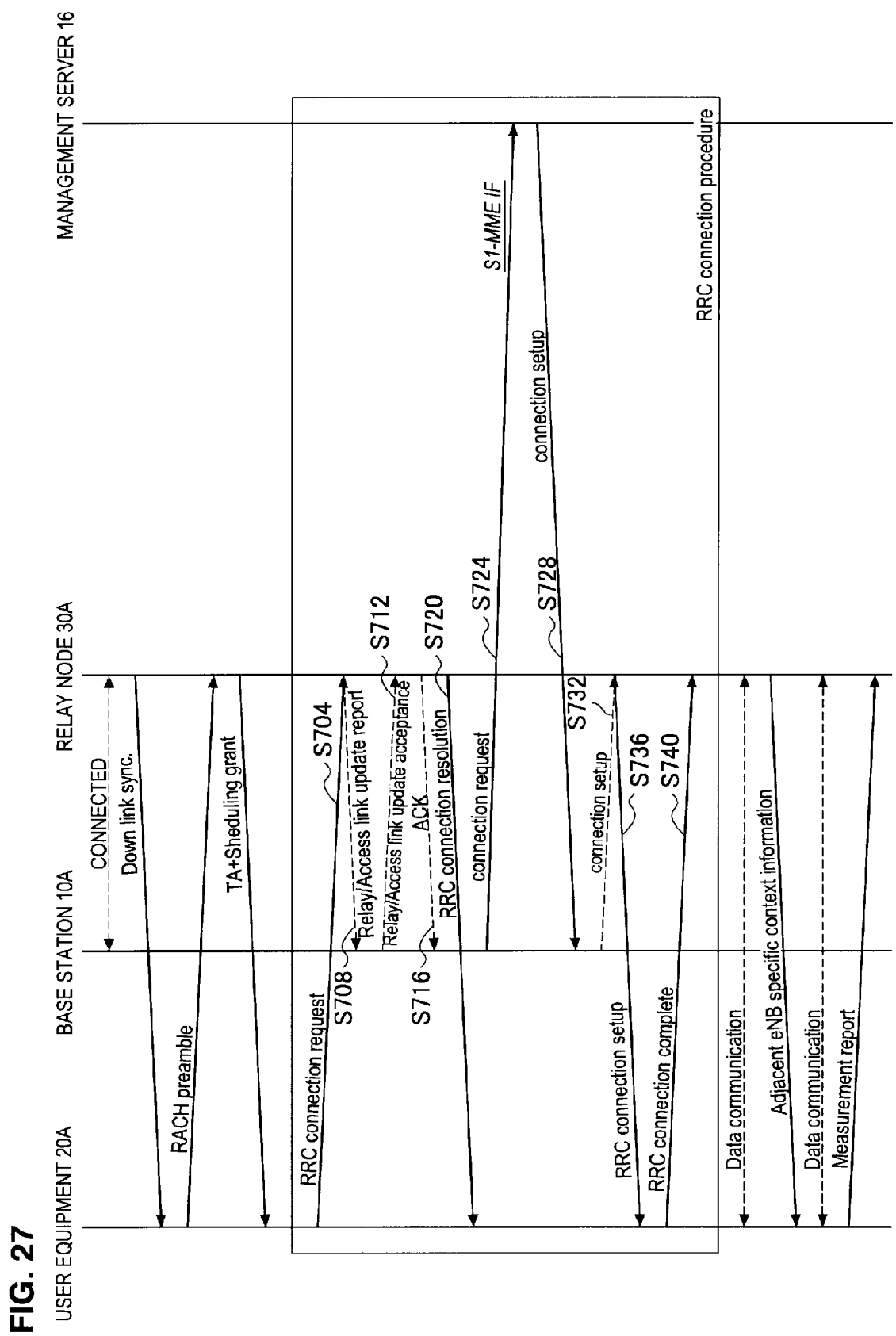
FIG. 27 is a sequence chart showing an alternative example of a connection procedure between a user equipment and a relay node.

FIG. 27 is a sequence chart showing an alternative example of a connection procedure between the user equipment 20A and the relay node 30A. The user equipment 20A transmits RRC connection request to the relay node 30A by using the resources allocated from the relay node 30A (S704). The relay node 30A receives the RRC connection request from the user equipment 20A and then requests the base station 10A to make resource allocation for the relay link and the access link (S708). If the base station 10A can make resource allocation requested from the relay node 30A, the base station 10A gives a notification that the allocation can be made and the allocated resources to the relay node 30A (S712).

Then, the relay node 30A transmits ACK to the base station 10A (S716) and then transmits RRC connection resolution indicating a transmission source of the RRC connection request (S720). The base station 10A then transmits Connection request indicating that the user equipment 20A is making a request for service to the management server 16 (S724). The management server 16 receives the Connection request and transmits information to be set to the user equipment 20A as Connection setup (S728).

The base station 10A then transfers the Connection setup from the management server 16 to the relay node 30A (S732), the relay node 30A transmits RRC connection setup to the user equipment 20A (S736), and the user equipment 20A makes connection setting. After that, the user equipment 20A transmits RRC connection complete indicating that connection setting is completed to the relay node 30A (S740). The user equipment 20A and the relay node 30A are thereby connected, so that the user equipment 20A can communicate with the base station 10A through the relay node 30A.

Figure 28:
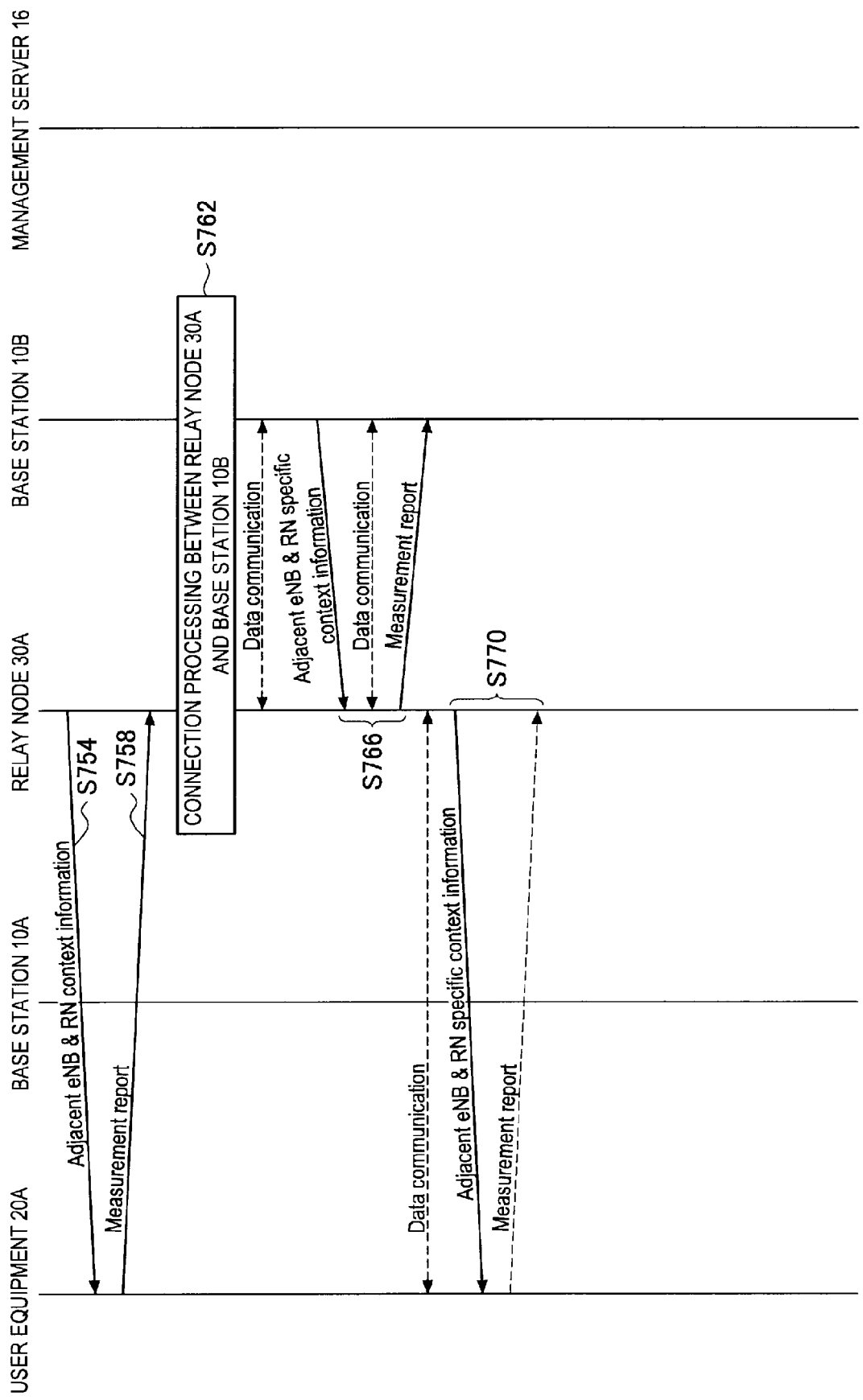
FIG. 28 is a sequence chart showing a handover procedure of a relay node.

FIG. 28 is a sequence chart showing a handover procedure of the relay node 30A. In the example shown in FIG. 28, the relay node 30A belongs to the base station 10A, and the user equipment 20A and the relay node 30A are connected. In this case, the relay node 30A transmits context information (Adjacent eNB & RN context information) indicating a target to be measured such as the adjacent base station or the nearby relay node 30 to the user equipment 20A (S754). After that, the user equipment 20A measures the radio field intensity or the like of signals transmitted from the base station 10B or the like according to the context information while communicating with the relay node 30A. Then, the user equipment 20A reports measurement information to the relay node 30A (S758).

Then, if the relay node 30A determines that the handover to the base station 10B is effective for avoiding interference based on the measurement information received from the user equipment 20A, information from the management server 16 or the like, the relay node 30A performs connection processing with the base station 10B (S762). During the connection processing of the relay node 30A, it is difficult for the relay node 30A to relay communication of the user equipment 20A. Thus, when the relay node 30A has transmission/reception resources (e.g. a plurality of antennas) that enable execution of a plurality of kinds of processing in parallel, the relay node 30A may use some of the transmission/reception resources for communication with the user equipment 20A and use other transmission/reception resources for connection processing with the base station 10B. Alternatively, the relay node 30A may make the user equipment 20A directly connected to the relay node 30A and, after the end of connection processing with the base station 10B, make the user equipment 20A connected back to the relay node 30A.

After that, the relay node 30A performs measurement based on context information received from the base station 10B and transmits the measurement information to the base station 10B (S766). Further, the relay node 30A transmits the context information to the user equipment 20A and receives the measurement information obtained by measurement in the user equipment 20A from the user equipment 20A (S770).

n the other hand, interference can be avoided in some cases by the handover of the user equipment 20, not the relay node 30, as described below.

Figure 29:
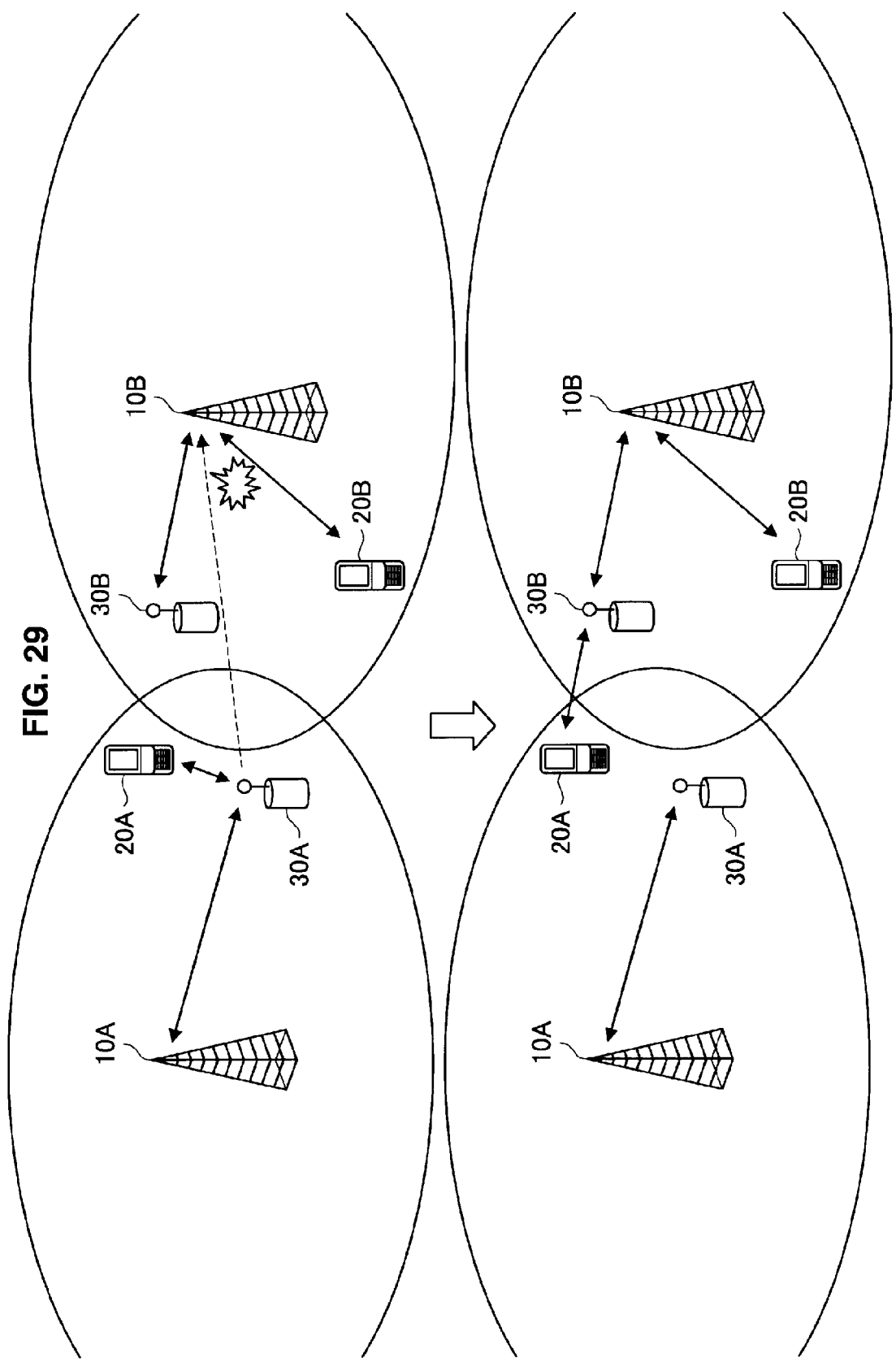
FIG. 29 is an explanatory view showing an illustrative example of handover of a user equipment.

FIG. 29 is an explanatory view showing an illustrative example of the handover of the user equipment 20. In the example shown in the upper part of FIG. 29, the relay node 30A belongs to the base station 10A, the user equipment 20A belongs to the relay node 30A, and the relay node 30B and the user equipment 20B belong to the base station 10B.

In the example shown in the upper part of FIG. 29, if the relay node 30A transmits a signal received from the user equipment 20A to the base station 10A by the relay link UL and, simultaneously, the user equipment 20B transmits a signal to the base station 10B by the direct link UL, the both signals can interfere with each other at the base station 10B. In light of this, the control unit 342 of the relay node 30A refers to the scheduling information of the base station 10B which is supplied from the management server 16, and if there are extra resources for accepting handover in the base station 10B, the handover of the user equipment 20A may be made to the base station 10B.

Specifically, the relay node 30A may shut down the connection with the user equipment 20A. This is because the user equipment 20A would attempt to make a connection with the base station 10B after that. Alternatively, the relay node 30A may explicitly request the base station 10B or the relay node 30B to make the handover of the user equipment 20A.

As shown in the lower part of FIG. 29, if the handover of the user equipment 20A is made to the relay node 30B, the relay node 30A ceases to relay the signal transmitted from the user equipment 20A, so that it is possible to avoid the interference shown in the upper part of FIG. 29. Note that the relay node 30A may control the handover of the user equipment 20 when the number of user equipment 20 belonging to the relay node 30A is a predetermined number or greater (when the number of equipment which can be handled is close to the limit). Further, the relay node 30A may select the user equipment 20 where the access link CQI does not satisfy a given criterion as a target of handover.

The relay node 30A may execute handover based on measurement information reported from the user equipment 20A. A handover procedure of the user equipment 20A is described hereinafter with reference to FIG. 30.

Figure 30:
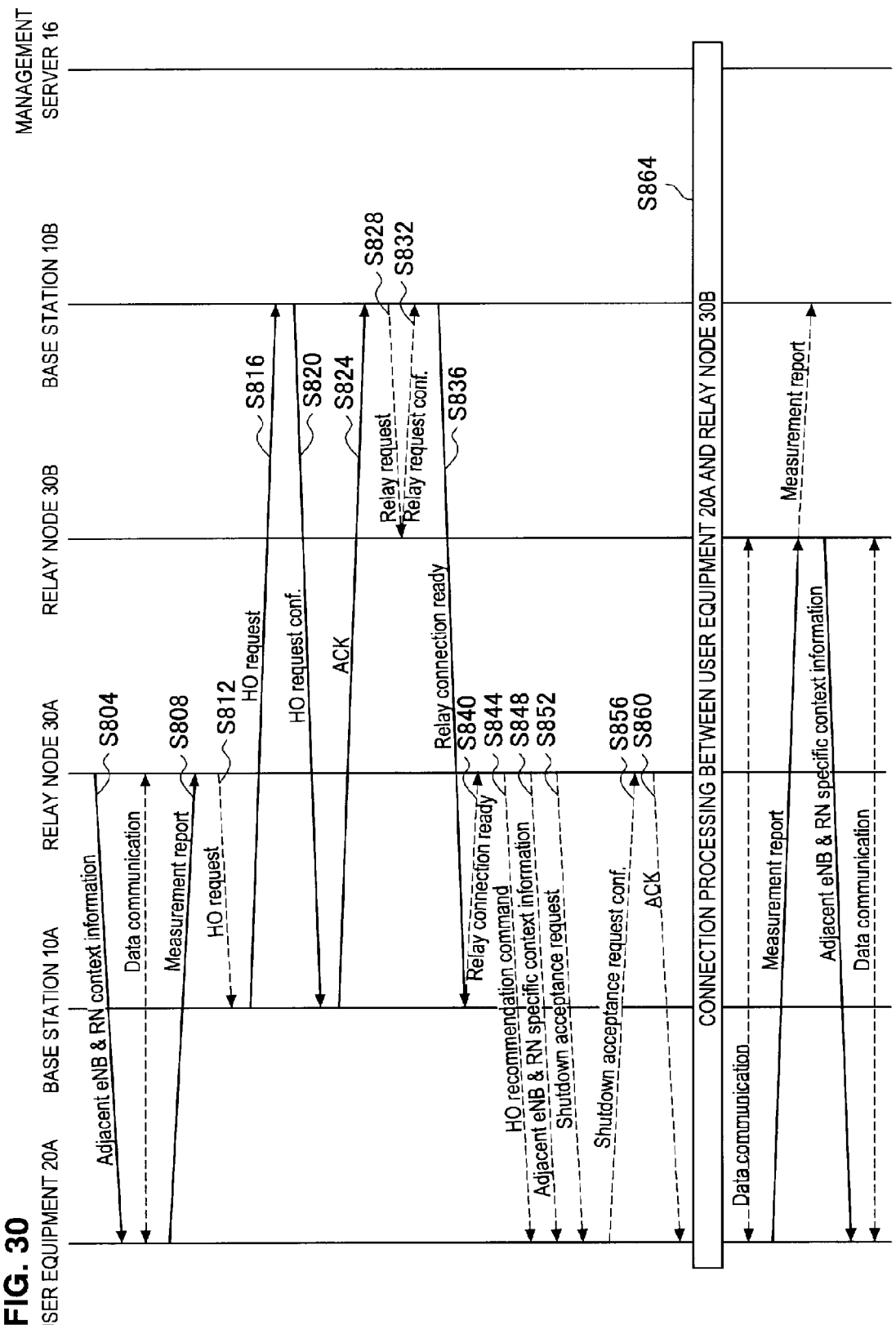
FIG. 30 is a sequence chart showing a handover procedure of a user equipment.

FIG. 30 is a sequence chart showing a handover procedure of the user equipment 20A. In the example shown in FIG. 30, the relay node 30A belongs to the base station 10A, the relay node 30B belongs to the base station 10B, and the user equipment 20A is connected to the relay node 30A. In this case, the relay node 30A transmits context information indicating a target to be measured such as the adjacent base station or the nearby relay node 30 to the user equipment 20A (S804). After that, the user equipment 20A measures the radio field intensity or the like of signals transmitted from the base station 10B, the relay node 30B or the like according to the context information while communicating with the relay node 30A. Then, the user equipment 20A reports measurement information to the relay node 30A (S808).

Then, it is assumed that the relay node 30A determines that the handover of the user equipment 20A to the relay node 30B is effective for avoiding interference based on the measurement information received from the user equipment 20A, information from the management server 16 or the like. In this case, the relay node 30A makes a request for the handover of the user equipment 20A to the relay node 30B to the base station 10B through the base station 10A (S812, S816). Then, the base station 10B transmits confirmation for the handover request to the base station 10A (S820) and receives ACK from the base station 10A (S824).

After that, the base station 10B makes inquiries about whether the handover is acceptable to the relay node 30B (S828). If the relay node 30B can accept the handover of the user equipment 20A (S832), the base station 10B notifies that the relay node 30B can accept the handover to the relay node 30A through the base station 10A (S836, S840).

Then, the relay node 30A transmits context information and a signal for recommending the handover to the relay node 30B (S844, S848). Further, the relay node 30A makes a request for shutdown of the connection with the relay node 30A to the user equipment 20A (S852), and when the relay node 30A receives confirmation for the connection shutdown from the user equipment 20A (S856), it sends ACK back to the user equipment 20A (S860). Connection between the user equipment 20A and the relay node 30A is thereby shut down, and the user equipment 20A performs connection processing with the relay node 30B to which handover is recommended (S864).

Although the case of performing both of recommendation of the handover to the relay node 30B and request for shutdown of the connection with the relay node 30A is described above, either one or both of them are not necessarily performed. For example, the relay node 30A may compulsorily shut down the connection with the user equipment 20B without performing both of the above processing. In this case, the user equipment 20B is expected to take the initiative to make connection processing with the base station 10 or the relay node 30 included in the context information.

Further, although the case where the handover of the user equipment 20A is made to the relay node 30B belonging to a different base station is described above, the handover may be made to the relay node 30X belonging to the same base station 10A as described below.

Figure 31:
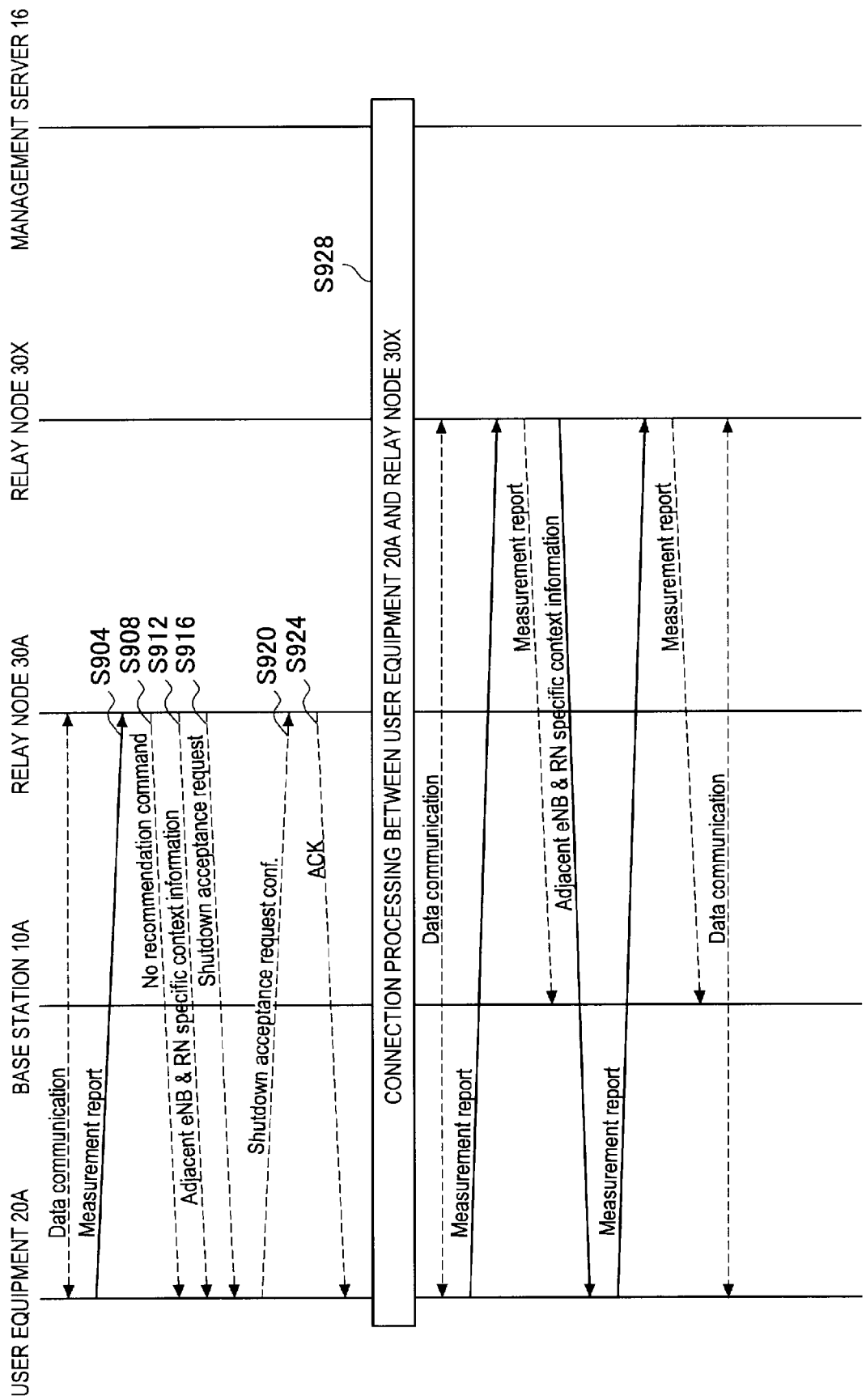
FIG. 31 is a sequence chart showing a handover procedure of a user equipment.

FIG. 31 is a sequence chart showing a handover procedure of the user equipment 20A. In the example shown in FIG. 31, the relay node 30A and the relay node 30X belong to the base station 10A, and the user equipment 20A is connected to the relay node 30A. The relay node 30A receives measurement information from the user equipment 20A (S904) and determines interference avoidance control of communication with the user equipment 20A based on the measurement information and information supplied from the management server 16 or the like. If the relay node 30A determines that the handover of the user equipment 20A to the relay node 30X is effective for avoiding interference, the relay node 30A transmits context information and a signal for recommending the handover to the relay node 30X (S908, S912).

Further, the relay node 30A makes a request for shutdown of the connection with the relay node 30A to the user equipment 20A (S916), and when the relay node 30A receives confirmation for the connection shutdown from the user equipment 20A (S920), it sends ACK back to the user equipment 20A (S924). Connection between the user equipment 20A and the relay node 30A is thereby shut down, and the user equipment 20A performs connection processing with the relay node 30× to which handover is recommended (S928).

As described above, the relay node 30 can avoid interference by executing the handover to the adjacent base station 10 or making the handover of the user equipment 20 belonging to the relay node 30 to another relay node 30.

(Interference Avoidance Control, Link Adaptation)

If the slot that is likely to cause interference, the relay node 30 with which interference occurs, ID of the user equipment 20 or the base station 10, information related to position and an allowable interference level are notified from the management server 16, the relay node 30 can avoid interference by link adaptation in some cases. The link adaptation of the access link that is controllable by the relay node 30 may be TPC, AMC (Advanced Modulation Control), HARQ or the like. Each link adaptation is specifically described hereinbelow.

When the relay node 30 is directed to reduce the interference level on other communication by the management server 16 or the like, or when the relay node 30 determines to reduce the interference level on other communication, the relay node 30 executes any of the following link adaptations:

(1) Reduce transmission power. Further, increase reception SNIR with use of HARQ (2) Reduce transmission power. Further, reduce necessary SNIR by reducing a modulation and coding rate.

Addition resources are necessary when the relay node 30 executes any of the above (1) and (2). Therefore, when extra resources are allocated in advance from the base station 10, the relay node 30 uses the extra resources, and when there are no sufficient extra resources, the relay node 30 makes a request for resource allocation to the base station 10 or the management server 16. Note that, when the base station 10 or the management server 16 receives a request for resource allocation to avoid interference, they perform resource allocation in preference to other requests.

On the other hand, when the relay node 30 performs communication while the interference level received from other communication is high, the relay node 30 executes any of the following link adaptations:

(3) Increase transmission power.

(4) Increase reception SNIR with use of HARQ (5) Reduce necessary SNIR by reducing a modulation and coding rate.

In order to execute the above (4) and (5), additional resources are necessary. Therefore, when extra resources are allocated in advance from the base station 10, the relay node 30 uses the extra resources, and when there are no sufficient extra resources, the relay node 30 makes a request for resource allocation to the base station 10 or the management server 16. Note that, when the base station 10 or the management server 16 receives a request for resource allocation to avoid interference, they perform resource allocation in preference to other requests.

Further, in OFDMA, the link adaptation can be performed in units of resource blocks or subcarriers. Thus, the relay node 30 may execute the link adaptations described in the above (1) to (5) only on the subcarrier or the resource block where the interference level exceeds a predetermined level. Specifically, when the relay node 30 transmits signals by using a resource block A where the interference level from other communication is higher than a predetermined level and a resource block B where it is lower than the predetermined level, the relay node 30 may execute any one of the above (3) to (5) only on the resource block A.

5. Other Applications of Invention

In the foregoing, explanation has been given about that a control range allowed to the relay node 30 is selected from a plurality of types of control ranges, that the management server 16 achieves central control for avoiding interference between cells formed by the respective base stations 10, and that the relay node 30 autonomously determines interference avoidance control and executes the interference avoidance control. However, the above-described relay node 30 is just an example of small-to-medium-sized base stations in the heterogeneous network described below.

Thus, it is also within the scope of the present invention that a control range allowed to a small-to-medium-sized base station is selected from a plurality of types of control ranges, that the management server 16 achieves central control for avoiding interference between cells formed by the respective base stations 10 or small-to-medium-sized base stations, and that a small-to-medium-sized base station autonomously determines interference avoidance control and executes the interference avoidance control.

A heterogeneous network is a network where a plurality of small-to-medium-sized base stations coexist in a macro cell by performing overlay transmission or spectrum sharing. The small-to-medium-sized base station may be a RRH (Remote RadioHead) cell base station, a hotzone base station (Pico/micro cell eNB), a femtocell base station (Home eNB), a relay node (relay base station) or the like. The heterogeneous network architecture is specifically described below.

Figure 32:
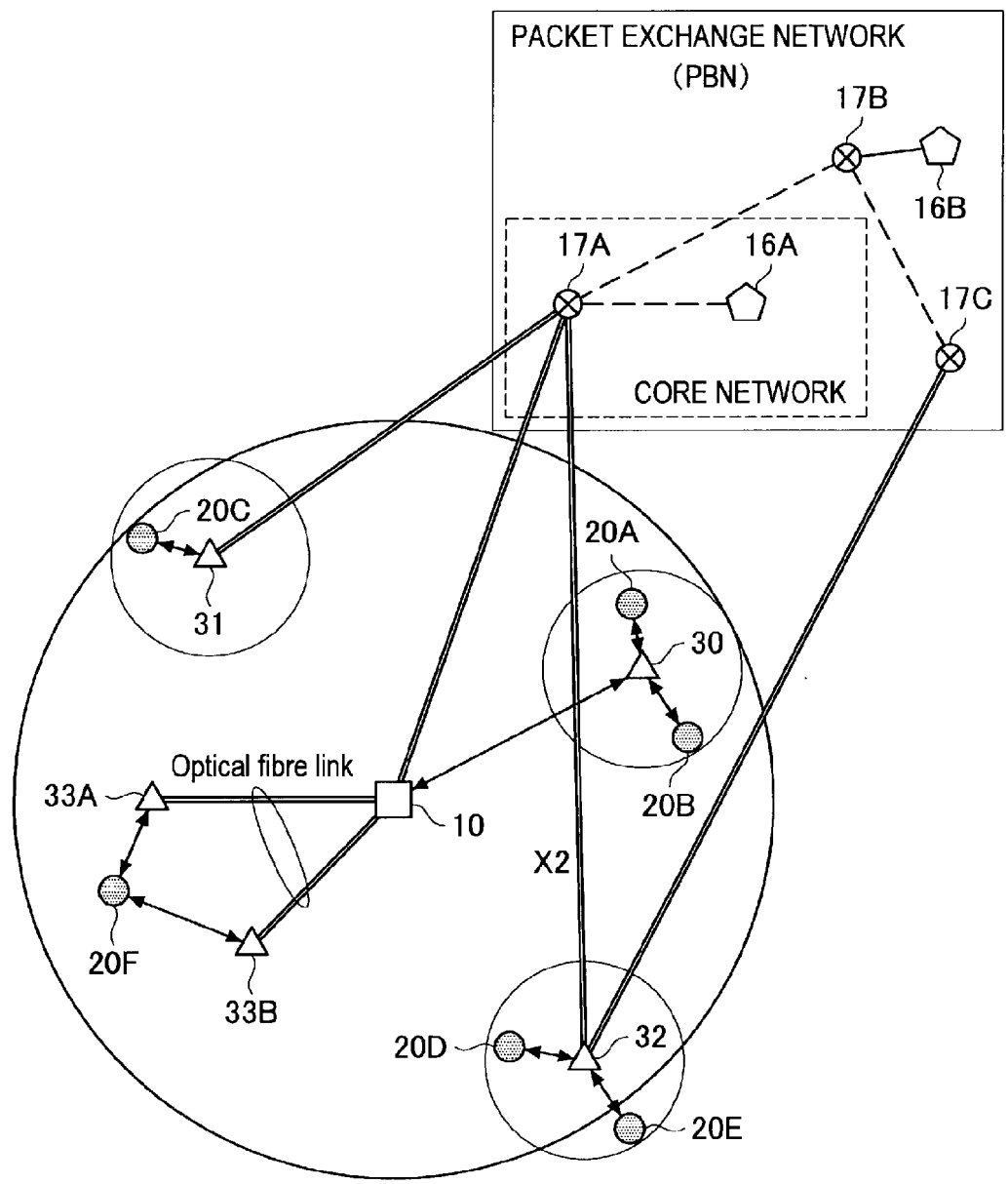
FIG. 32 is an explanatory view showing an example of heterogeneous network architecture.

FIG. 32 is an explanatory view showing an example of heterogeneous network architecture. Referring to FIG. 32, the heterogeneous network includes a macro cell base station 10 (which is synonymous with a base station 10), a relay node 30, a hotzone base station 31, a femtocell base station 32, RRH cell base stations 33 and management servers 16A and 16B.

The management servers 16A and 16B have functions for the macro cell base station 10 and the small-to-medium-sized base stations to operate in cooperation with each other. For example, as described above in <3. Control Range A: Central Control of Management Server>, the management server 16A receives information (position information, scheduling information, Qos information etc.) related to the macro cell base station 10, the small-to-medium-sized base station, the user equipment 20 belonging to the small-to-medium-sized base station or the like, determines the macro cell base station 10 or the small-to-medium-sized base station that controls communication interfering with other communication, and gives a direction for interference avoidance operation. Note that the functions of the management server 16 may be incorporated into the macro cell base station 10 or any one of the small-to-medium-sized base stations.

The macro cell base station 10 manages the small-to-medium-sized base stations and the user equipment 20 in the macro cell. For example, as described above in <2-3. Configuration of Base Station>, the macro cell base station 10 selects a control range allowed to each small-to-medium-sized base station from the control range A, the control range B and the control range C. Then, each small-to-medium-sized base station controls communication with the user equipment 20 in conformity with the control range selected by the macro cell base station 10.

The hotzone base station 31 (a pico cell base station, a micro cell base station) has the smaller maximum transmission power than the macro cell base station 10 and communicates with the macro cell base station 10 with use of an interface such as X2 or S1 of a core network. Note that the hotzone base station 31 creates OSG (Open Subscriber Group) which is accessible from any user equipment 20.

The femtocell base station 32 has the smaller maximum transmission power than the macro cell base station 10 and communicates with the macro cell base station 10 with use of a packet exchange network such as ADSL. Alternatively, the femtocell base station 32 may communicate with the macro cell base station 10 by a radio link. Note that the femtocell base station 32 creates CSG (Closed Subscriber Group) which is accessible only from limited user equipment 20.

The RRH cell base station 33 is connected with the macro cell base station 10 by an optical fiber. Thus, the macro cell base station 10 transmits signals to the RRH cell base stations 33A and 33B installed in geographically different places through the optical fiber and allows the RRH cell base stations 33A and 33B to transmit signals by radio. For example, only the RRH cell base stations 33 close to the position of the user equipment 20 may be used. Note that functions related to a control system are incorporated into the macro cell base station 10, and optimum transmission mode is selected according to the distribution of the user equipment 20.

FIG. 33 shows the overview of the respective small-to-medium-sized base stations described above. The small-to-medium-sized base stations such as the hotzone base station 31 and the femtocell base station 32 can autonomously determine interference avoidance control and execute the determined interference avoidance control according to the method described above in <4. Control Ranges B and C: Autonomous Control of Relay Node>. The interference model and interference avoidance control in the heterogeneous network are described hereinbelow.

(Interference Model in Heterogeneous Network)

Figure 34:
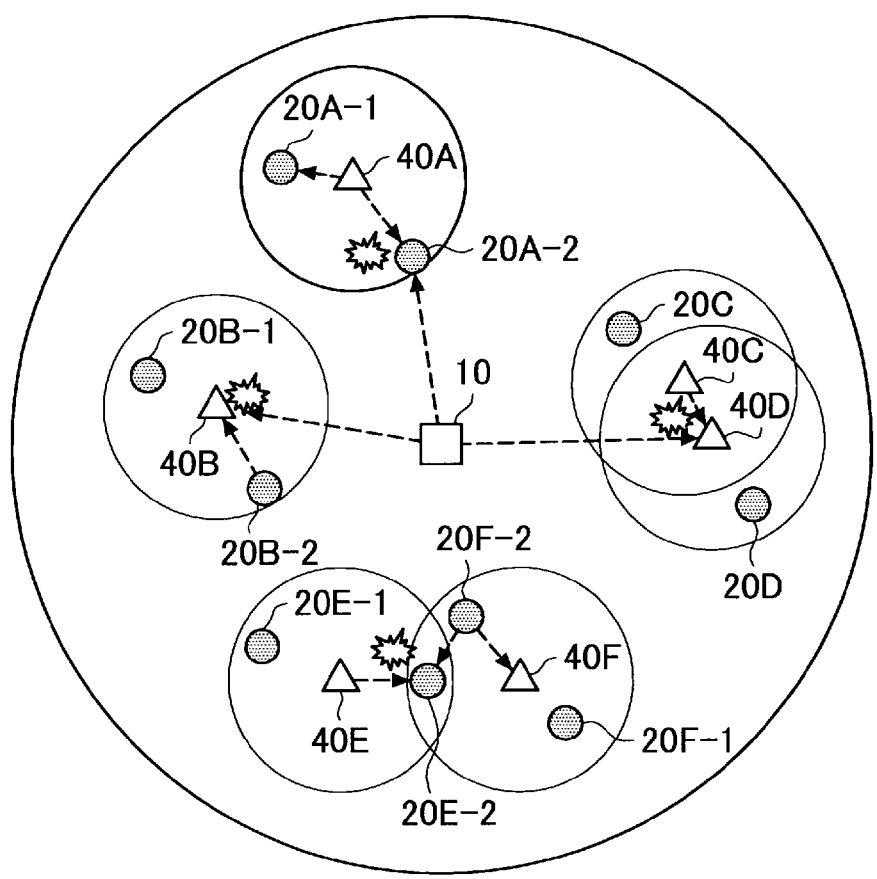
FIG. 34 is an explanatory view showing an interference model in a heterogeneous network.

FIG. 34 is an explanatory view showing the interference model in a heterogeneous network. In FIG. 34 and FIGS. 35 to 37 described later, the relay node 30, the hotzone base station 31, the femtocell base station 32 and so on are not particularly distinguished from one another, and they are simply shown as small-to-medium-sized base stations 40.

Referring to FIG. 34, the occurrence of the following interferences is assumed in the heterogeneous network.

(1) Interference between a transmission signal from a small-to-medium-sized base station 40A and a transmission signal from the macro cell base station 10 occurring at a user equipment 20A-2.

(2) Interference between a transmission signal from a user equipment 20B-2 and a transmission signal from the macro cell base station 10 occurring at a small-to-medium-sized base station 40B.

(3) Interference between a transmission signal from a small-to-medium-sized base station 40C and a transmission signal from the macro cell base station 10 occurring at a small-to-medium-sized base station 40D.

(4) Interference between a transmission signal from a small-to-medium-sized base station 40E and a transmission signal from a user equipment 20E-2 occurring at a user equipment 20E-2.

(Interference Avoidance Control in Heterogeneous Network)

Although various kinds of interferences occur in the heterogeneous network as described above, the interferences can be is solved by the interference avoidance control described above in <3. Control Range A: Central Control of Management Server> or <4. Control Ranges B and C: Autonomous Control of Relay Node>. An example of interference avoidance control is specifically described below.

Figure 35:
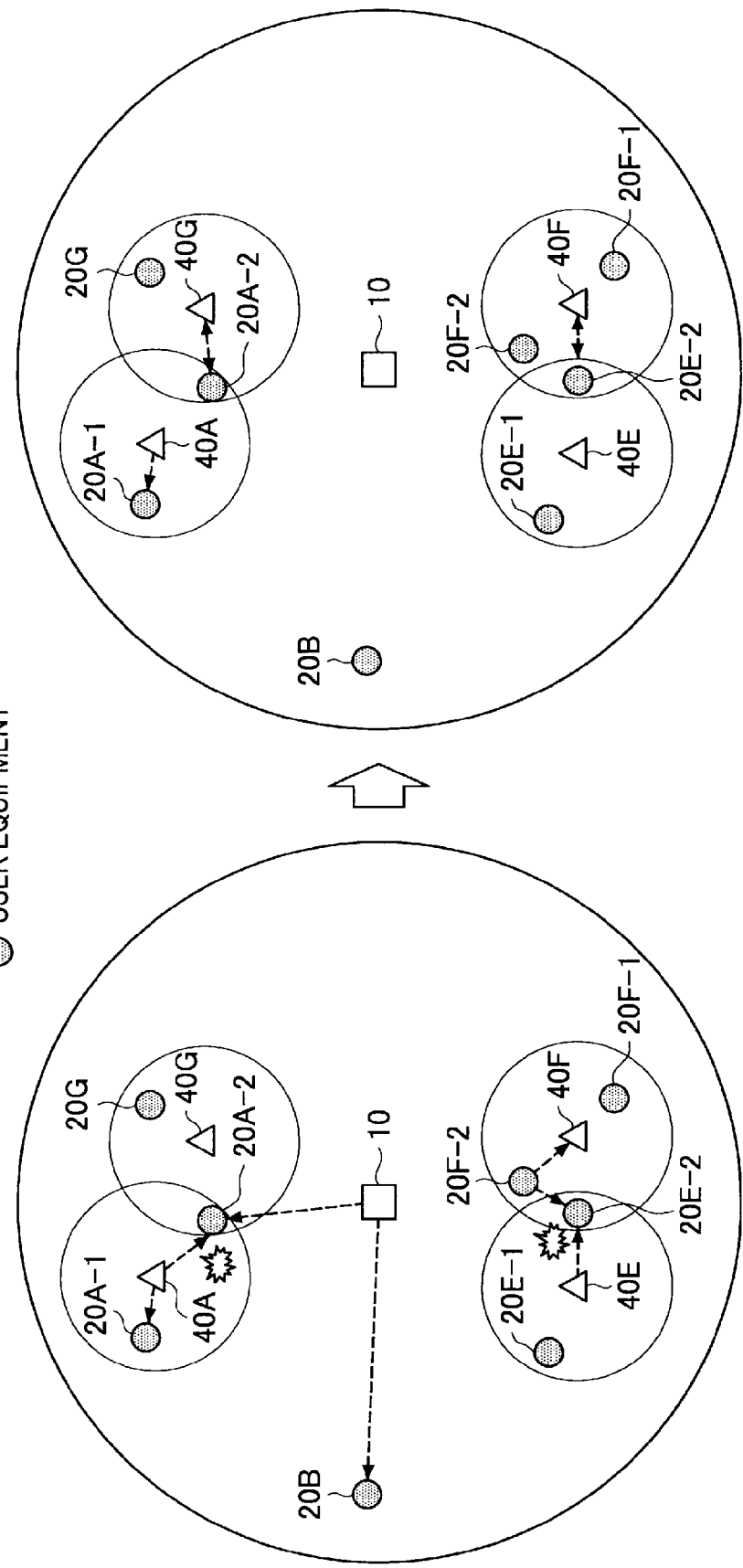
FIG. 35 is an explanatory view showing an example of interference avoidance by handover.

FIG. 35 is an explanatory view showing an example of interference avoidance by handover. In the left part of FIG. 35, a transmission signal from the small-to-medium-sized base station 40A and a transmission signal from the macro cell base station 10 interfere at the user equipment 20A-2. In this case, the interference can be solved by the handover of the user equipment 20A-2 from the small-to-medium-sized base station 40A to a small-to-medium-sized base station 40G with different transmission timing from the macro cell base station 10.

Further, in the left part of FIG. 35, a transmission signal from the small-to-medium-sized base station 40E and a transmission signal from the user equipment 20E-2 interfere at the user equipment 20E-2. In this case, the interference can be solved by the handover of the user equipment 20E-2 from the small-to-medium-sized base station 40E to the small-to-medium-sized base station 40F.

The handover between the small-to-medium-sized base stations 40 can be made according to the handover sequence between the relay nodes 30 belonging to the same base station 10 which is described earlier with reference to FIG. 19, for example. Further, the handover between the small-to-medium-sized base stations 40 belonging to the different macro cell base stations 10 can be made according to the handover sequence which is described earlier with reference to FIG. 20, for example. Although the small-to-medium-sized base station 40 has an interface for making a direct communication with the management server 16 in some cases, because it is under management of the macro cell base station 10, it performs communication for the handover with the macro cell base station 10 as shown in FIG. 19 or the like.

However, an interfaces between the macro cell base station 10 and the small-to-medium-sized base station 40 differs depending on the type of the small-to-medium-sized base station 40. For example, when the small-to-medium-sized base station 40 is the hotzone base station 31, the small-to-medium-sized base station 40 and the macro cell base station 10 perform communication by using the X2 interface. Further, when an interface between the small-to-medium-sized base station 40 and the macro cell base station 10 is wired, latency may be used as a criterion of judgment of the communication link quality.

FIG. 36 is an explanatory view showing an example of interference avoidance by beamforming. In the left part of FIG. 36, a transmission signal from the small-to-medium-sized base station 40A and a transmission signal from the macro cell base station 10 interfere at the user equipment 20A-2. In this case, the interference can be solved by directing the reception directivity of the user equipment 20A-2 toward the direction where the small-to-medium-sized base station 40A is placed.

Further, in the left part of FIG. 36, a transmission signal from the small-to-medium-sized base station 40E and a transmission signal from the user equipment 20E-2 interfere at the user equipment 20E-2. In this case, the interference can be solved by directing the transmission directivity of the user equipment 20E-2 toward the direction where the small-to-medium-sized base station 40F is placed because the transmission signal from the user equipment 20E-2 thereby does not reach the user equipment 20E-2.

Figure 37:
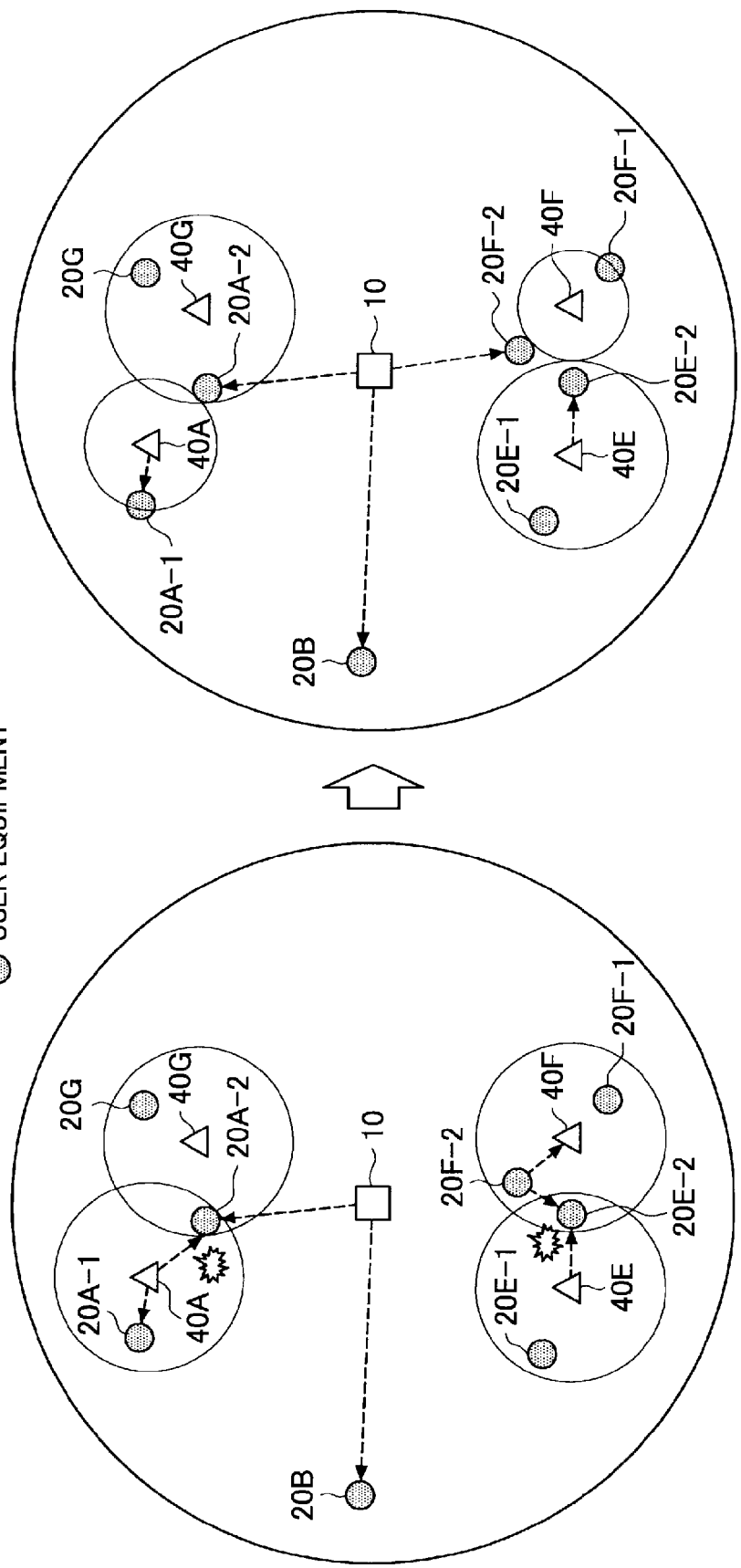
FIG. 37 is an explanatory view showing an example of interference avoidance by transmission power control.

FIG. 37 is an explanatory view showing an example of interference avoidance by transmission power control. In the left part of FIG. 37, a transmission signal from the small-to-medium-sized base station 40A and a transmission signal from the macro cell base station 10 interfere at the user equipment 20A-2. In this case, if the transmission power of the small-to-medium-sized base station 40A is lowered, the user equipment 20A-2 is excluded from the radio range of the small-to-medium-sized base station 40A, and thus the connection between the user equipment 20A-2 and the small-to-medium-sized base station 40A is shut down. The user equipment 20A-2 thereby searches for a new connection and makes a connection to the macro cell base station 10, for example. Therefore, the interference can be solved by lowering the transmission power of the small-to-medium-sized base station 40A.

Further, in the left part of FIG. 37, a transmission signal from the small-to-medium-sized base station 40E and a transmission signal from the user equipment 20E-2 interfere at the user equipment 20E-2. In this case, if the transmission power of the small-to-medium-sized base station 40F is lowered, the user equipment 20E-2 is excluded from the radio range of the small-to-medium-sized base station 40F, and thus the connection between the user equipment 20E-2 and the small-to-medium-sized base station 40F is shut down. The user equipment 20E-2 thereby searches for a new connection and makes a connection to the macro cell base station 10, for example. Therefore, the interference can be solved by lowering the transmission power of the small-to-medium-sized base station 40F.

6. Summary

As described above, according to the embodiment, a control range allowed to the small-to-medium-sized base station such as the relay node 30 can be selected from a plurality of types of control ranges. Further, according to the embodiment, the management server 16 can achieve the central control for avoiding interference between cells formed by the respective base stations 10. Furthermore, according to the embodiment, the small-to-medium-sized base station such as the relay node 30 can autonomously determine interference avoidance control and execute the interference avoidance control.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although the case where the control range allowed to the relay node 30 is dynamically selected is described above, the control range allowed to the relay node 30 may be fixed. Thus, when the control range A is fixedly set to the relay node 30, the interference avoidance control is performed in the procedure described in <3. Control Range A: Central Control of Management Server>. Further, when the control range B or C is fixedly set to the relay node 30, the interference avoidance control is performed in the procedure described in <4. Control Ranges B and C: Autonomous Control of Relay Node>.

Further, it is not always necessary to execute the respective steps in the processing of the communication system 1 in this specification in chronological order according to the sequence shown in the sequence charts. For example, the respective steps in the processing of the communication system 1 may be executed in the sequence different from the sequence shown in the sequence charts or may be executed in parallel.

Furthermore, it is possible to create a computer program that causes hardware such as a CPU, ROM and RAM incorporated in the base station 10, the management server 16, the relay node 30 or the like to function equally to the respective elements of the base station 10, the management server 16 and the relay node 30 described above. Further, a memory medium that stores such a computer program may be provided.

REFERENCE SIGNS LIST

10 Base station
16 Management server
20 User equipment
30 Relay node
124, 224, 324 Analog processing unit
128, 228, 328 AD/DA conversion unit
130, 230, 330 Digital processing unit
134, 234, 334 Decoder
140, 240, 340 Encoder
142, 242, 342 Control unit
148 Control range selection unit
164 Interference determination unit
166 Base station management unit
232,332 Synchronous unit
338 Buffer

The invention claimed is:

1. A relay node in a mobile communication network for relaying communications between a base station and a mobile terminal, the relay node comprising:
a communication interface configured to receive resource allocation information from the base station, the resource allocation information indicating a controllable range of communication resources available to the relay node, the controllable range being one of a first controllable range, a second controllable range, or a third controllable range, the first controllable range representing that no communication resources are available, the second controllable range representing that available communication resources in the base station are a predetermined percentage or less, and the third controllable range representing that available communication resources in the base station are the predetermined percentage or more; and control circuitry configured to control allocation of resources for communication between the relay node and the mobile terminal based on the received resource allocation information, wherein
the indicated controllable range is changed to another controllable range when the resources are insufficient for the relay node; and
the communication interface is configured to communicate with the mobile terminal based on the control performed by the control circuitry.

2. The relay node according to claim 1, wherein the controllable range is categorized into a plurality of control range categories and is determined based on management information at the base station.

3. The relay node according to claim 1, wherein the controllable range indicates that the control circuitry is to control the allocation of resources independently or that the control circuitry is to control the allocation of resources based on instructions received from the base station.

4. The relay node according to claim 1, wherein the controllable range indicates that the control circuitry is to control the allocation of resources both independently and based on instructions received from the base station.

5. The relay node according to claim 1, wherein the controllable range indicates that the control circuitry is to control the allocation of resources independently.

6. The relay node according to claim 1, wherein the resource allocation information is further based on: a load of the base station, an amount of power consumption at the base station, a number of mobile terminals currently being serviced by the base station, a location of the relay node, and a relationship between the relay node and the base station.

7. The relay node according to claim 1, wherein the predetermined percentage is 30%.

8. A non-transitory computer readable medium including computer program instructions, which when executed by a relay node in a communication network, cause the relay node to perform a method of relaying communications between a base station and a mobile station, the method comprising:
receiving, from the base station, resource allocation information indicating a controllable range of communication resources available to the relay node, the controllable range being one of a first controllable range, a second controllable range, or a third controllable range, the first controllable range representing that no communication resources are available, the second controllable range representing that available communication resources in the base station are a predetermined percentage or less, and the third controllable range representing that available communication resources in the base station are the predetermined percentage or more;
controlling allocation of resources for communication between the relay node and the mobile station based on the resource allocation information received from the base station;
changing the indicated controllable range to another controllable range when the resources are insufficient for the relay node; and
communicating with the mobile station based on the controlling.

9. The non-transitory computer readable medium according to claim 8, wherein
the controllable range is categorized into a plurality of control range categories and is determined based on management information at the base station.

10. The non-transitory computer readable medium according to claim 8, wherein
the controllable range indicates that the relay node is to control the allocation of resources based on instructions received from the base station.

11. The non-transitory computer readable medium according to claim 8, wherein
the controllable range indicates that the relay node is to control the allocation of resources both independently and based on instructions received from the base station.

12. The non-transitory computer readable medium according to claim 8, wherein
the controllable range indicates that the relay node is to control the allocation of resources independently.

13. A method of relaying communications between a base station and a mobile station via a relay node, the method comprising:
receiving, at the relay node from the base station, resource allocation information indicating a controllable range of communication resources available to the relay node, the controllable range being one of a first controllable range, a second controllable range, or a third controllable range, the first controllable range representing that no communication resources are available, the second controllable range representing that available communication resources in the base station are a predetermined percentage or less, and the third controllable range representing that available communication resources in the base station are the predetermined percentage or more;
controlling, by the relay node, allocation of resources for communication between the relay node and the mobile station based on the resource allocation information received from the base station;
changing the indicated controllable range to another controllable range when the resources are insufficient for the relay node; and
communicating with the mobile station based on the controlling.

14. The method according to claim 13, wherein
the controllable range is categorized into a plurality of control range categories and is determined based on management information at the base station.

15. The method according to claim 13, wherein
the controllable range indicates that the relay node is to control the allocation of resources based on instructions received from the base station.

16. The method according to claim 13, wherein
the controllable range indicates that the relay node is to control the allocation of resources both independently and based on instructions received from the base station.

17. The method according to claim 13, wherein
the controllable range indicates that the relay node is to control the allocation of resources independently.

18. A mobile communication system, comprising:
a base station;
a mobile station; and
a relay node configured to relay communications between the base station and the mobile station, wherein
the base station includes control circuitry configured to determine a controllable range of communication resources available to the relay node based on management information at the base station; and a communication interface configured to transmit resource allocation information to the relay node, the resource allocation information indicating the controllable range of communication resources available to the relay node, the controllable range being one of a first controllable range, a second controllable range, or a third controllable range, the first controllable range representing that no communication resources are available, the second controllable range representing that available communication resources in the base station are a predetermined percentage or less, and the third controllable range representing that available communication resources in the base station are the predetermined percentage or more;

the relay node includes a communication interface configured to receive the resource allocation information from the base station indicating the controllable range of communication resources available to the relay node;

control circuitry configured to control allocation of resources for communication between the relay node and the mobile station based on the resource allocation information received from the base station; and the communication interface configured to communicate with the mobile station based on the control performed by the control circuitry; and the indicated controllable range is changed to another controllable range when the resources are insufficient for the relay node.

19. The system according to claim 18, wherein
the controllable range is categorized into a plurality of control range categories and is determined by the control circuitry of the base station based on the management information.

20. The system according to claim 18, wherein
the controllable range indicates that the control circuitry of the relay node is to control the allocation of resources based on instructions received from the base station.

21. The system according to claim 18, wherein
the controllable range indicates that the control circuitry of the relay node is to control the allocation of resources both independently and based on instructions received from the base station.

22. The system according to claim 18, wherein
the controllable range indicates that the control circuitry of the relay node is to control the allocation of resources independently.

23. The system according to claim 18, wherein
the control circuitry at the base station is configured to determine the controllable range based on a traffic load at the base station.

24. The system according to claim 18, wherein
the control circuitry at the base station is configured to determine the controllable range based on an amount of power consumption at the base station.

25. The system according to claim 18, wherein
the control circuitry at the base station is configured to determine the controllable range based on a total number of mobile stations currently being serviced by the base station.

26. The system according to claim 18, wherein
the control circuitry at the base station is configured to determine the controllable range based on whether the relay node is temporarily installed for an outdoor event.

27. The system according to claim 18, wherein
the control circuitry at the base station is configured to determine the controllable range based on a relationship with a base station servicing an adjacent cell.

28. A method for relaying communications between a base station and a mobile terminal via a relay node, the method comprising:

determining, at first control circuitry of the base station, a controllable range of communication resources available to the relay node based on management information at the base station;

transmitting, by a first communication interface of the base station, resource allocation information to the relay node, the resource allocation information indicating the controllable range of communication resources available to the relay node, the controllable range being one of a first controllable range, a second controllable range, or a third controllable range, the first controllable range representing that no communication resources are available, the second controllable range representing that available communication resources in the base station are a predetermined percentage or less, and the third controllable range representing that available communication resources in the base station are the predetermined percentage or more;

receiving, at a second communication interface of the relay node, the resource allocation information from the base station indicating the controllable range of communication resources available to the relay node;

controlling, by second control circuitry of the relay node, allocation of resources for communication between the relay node and the mobile terminal based on the resource allocation information received from the base station;

changing the indicated controllable range to another controllable range when the resources are insufficient for the relay node; and communicating, by the relay node, with the mobile terminal based on the control performed by the control circuitry.

29. The method according to claim 28, wherein
the controllable range is categorized into a plurality of control range categories and is determined by the first control circuitry of the base station based on the management information.

30. The method according to claim 28, wherein
the controllable range indicates that the controlling is to be performed based on instructions received from the base station.

31. The method according to claim 28, wherein
the controllable range indicates that the controlling is to be performed both independently and based on instructions received from the base station.

32. The method according to claim 28, wherein
the controllable range indicates that the controlling is to be performed independently.

33. The method according to claim 28, further comprising:
determining, at the first control circuitry of the base station, the controllable range based on a traffic load at the base station.

34. The method according to claim 28, further comprising:
determining, at the first control circuitry of the base station, the controllable range based on an amount of power consumption at the base station.

35. The method according to claim 28, further comprising:
determining, at the first control circuitry of the base station, the controllable range based on a total number of mobile stations currently being serviced by the base station.

36. The method according to claim 28, further comprising:
determining, at the first control circuitry of the base station, the controllable range based on whether the relay node is temporarily installed for an outdoor event.

37. The method according to claim 28, further comprising:
determining, at the first control circuitry of the base station, the controllable range based on a relationship with a base station servicing an adjacent cell.

\* \* \* \* \*